United States Patent
Yamaguchi et al.

(10) Patent No.: US 7,548,805 B2
(45) Date of Patent: Jun. 16, 2009

(54) VEHICLE CONTROL APPARATUS, VEHICLE CONTROL METHOD AND VEHICLE SLIP SUPPRESSING APPARATUS

(75) Inventors: Kazuhi Yamaguchi, Hyogo (JP); Shinichiro Takatomi, Hyogo (JP); Shinji Takemoto, Hyogo (JP); Masato Ishio, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 116 days.

(21) Appl. No.: 11/727,348

(22) Filed: Mar. 26, 2007

(65) Prior Publication Data
US 2007/0225882 A1    Sep. 27, 2007

(30) Foreign Application Priority Data
Mar. 27, 2006  (JP)   ............................ 2006-084401
Jul. 11, 2006  (JP)   ............................ 2006-189978
Jul. 21, 2006  (JP)   ............................ 2006-199417

(51) Int. Cl.
*G08G 1/09*  (2006.01)
*B60R 21/00* (2006.01)
*G06F 7/00*  (2006.01)

(52) U.S. Cl. ............................ 701/36; 701/45; 701/80; 701/301; 180/271; 340/905

(58) Field of Classification Search ................ 701/45, 701/117, 213, 300, 301, 36, 80, 96; 340/436, 340/901–905, 928; 180/268–270, 271
See application file for complete search history.

(56) References Cited

U.S. PATENT DOCUMENTS

| | | | | |
|---|---|---|---|---|
| 5,159,991 A * | 11/1992 | Tsuyama et al. | ............... | 701/91 |
| 6,257,363 B1 * | 7/2001 | Midorikawa et al. | ........ | 180/268 |
| 6,724,321 B2 * | 4/2004 | Kuragaki et al. | ............ | 340/928 |
| 6,843,339 B2 * | 1/2005 | Midorikawa et al. | ........ | 180/268 |
| 6,926,374 B2 * | 8/2005 | Dudeck et al. | .............. | 701/301 |
| 7,308,839 B2 * | 12/2007 | Hijikata | ....................... | 74/514 |
| 7,389,843 B2 * | 6/2008 | Midorikawa | ................ | 180/268 |
| 2004/0090117 A1 * | 5/2004 | Dudeck et al. | .............. | 701/301 |
| 2006/0058964 A1 * | 3/2006 | Lucas et al. | ................. | 701/301 |
| 2008/0097699 A1 * | 4/2008 | Ono | .......................... | 701/300 |

FOREIGN PATENT DOCUMENTS

| | | | | |
|---|---|---|---|---|
| JP | A 5-270419 | 10/1993 | | |
| JP | 06344839 A | * 12/1994 | ................ | 701/301 |
| JP | A 7-298694 | 11/1995 | | |
| JP | A 11-83501 | 3/1999 | | |
| JP | A 2000-127798 | 5/2000 | | |
| JP | A 2001-4382 | 1/2001 | | |
| JP | WO 01/58712 A1 | 8/2001 | | |
| JP | A 2002-115578 | 4/2002 | | |
| JP | A 2002-199505 | 7/2002 | | |
| JP | A 2003-522072 | 7/2003 | | |
| JP | A 2004-254483 | 9/2004 | | |
| JP | B2 3624831 | 3/2005 | | |
| JP | A 2005-133682 | 5/2005 | | |
| JP | 2006024106 A | * 1/2006 | ................ | 701/301 |
| WO | WO 2005071508 A1 | * 8/2005 | ................ | 701/301 |

* cited by examiner

*Primary Examiner*—Willis R Wolfe, Jr.
(74) *Attorney, Agent, or Firm*—Oliff & Berridge, PLC

(57) ABSTRACT

A vehicle control section is operable to control the vehicle based on information on a degree of risk in a risky point through which the vehicle is predicted to drive.

28 Claims, 44 Drawing Sheets

FIG. 3

(a) EXTERNAL ENVIRONMENTS

| FACTORS | LEVEL | SCORE |
|---|---|---|
| RAIN | 1 | 1 |
| | 2 | 2 |
| | 3 | 3 |
| SNOW | 1 | 2 |
| | 2 | 4 |
| | 3 | 6 |
| ⁓ | ⁓ | ⁓ |
| WIND | 1 | 1 |
| | 2 | 2 |
| | 3 | 3 |

(b) DRIVING STATE

| FACTORS | LEVEL | SCORE |
|---|---|---|
| HEALTH | 1 | 3 |
| | 2 | 2 |
| | 3 | 1 |
| FATIGUE | 1 | 6 |
| | 2 | 4 |
| | 3 | 2 |
| ⁓ | ⁓ | ⁓ |
| MENTAL CONDITION | 1 | 3 |
| | 2 | 2 |
| | 3 | 1 |

(c) DISTURBANCE

| FACTORS | LEVEL | SCORE |
|---|---|---|
| ROAD SURFACE | 1 | 2 |
| | 2 | 4 |
| | 3 | 6 |
| AREA | 1 | 1 |
| | 2 | 2 |
| | 3 | 3 |
| ⁓ | ⁓ | ⁓ |
| TRAFFIC CONGESTION | 1 | 1 |
| | 2 | 2 |
| | 3 | 3 |

(d) VEHICLE CONDITIONS

| FACTORS | LEVEL | SCORE |
|---|---|---|
| TIRES | 1 | 2 |
| | 2 | 4 |
| | 3 | 6 |
| SUSPENSIONS | 1 | 1 |
| | 2 | 2 |
| | 3 | 3 |
| ⁓ | ⁓ | ⁓ |
| SHAFTS | 1 | 1 |
| | 2 | 2 |
| | 3 | 3 |

FIG. 4

| POINTS WHERE UNIQUE CHARGING OR DISCHARGING IS EXPECTED TO OCCUR | SYSTEMS TO BE ACTIVATED |
|---|---|
| A | E B D |
| | A B S |
| | V S C |
| | T R C |
| B | E B D |
| | A B S |
| | V S C |
| | T R C |
| C | P C S |
| | E B D |
| | A B S |
| D | E B D |
| | A B S |
| | V S C |
| | T R C |
| | P C S |
| E | — |
| F | E B D |
| | A B S |
| G | A F S |
| | E B D |
| | A B S |
| | V S C |
| | T R C |
| | P C S |

FIG. 5

| UNIT NAMES | ORDER OF PREFERENCE OF SELECTION | REQUIRED POWER [W] | | |
|---|---|---|---|---|
| | | LEVEL 1 | LEVEL 2 | LEVEL 3 |
| AIR CONDITIONER | 3 | 3 6 0 | 4 8 0 | 6 0 0 |
| LIGHTS | 1 | 6 0 | 8 0 | — |
| NAVIGATION | 2 | 1 5 0 | — | — |
| SEAT HEATERS | 6 | 1 2 0 | 1 4 4 | |
| MASSAGE SEAT | 7 | 1 2 0 | 1 4 4 | |
| MIRROR HEATERS | 5 | 1 2 0 | 1 4 4 | |
| DEFOGGER | 4 | 1 2 0 | — | — |

| ITEMS | STATE |
|---|---|
| CHARGING RATE | 90 [%] |
| VOLTAGE | 13.8 [V] |
| CURRENT | 20 [A] |
| FLUID TEMPERATURE | 25 [°C] |
| INTERNAL RESISTANCE | 5 [mΩ] |
| DISCHARGEABLE ELECTRICITY QUANTITY | 118800 [Asec] |

| DEGREE OF RISK [%] | 0 | 20 | 40 | 60 | 80 | 100 |
|---|---|---|---|---|---|---|
| EBD UTILIZATION QUANTITY | 0 | 0 | 0 | 200 | 400 | 600 |

FIG. 11

| POINTS WHERE UNIQUE CHARGING OR DISCHARGING IS EXPECTED TO OCCUR | SYSTEMS TO BE ACTIVATED FOR OPERATION | EXPECTED DISCHARGE ELECTRICITY QUANTITY |
|---|---|---|
| A | EBD | 400 [Asec] |
| | ABS | 400 [Asec] |
| | VSC | 400 [Asec] |
| | TRC | 300 [Asec] |
| B | EBD | 400 [Asec] |
| | ABS | 400 [Asec] |
| | VSC | 400 [Asec] |
| | TRC | 300 [Asec] |
| C | PCS | 400 [Asec] |
| | EBD | 400 [Asec] |
| | ABS | 400 [Asec] |
| D | EBD | 400 [Asec] |
| | ABS | 500 [Asec] |
| | VSC | 300 [Asec] |
| | TRC | 300 [Asec] |
| | PCS | 1000 [Asec] |
| E | — | — |
| F | EBD | 400 [Asec] |
| | ABS | 300 [Asec] |
| G | AFS | 500 [Asec] |
| | EBD | 600 [Asec] |
| | ABS | 500 [Asec] |
| | VSC | 300 [Asec] |
| | TRC | 300 [Asec] |

FIG. 13(a)

| ALTERNATIVE SECTION | |
|---|---|
| SYSTEMS TO BE ACTIVATED FOR OPERATION | VEHICLE CONTROL |
| VSC | VEHICLE SPEED RESTRICTION |
| | AT CONTROL |
| | TBW CONTROL |
| TRC | VEHICLE SPEED RESTRICTION |
| | AT CONTROL |
| | TBW CONTROL |
| PCS | NONE |
| AFS | NONE |
| EBD | VEHICLE SPEED RESTRICTION |
| | AT CONTROL |
| | TBW CONTROL |
| ABS | VEHICLE SPEED RESTRICTION |
| | AT CONTROL |
| | TBW CONTROL |

FIG. 13(b)

| POINTS WHERE UNIQUE CHARGING OR DISCHARGING IS EXPECTED TO OCCUR | SYSTEMS TO BE ACTIVATED FOR OPERATION | DETERMINATION |
|---|---|---|
| A | EBD | ○ |
| | ABS | ○ |
| | VSC | × |
| | TRC | × |
| B | EBD | ○ |
| | ABS | ○ |
| | VSC | × |
| | TRC | × |
| C | PCS | ○ |
| | EBD | ○ |
| | ABS | ○ |
| D | EBD | ○ |
| | ABS | ○ |
| | VSC | × |
| | TRC | × |
| | PCS | ○ |
| E | — | ○ |
| F | EBD | ○ |
| | ABS | ○ |
| G | AFS | ○ |
| | EBD | ○ |
| | ABS | ○ |
| | VSC | × |
| | TRC | × |

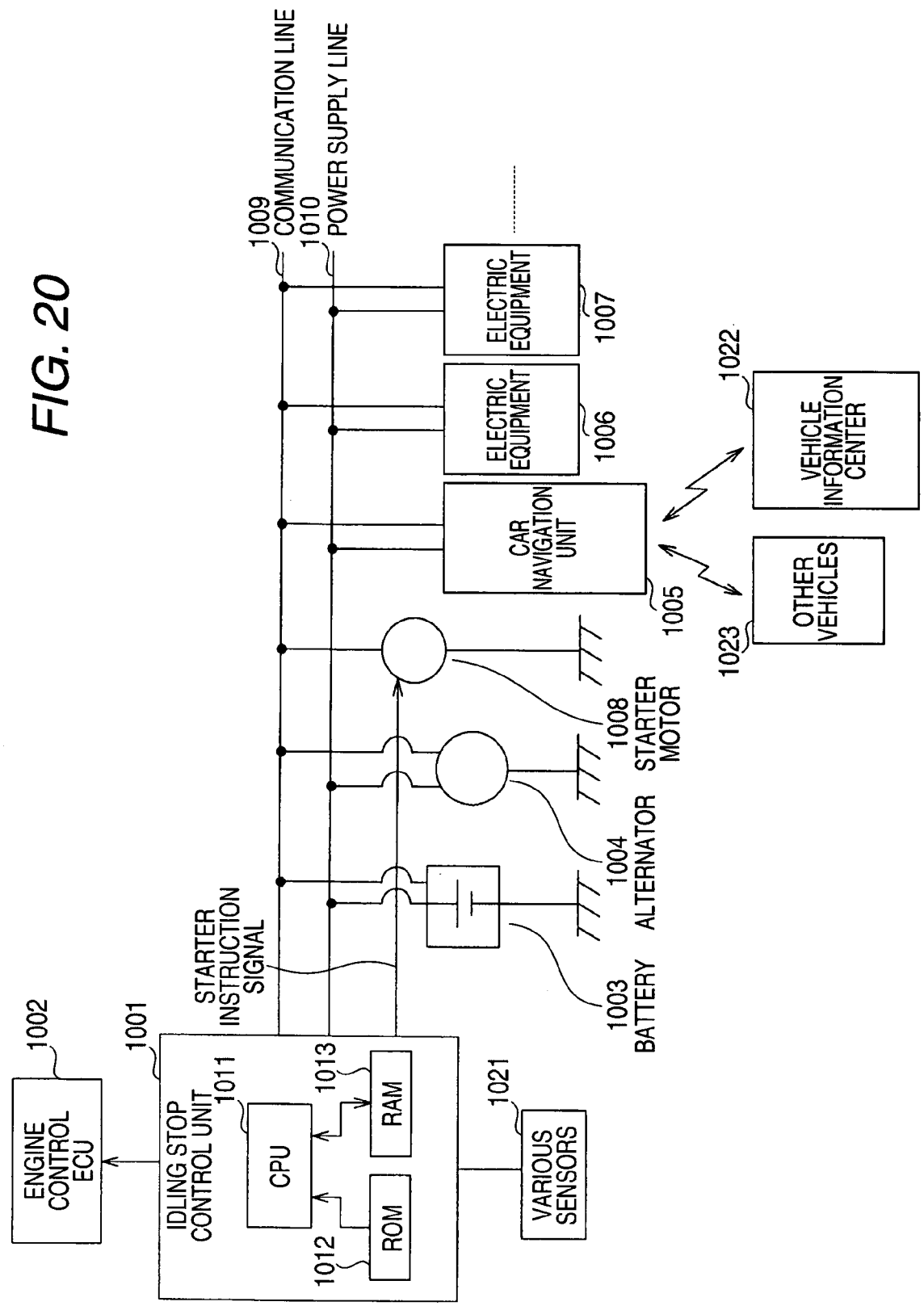

FIG. 21

| MODEL TYPE | GRADE | SAFETY EQUIPMENT | PRIMARY EQUIPMENT |
|---|---|---|---|
| XXX | PREMIUM | AFS | CVT(FF) |
| | | EBD | TBW |
| | | ABS | EPS |
| | | VSC | SUMMER TIRES |
| | | TRC | AIR SUSPENSIONS |
| | | PCS | FRONT AND REAR STABILIZER BARS |

FIG. 22

(a) EXTERNAL ENVIRONMENTS

| FACTORS | LEVEL | SCORE |
|---|---|---|
| RAIN | 1 | 1 |
| | 2 | 2 |
| | 3 | 3 |
| SNOW | 1 | 2 |
| | 2 | 4 |
| | 3 | 6 |
| ⁓ | ⁓ | ⁓ |
| WIND | 1 | 1 |
| | 2 | 2 |
| | 3 | 3 |

(b) DRIVING STATE

| FACTORS | LEVEL | SCORE |
|---|---|---|
| HEALTH | 1 | 1 |
| | 2 | 2 |
| | 3 | 3 |
| FATIGUE | 1 | 2 |
| | 2 | 4 |
| | 3 | 6 |
| ⁓ | ⁓ | ⁓ |
| MENTAL CONDITION | 1 | 1 |
| | 2 | 2 |
| | 3 | 3 |

(c) DISTURBANCE

| FACTORS | LEVEL | SCORE |
|---|---|---|
| ROAD SURFACE | 1 | 2 |
| | 2 | 4 |
| | 3 | 6 |
| AREA | 1 | 1 |
| | 2 | 2 |
| | 3 | 3 |
| ⁓ | ⁓ | ⁓ |
| TRAFFIC CONGESTION | 1 | 1 |
| | 2 | 2 |
| | 3 | 3 |

(d) VEHICLE CONDITIONS

| FACTORS | LEVEL | SCORE |
|---|---|---|
| TIRES | 1 | 2 |
| | 2 | 4 |
| | 3 | 6 |
| SUSPENSIONS | 1 | 1 |
| | 2 | 2 |
| | 3 | 3 |
| ⁓ | ⁓ | ⁓ |
| SHAFTS | 1 | 1 |
| | 2 | 2 |
| | 3 | 3 |

FIG. 23

| EVENTS | SYSTEMS TO BE ACTIVATED FOR OPERATION | EXPECTED DISCHARGE ELECTRICITY QUANTITY |
|---|---|---|
| SHARP CURVE (DAYTIME) | EBD | 500 [Asec] |
| | ABS | 400 [Asec] |
| | VSC | 400 [Asec] |
| | TRC | 300 [Asec] |
| SHARP CURVE (NIGHT) | AFS | 500 [Asec] |
| | EBD | 600 [Asec] |
| | ABS | 500 [Asec] |
| | VSC | 300 [Asec] |
| | TRC | 300 [Asec] |
| DOWNSLOPE | EBD | 1000 [Asec] |
| | ABS | 300 [Asec] |
| CONGESTION | PCS | 400 [Asec] |
| | EBD | 400 [Asec] |
| | ABS | 400 [Asec] |
| UPSLOPE | — | — |
| HEAVY RAIN | EBD | 600 [Asec] |
| | ABS | 500 [Asec] |
| | VSC | 300 [Asec] |
| | TRC | 300 [Asec] |
| | PCS | 1000 [Asec] |
| ROUGH ROAD SURFACE | EBD | 600 [Asec] |
| | ABS | 500 [Asec] |
| | VSC | 300 [Asec] |
| | TRC | 300 [Asec] |
| | PCS | 1000 [Asec] |

FIG. 24

| ELECTRIC EQUIPMENT | CONSUMED CURRENT [A] |
|---|---|
| LIGHTS | 10 |
| WIPERS | 10 |
| AUDIO UNIT | 20 |
| . | . |
| . | . |
| . | . |
| AIR CONDITIONER | 50 |

*FIG. 30(A)* *FIG. 30(B)*
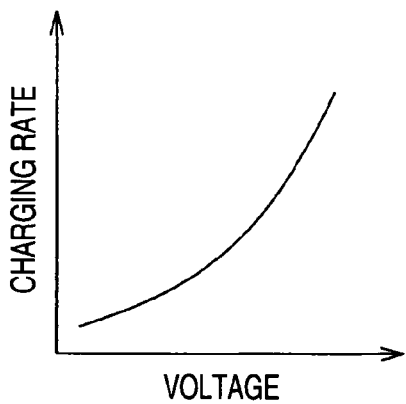
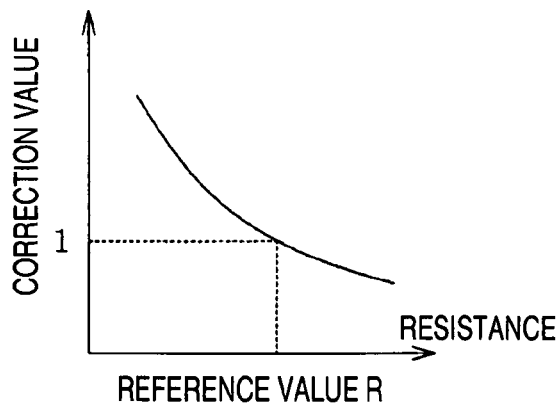
*FIG. 31*
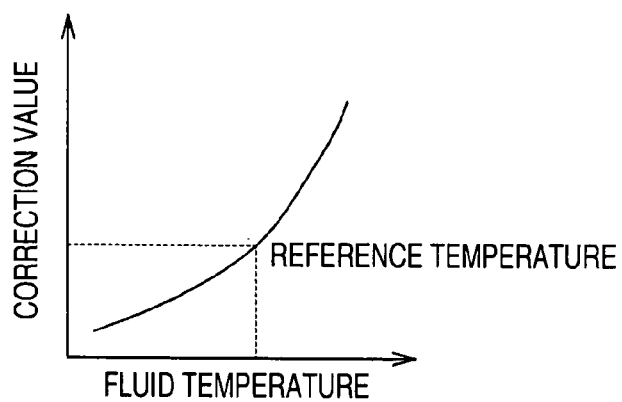
*FIG. 32*
| ACCUMULATED CURRENT VALUE [Asec] | -2000 | -1500 | -1000 | -500 | 0 | 500 | 1000 | 1500 | 2000 |
|---|---|---|---|---|---|---|---|---|---|
| CHARGING RATE CORRECTION VALUE | -8 | -6 | -4 | -2 | 0 | 2 | 4 | 6 | 8 |

| CONDITIONS | DEGREE OF RISK | | | | | | |
|---|---|---|---|---|---|---|---|
| | 0 | 10 | 20 | 30 | 40 | 50 ········ | 100 |
| IS A RESIDUAL ELECTRIC VALUE POSITIVE? | ○ | ○ | ○ | ○ | ○ | | ○ |
| IS THE GRADIENT LESS THAN A PREDETERMINED VALUE | × | × | ○ | ○ | ○ | | ○ |
| ⋮ | ⋮ | | | ⋮ | | | |

FIG. 42

| PATTERN | LEVEL |
|---|---|
| WIPER ON | 2 |
| DIRECTION INDICATOR LAMP ON | 3 |
| FOG LAMP ON | 3 |
| TWILIGHT TIME | 3 |
| ILLUMINANCE SENSOR DARK | 4 |

FIG. 43

| LEVEL | TREATMENT |
|---|---|
| 95~ | PREPARE FOR OCCURRENCE OF ACCIDENT |
| 80~95 | WARNING AND FEEDING RESTRICTION a |
| 60~80 | WARNING AND FEEDING RESTRICTION b |
| 40~60 | DRIVER BE ALERTED |
| 0~40 | NOTHING DONE |

| LEVEL | A: EQUIPMENT EXPECTED TO BE ACTIVATED | B: EQUIPMENT EXPECTED TO BE ACTIVATED |
|---|---|---|
| 90~ | ABS, EBD, AIR BAG, VSC | ABS, AIR BAG |
| 70~90 | ABS, EBD | ABS |

FIG. 44

| UNIT NAMES | ORDER OF PREFERENCE OF SELECTION | REQUIRED POWER [W] | | |
|---|---|---|---|---|
| | | LEVEL 1 | LEVEL 2 | LEVEL 3 |
| AIR CONDITIONER | 2 | 360 | 480 | 600 |
| LIGHTS | 1 | 60 | 80 | — |
| NAVIGATION | 1 | 150 | — | — |
| SEAT HEATERS | 3 | 120 | 144 | — |
| MASSAGE SEAT | 4 | 200 | 144 | — |
| MIRROR HEATERS | 3 | 120 | 144 | — |
| DEFOGGER | 2 | 120 | — | — |
| ABS | 1 | 200 | — | — |
| EBD | 1 | 200 | — | — |

FIG. 45

VEHICLE CONTROL APPARATUS, VEHICLE CONTROL METHOD AND VEHICLE SLIP SUPPRESSING APPARATUS

BACKGROUND

The present invention relates to a vehicle control apparatus for informing a driver of an emerging risk when a safety function does not work due to a quantity of residual electrical energy of a battery being insufficient.

In addition, the invention relates a vehicle control apparatus and more particularly to a vehicle control apparatus which includes an economical running (or idling stop) function in which a vehicle is driven while repeatedly driving and stopping an engine.

Furthermore, the invention relates to a vehicle control apparatus for restricting feeding to a load such as on-board electric equipment or the like which is connected to the battery, a vehicle control method and a vehicle slip suppressing unit.

Several electronic control units are mounted on a vehicle which include, for example, an engine ECU for controlling the amounts of fuel to be injected and air to be let in, a charge control ECU for controlling the charging of a power supply, a body ECU for controlling the locking of doors and the like, an automatic transmission (AT) control ECU, an airbag ECU, a security ECU for producing an alarm when theft has happened or an event has been detected which indicates the occurrence of theft, and the like.

With development of electronic control in conjunction with propagation of automobiles and propagation of on-board components which are required in pursuit of convenience, comfortableness and safety, the fitment of on-board electric equipment such as those described above has drastically been increased, and a feeding system, that is, a battery has been forced to bear an increasing load. In these circumstances, since when the quantity of residual electrical energy in the battery is decreased or becomes insufficient, there will be caused a problem in operation of the vehicle, it is a conventional practice to inform in advance the driver of the reduced or insufficient residual electrical energy in the battery as it actually occurs.

On the other hand, in guiding a vehicle by a car navigation system, points where the vehicle has to be driven with care or care requiring points such as risky points on road surfaces where joints and pits are situated, entering points to road surfaces such as rough road surface covered with pebbles which give shocks to the vehicle and make the driver uncomfortable while he or she is driving the vehicle and other risky points are recorded on an electronic map, so that when the vehicle is approaching or passing through the recorded points, the driver is informed that the vehicle is approaching or will soon be passing through the relevant points by way of a warning displayed on a screen of the navigation system or in voice generated thereby.

However, since it is difficult for the user to input these points, there has been proposed a technique in which vibrations from a road surface or shocks from the road surface are detected, and positions where the vibrations are detected are then located, so that information on the vibrations so detected and information on the positions so located are recorded in map information in such a manner as to be associated with each other, whereby vibration generating point information which is associated with the respective points on the map is automatically recorded without depending on the input of the relevant points by the user (for example, refer to Japanese Patent Publication No. 2001-4382A).

As has been described above, it is the conventional practice to inform in advance the driver of the reduction in electrical energy of the battery as it actually occurs. However, giving the driver the information in the stage where the electrical energy of the battery is so reduced may be too late, since, when the driver continues to drive the vehicle after he or she has been informed of the reduction in electrical energy of the battery, there is a possibility that various safety-related functions mounted on the vehicle may not be able to work properly, which results in a risky driving.

In addition, as is proposed in the Japanese Patent Publication No. 2001-4382A, there exists the technique in which when the vehicle is approaching or will soon be passing through the care requiring point such as the entering point to the road surface where shocks are given to the vehicle while it is being driven and the risky point, the driver is informed in advance by the indication on the screen or in voice of a risk which waits ahead of his or her vehicle. However, this technique is not such as to inform the driver whether or not the safety functions can operate properly.

In recent years, for the purposes of improving fuel economy and reducing exhaust emissions, an automatic engine stop and restart control (a so-called economical running control) is adopted in which an automatic engine stop instruction is issued when predetermined engine stopping conditions (a driving history exists, the vehicle is at halt, the engine is idling, and the like) are established, and thereafter, when predetermined engine starting conditions (the brake is released, a gearshift occurs, the accelerator pedal is depressed, and the like) are established, an automatic engine restart instruction is issued so as to drive an engine starter motor.

Namely, in stopping at traffic lights or the like, there has been caused a problem that when the engine is left idling while the vehicle is not actually driven or is at halt, exhaust gases continue to be produced and fuel consumption is increased. Because of this, the engine is temporarily stopped while the vehicle is being stopped at traffic lights or the like, or the accelerator pedal is left released for a certain period of time as the vehicle is coasting, and with the engine stopped temporarily like this, when the accelerator pedal is depressed again, the engine is restarted to start the vehicle.

According to this economical running control system, the engine is made to be driven only when it is needed for driving the vehicle, whereas the engine is stopped on other opportunities, whereby the feel economy can be increased, and the engine driving time can be reduced so as to reduce the amount of exhaust gases.

In vehicles equipped with the economical running function like this, in order to improve driving comfortableness, accessories such as audio equipment and the like are configured to be usable while the economical running (or the automatic engine stop) is in operation. In the event that the battery voltage is decreased by the usage of the accessory while the engine is stopped, however, a sufficient driving current cannot be supplied to the starter motor, and the engine restarting capability is deteriorated. Therefore, to cope with this, there has been proposed a technique in which the economical running is prohibited when the battery voltage is decreased (for example, refer to Japanese Patent Publication No. 2002-115578A).

In addition, when the battery voltage is decreased, the usage of electric equipment is increased to apply high load to the battery, or the quantity of current to be generated by the alternator is small, there is produced a possibility that a shortage of power supply to safety systems designed to prevent accidents may occur, and, therefore, to cope with this, there has been proposed a technique in which feeding to the air conditioner and other entertaining electric equipment is stopped (for example, refer to Japanese Patent Publication No. 2002-199505A).

As has been described above, conventionally, there have been proposed the techniques in which when the battery voltage is decreased, the economical running is prohibited and the feeding to the unnecessary electric equipment for safety driving is stopped so as to prevent the shortage of power supply to the safety-related systems.

However, in the event that the economical running is permitted in such a state that the vehicle is approaching a risky area such as a place where the safety systems are activated to operate, whereby a shortage of feeding is likely to be caused, when the vehicle is actually driven in the risky area, a shortage of feeding is called for, leading to a possibility that feeding to the safety-related systems may become insufficient.

An electronic control unit (hereinafter, referred to as an ECU) of a vehicle is such as to exchange signals with control mechanisms of the vehicle so as to electronically control the vehicle. For example, pieces of information on vehicle speed, engine speed, intake air amount and the like which are detected by a group of sensors mounted on the vehicle are inputted into an engine ECU, and the engine ECU executes a predetermined arithmetic processing based on the pieces of information and sends out the results of the arithmetic (or example, signals to control the quantities of fuel to be injected, by-pass air and the like) to control mechanisms mounted on the vehicle such as an electric throttle, a starter injection valve and the like so as to control the quantities of fuel to be injected and air to be let in.

Several electronic control units like this are mounted on a vehicle which include, for example, an engine ECU for controlling the amounts of fuel to be injected and air to be let in, a charge control ECU for controlling the charging of a power supply, a body ECU for controlling the locking of doors and the like, an automatic transmission (AT) control ECU, an airbag ECU, a security ECU for producing an alarm when theft has happened or an event has been detected which indicates the occurrence of theft, and the like.

In this way, with development of electronic control in conjunction with propagation of automobiles and propagation of on-board components which are required in pursuit of convenience, comfortableness and safety, the fitment of on-board electric equipment such as those described above has drastically been increased, and a feeding system, that is, a battery has been forced to bear an increasing load. Therefore, the load applied to the battery has been tried to be decreased by controlling the quantity of electric current that is generated by a generator according to the using conditions of the electric equipment, battery conditions and vehicle running conditions (for example, refer to Japanese Patent Publication No. 7-298694).

On the other hand, various safety-related equipment such as AFS, EBD, ABS, VSC, TCS, PCS are mounted on vehicles. Namely, the AFS (a movable lighting system or Adaptive Front-lighting System) is such that projector units of headlights are linked with the operation of a steering wheel in such a manner that directions thereof are changed to a direction in which the vehicle is steered when running on a curve or turning right or left at an intersection so as to illuminate a traveling direction of the vehicle. The EBD (electronically controlled brake force distribution system or Electronic Brake force Distribution) is a system in which a distribution of brake force (brake distribution) to front and rear wheels at the time of application of the brakes is controlled by a computer so as maximize the braking potential.

In addition, the ABS (Anti-lock Brake System) is such as to prevent wheel lockup when a panic brake is applied in slippery road conditions, and the VSC (a skid preventing function or Vehicle Stability Control) is a system for asking in application of a steering torque in a direction in which the behaviors of the vehicle are stabilized according to a steering angle of the steering wheel. Furthermore, the TCS (Traction Control System) is a system for preventing wheel spins at the time of acceleration of the vehicle by controlling the vehicle torque when such wheel spins are detected, and the PCS (Pre-Crash Safety System) is such as to increase the occupant restraining performance by retracting the seat belts of the driver's seat and front passenger's seat when a brake applied is judged as art emergency brake from a speed at which the brake pedal is depressed.

As has been described above, conventionally, in order to reduce a load that is applied to the battery, the quantity of current that is generated by the generator is controlled according to the usage of the electric equipment and the battery conditions and vehicle driving conditions. However, even in the event that the quantity of current generated by the generator is so controlled, when the aforesaid various safety systems are activated in fear of the occurrence of an accident, a required quantity of electrical energy exceeds the capacity of the generator, causing a possibility that a shortage of feeding may happen, resulting in a possibility that the safety equipment may not be activated for operation.

Additionally, in a conventional vehicle slip suppressing unit for preventing an accident by the use of information from a navigation system, a driving control is performed by calculating a permissible speed and a permissible G in consideration of information from the navigation system, the state of the vehicle and the road conditions. However, only the conditions of the subject vehicle is taken into consideration, and weather and temperature or a driving environment such as the condition of the driver is not taken into consideration, whereby a permissible G cannot be calculated accurately, resulting in a risk that a slip avoidance control fails to be performed.

SUMMARY

It is therefore an object of the invention to provide a vehicle control apparatus and vehicle control method in which whether or not safety functions work properly when a vehicle is driven in such a state that the quantity of residual electrical energy is small, and when the safety functions are judged not to work properly, the driver is informed of the unworkability of the safety functions.

It is also an object of the invention to provide a vehicle control apparatus in which an economical running can be performed with good accuracy while ensuring the suppression of disablement of feeding to safety systems.

Furthermore, it is also an object of the invention to provide a vehicle control apparatus for ensuring the operation of safety equipment by imposing a load restriction by anticipating an activation of the safety equipment from various conditions in a driving area and a vehicle slip suppressing unit for performing a slip avoidance control with good accuracy by taking a driving environment into consideration.

In order to achieve the above described objects, according to the invention, there is provided a vehicle control apparatus adapted to be mounted on a vehicle, comprising:

a vehicle control section operable to control the vehicle based on information on a degree of risk in a risky point through which the vehicle is predicted to drive.

The information on the degree of risk in the risky point may be information acquired from outside of the vehicle control apparatus.

The vehicle control apparatus may further comprise:

an environment information acquiring section operable to acquire environment information on a driving route through which the vehicle is predicted to drive;

a degree-of-risk calculating section operable to calculate the degree of risk based on the acquired environment information on the driving route;

a point setting section operable to set a point on the driving route, where the calculated degree of risk thereof is equal to or greater than a predetermined degree of risk as a paint where unique charging or discharging of a battery is predicted;

a safety function confirming section operable to confirm a safety function required at the set point on the driving route, wherein the vehicle control section is a control section operable to judge whether the battery has a power required to activate the safety function required at the set point, and notify a driver of an predicted risk in a case where the battery do not have the power required to activate the safety function.

The vehicle control apparatus may faker comprise:

an alternative availability judging section operable to judge whether the safety function required at the set point is replaceable with the other function equipped on the vehicle in a case where the required safety function is not equipped on the vehicle.

With the above configuration, in the event that the quantity of residual electrical energy of the battery is insufficient, the driver can be informed of an predicted risk before the safety functions become unworkable.

The control section may judge whether a restriction for feeding the power to the electric equipment and intervene in the charging control are required by predicting a charging or discharging control of the battery based on a battery condition of the battery, a driving condition of electric equipment mounted on the vehicle, the acquired environment information on the driving route, and the unique charging or discharging of the battery.

With the above configuration, whether or not the quantity of electrical energy of the battery becomes short can be judged accurately.

The vehicle control apparatus may further comprise:

a driver's intension acquiring section operable to acquire a driver's intention, wherein the control section judges whether the restriction for feeding the power to the electric equipment and the intervene in the charging control are required based on the acquired driver's intention.

With the above configuration, since the driver is allowed to select from his or her priorities fuel economy or drivability as being more important than any other features and whether or not the feeding disablement can be avoided by either restricting the feeding or increasing the quantity of current to be generated according to the section made by the driver is judged, a judgment based on the intention of the driver can be made.

The vehicle control apparatus may further comprise:

a risky point determination section operable to determine whether a position through which the vehicle is predicted to drive is the risky point, wherein the vehicle control section is an idling stop permission/prohibition determination section operable to determine whether an idling stop of the vehicle is permitted or prohibited by determining whether there is a possibility to occur a disablement of feeding to a safety equipment mounted on the vehicle based on the degree of risk at the determined risky point.

With the above configuration, the disablement of feeding to the safety systems can be suppressed in an ensured fashion.

The vehicle control apparatus may further comprise:

a degree-of-risk calculating section operable to calculate the degree of risk in a driving area through which the vehicle is predicted to drive, wherein the vehicle control section is a load restriction executing section operable to compare the calculated degree of risk with a predetermined value and execute a cut-off of feeding to a load according to the calculated degree of risk in a case where the calculated degree of risk is greater than the predetermined value.

With the above configuration, the safety equipment can be activated to operate in an ensured fashion.

According to the invention, there is also provided a vehicle control method comprising:

calculating a degree of risk in a risky point through which a vehicle is predicted to drive; and controlling the vehicle based on the calculated degree of risk.

The vehicle control method may further comprise:

calculating the degree of risk in the risky point based on environment information on a driving route through which the vehicle is predicted to drive;

setting a point on the driving route, where the calculated degree of risk there of is equal to or greater than a predetermined degree of risk as a point where unique charging or discharging of a battery is predicted;

judging whether the battery has a power required to activate a safety function required at the set point; and notify a driver of an predicted risk in a case where the battery do not have the power required to activate the safety function.

The vehicle control method may further comprise:

comparing the calculated degree of risk with a predetermined value; and executing a cut-off of feeding to a load according to the calculated degree of risk in a case where the calculated degree of risk is greater than the predetermined value.

According to the invention, there is also provided a vehicle slip suppressing apparatus adapted to be mounted on a vehicle, comprising:

a permissible G calculating section operable to calculate an ideal vehicle G;

a vehicle G detecting section operable to detect a vehicle G; and a vehicle slip judging section operable to judge whether a vehicle slip is occurring, wherein the vehicle slip suppressing apparatus executes a vehicle slip avoidance control according to the result of the slip judgment.

With the above configuration, a possibility of occurrence of a slip can be judged accurately.

BRIEF DESCRIPTION OF THE DRAWINGS

The above objects and advantages of the present invention will become more apparent by describing in detail preferred exemplary embodiments thereof with reference to the accompanying drawings, wherein;

FIG. 3 is an example of accident risk level data based on various driving environments which is stored in the ROM;

FIG. 4 is a table stored in the ROM which shows systems adapted to operate according to risk conditions;

FIG. 5 is an example of a table stored in the ROM which shows the order of preference of selection of vehicle equipped devices;

FIG. 11 is an example of calculation of expected quantities of electricity discharged by the systems operated at respective points where unique charging or discharging is expected;

FIG. 13 is an example of the results of determination on risk avoidance by alternative section;

FIG. 20 is a block diagram which shows the configuration of a vehicle system which includes a vehicle control system of the invention;

FIG. 21 shows vehicle information stored in a ROM;

FIG. 22 shows accident risk level data based on various driving environments which is stored in the ROM;

FIG. 23 is a table stored in the ROM which shows safety systems adapted to operate according to risky conditions;

FIG. 24 shows consumed current data of respective devices equipped on a vehicle which is stored in the ROM;

FIG. 30 is a table of correction values of charging rate based on internal resistance;

FIG. 31 is a table of correction values of charging rate based on accumulated current values;

FIG. 32 is a table for storing accumulated current values and corresponding charging correction values.

FIG. 42 shows an example of a risk element map stored in a ROM;

FIG. 43 shows an example of a table of actions stored in the ROM which are to be taken according to risk levels;

FIG. 44 is a table of safety equipment stored in the ROM which is expected to operate according to risk levels;

FIG. 45 shows an example of a table stored in the ROM which shows the order of preference of selection of vehicle equipped devices;

DETAILED DESCRIPTION OF EMBODIMENTS

Embodiment 1

Hereinafter, embodiments of a vehicle control apparatus of the invention will be described by the use of drawings.

Figures 1, 2:
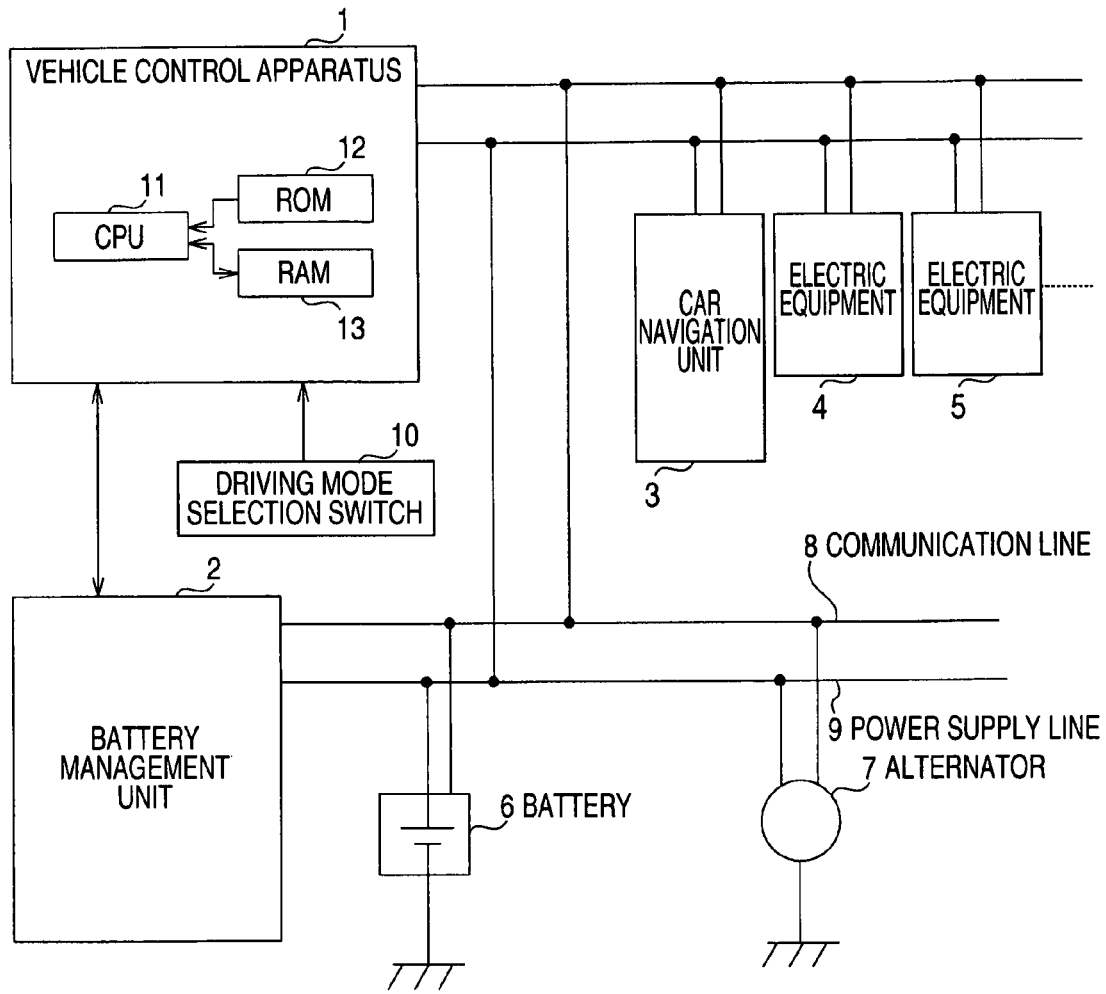
FIG. 1 is a block diagram which shows the configuration of a vehicle driving support system which includes a vehicle control apparatus of the invention.
FIG. 2 is an example of vehicle information which is stored in a ROM.

FIG. 1 is a block diagram which shows the configuration of a vehicle driving support system which includes a vehicle control apparatus of the invention, and this system is made up of a vehicle control apparatus 1, a battery management unit 2, a car navigation unit 3, pieces of electric equipment 4, 5, a battery 6, an alternator 7 and the like, these constituent units being connected with each other via communication line 8 and a power supply line 9.

The vehicle control apparatus 1 is such as to judge whether or not the vehicle can pass through an area ahead thereof from environment information, vehicle information, the condition of the battery, the driving conditions of the electric equipment and the like so as to support the driving of the vehicle according to the results of the judgment and is made up of a CPU 11, a ROM (Read Only Memory) 12, a RAM (Random Access Memory) 13, input and output circuits (not shown) and the like. The CPU 11 controls hardware sections of the vehicle control apparatus 1 and executes various programs such as a program to judge whether or not the vehicle can drive through an area ahead thereof based on programs stored in the ROM 12. The ROM 12 is a memory necessary to store the program to judge whether the vehicle can drive through an area ahead thereof, vehicle information, accident risk level data based on various driving environments, a table of systems adapted to operate according to risk conditions and a table of the order of preference of selection of devices equipped on the vehicle, and the RAM 13 is made up of an SRAM and the like and is a memory necessary to store data which is produced temporarily.

In addition, an output of a drive mode selection switch (SW) 10 is inputted into the vehicle control apparatus 1, and this drive mode selection switch 10 is such as for the driver to select any of driving characteristics or drive modes including a "sport," "normal," and "economy" mode.

FIG. 2 shows an example of vehicle information that is stored in the ROM 12, and a model type of a subject vehicle, its grade and a list of vehicle equipment including safety equipment and primary equipment are stored. In this list of vehicle equipment, an AFS (a movable lighting system or Adaptive Front-lighting System) is such that projector units of headlights are linked with the operation of a steering wheel in such a manner that directions thereof are changed to a direction in which the vehicle is steered when running on a curve or turning right or left at an intersection so as to illuminate a traveling direction of the vehicle. An EBD (electronically controlled brake force distribution system or Electronic Brake force Distribution) is a system in which a distribution of brake force (brake distribution) to front and rear wheels at the time of application of the brakes is controlled by a computer so as maximize the braking potential.

In addition, an ABS (Anti-lock Brake System) is such as to prevent wheel lockup when a panic brake is applied in slippery road conditions, and a VSC (a skid preventing function or Vehicle Stability Control) is a system for assisting in application of a steering torque in a direction in which the behaviors of the vehicle are stabilized according to a steering angle of the steering wheel. Furthermore, a TCS (Traction Control System) is a system for preventing wheel spins at the time of acceleration of the vehicle by controlling the vehicle torque when such wheel spins are detected, and a PCS (Pre-Crash Safety System) is such as to increase the occupant restraining performance by retracting the seat belts of the driver's seat and front passenger's seat when a brake applied is judged as an emergency brake from a speed at which the brake pedal is depressed.

In addition, a CVT (Continuously Variable Transmission) is a continuously variable transmission which can perform gearshift continuously in a stepless fashion by altering effective belt contact diameters of pulleys or disks, and a TBW (a linkless throttle wire or Throttle By Wire) is a throttle control method in which a throttle is controlled according to an effort applied to an accelerator pedal by the user and the throttle can be controlled flexibly according to a vehicle condition calculated by the computer. An EPS (Electric Power Steering) is a steering method in which an electric motor is driven according to a steering angle of a steering wheel so as to assist in steering, and an effort necessary for a steering operation can be reduced.

FIG. 3 shows an example of accident risk level data based on various driving environments which is stored in the ROM 12, and a table is stored which shows accident risk level data for each of various driving environments which constitute accident risk elements such as external environments of rain, snow and the like, driving conditions of the driver including his or her state of health and the like, disturbances such as road surface conditions and traffic conditions, and deterioration of vehicle components. As is shown in FIG. 3(A), as external environments, degrees of risk are stored in score according to levels of rain, snow, wind and the like, and as driving conditions, as is shown in FIG. 3(B), degrees of risk are stored in score according to levels of degree of health, degree of fatigue and mental condition of the driver.

Furthermore, as is shown in FIG. 3(C), as disturbances, degrees of risk are stored in score according to levels of road surface conditions, area conditions, traffic conditions and the like, and as vehicle conditions, as is shown in FIG. 3(D), degrees of risk are stored in score according to levels of deterioration of tires, suspensions, shafts and the like.

In addition, FIG. 4 shows a table of systems which are adapted to be activated to operate according to risk conditions, and for example, the EBD, ABS, VSC, TRC are stored as being activated when the vehicle is at a sharp bent or curve in the daytime (A), and the PCS, EBD, ABS are stored as being activated when the vehicle is trapped in a traffic congestion in the daytime (C). Furthermore, FIG. 5 shows an example of a table of the order of preference of selection of units equipped on the vehicle and consumed power data, and the order of preference of selection of the its and power (W) necessary to operate the units are stored individually for respective levels.

On the other hand, the battery management unit 2 detects the state of the battery 6 so as to control the generation of current by the alternator 7 and inputs charging rate, voltage/current, internal resistance, fluid temperature of the battery 6 into the vehicle control apparatus 1. The battery 6 is such as to feed the vehicle control apparatus 1, the battery management unit 2, the car navigation unit 3 and the like via the power supply line 9 and includes sensors (not shown) for detecting charging and discharging currents, terminal voltage and battery fluid temperature of the battery, and outputs from these sensors are inputted into the battery management unit 2 via the communication line 8. Note that output values of the sensors may be inputted directly into the battery management unit 2.

The alternator 7 is driven by an engine (not show) and charges the battery 6 via the power supply line 9 and supplies power to other electric loads of the vehicle.

In addition, the car navigation unit 3 includes a current vehicle position detecting section which is made up of a GPS sensor and a gyro sensor and a map data storing section for storing map data which includes road map data and acquires road information, weather information, road surface information and the like to a goal of the vehicle via a radio communication with a vehicle information center and an inter-vehicle communication with other vehicles for input into the vehicle control apparatus 1.

Figure 6:
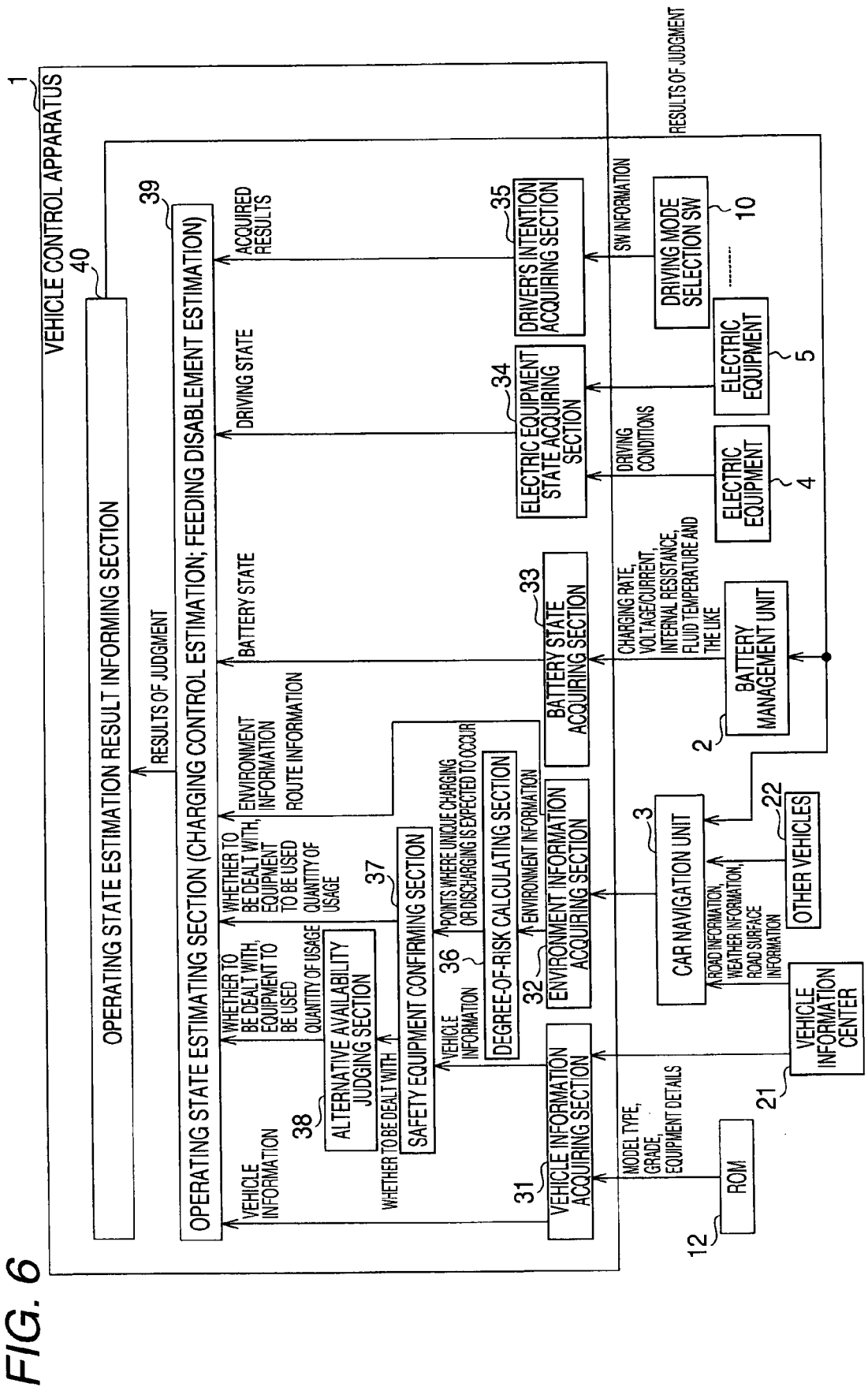
FIG. 6 is a function block diagram which represents the configuration of the vehicle control apparatus based on function.

FIG. 6 is a function block diagram which represents the configuration of the vehicle control apparatus shown in FIG. 1 based on function, and each section is made up of a CPU 11, a ROM 12 and a RAM 13, functions shown therein being executed by software.

A vehicle information acquiring section 31 acquires vehicle information such as a model type of the subject vehicle, its grade, the details of equipment mounted thereon and the like based on information stored in the ROM 12, which is a non-volatile memory, or information from a vehicle information center 21 for input into an operating state estimating section 39 and a safety function confirming section 37. An environment information acquiring section 32 acquires road information, weather information, road surface information and the like of respective areas lying before the goal which are acquired by the car navigation unit 3 based on information from the vehicle information center 21 and other vehicle 22 for input into a degree-of-risk calculating section 36 and the operating state estimating section 39.

In addition, a battery state acquiring section 33 acquires charging rate, voltage, current, internal resistance, battery fluid temperature and the like of the battery 6 from the battery management unit 2 for input into the operating state estimating section 39, and an electric equipment state acquiring unit 34 acquires an activating state and driving state of various electric equipment for input into the operating state estimating section 39.

Furthermore, a driver's intention acquiring section 35 detects the switched state of the operation mode selection switch 10 to thereby detect which operation mode of the "sports," "normal," and "economy" modes is selected by the driver for input into the operating state estimating section 39. Note that this operation mode may be detected not by the switch but by acceleration and brake signals.

In addition, the degree-of-risk calculating section 36 calculates a degree of risk based on road information, weather information, road surface information and the like on a driving route to the goal which are inputted from the environment information acquiring section 32, sets a point whose degree of risk so calculated is equal to or greater than a predetermined degree of risk as a point where a unique charging or discharging is expected to occur and inputs the point so set into the safety function confirming section 37 together with the details of the degree of risk. Then, the safety function confirming section 37 confirms safety functions which are required at respective points where a unique charging or discharging is expected to occur, inputs whether or not expected risks at the respective points can be dealt with, equipment used to provide the necessary safety functions, and quantity of current used by the equipment into the operating state estimating section 39 based on the vehicle information, and inputs whether the expected risks at the respective points can be deal with into an alternative availability judging section 38.

In addition, the alternative availability judging section 38 judges whether alternative section are available in the event that the expected risks at the respective points where the unique charging or discharging is expected to occur cannot be dealt with by the vehicle equipment and inputs whether the expected risks at the respective points can be dealt with, the equipment to be used and a quantity of current to be used by the equipment into the operating state estimating section 39.

Then, the operating state estimating section 39 judges whether the battery holds a quantity of electrical energy necessary for the safety functions at the respective points where the unique charging or discharging is expected to occur based on the state of the battery, the driving conditions of electric equipment, environment information and the results of the judgments at the safety function confirming section 37 and the alternative availability judging section 38 to thereby judge whether or not to impose a restriction on feeding to the electric equipment and intervene in the charging control of the battery and inputs the results of the judgment into an operating state estimation result informing section 40. This operating state estimation result informing section 40 gives information on whether or not expected risky conditions can be dealt with and instructions to impose a restriction on feeding to the electric equipment and intervene in the charging control of the battery to the battery management unit 2, the car navigation unit 3 and the like.

Figure 7A:
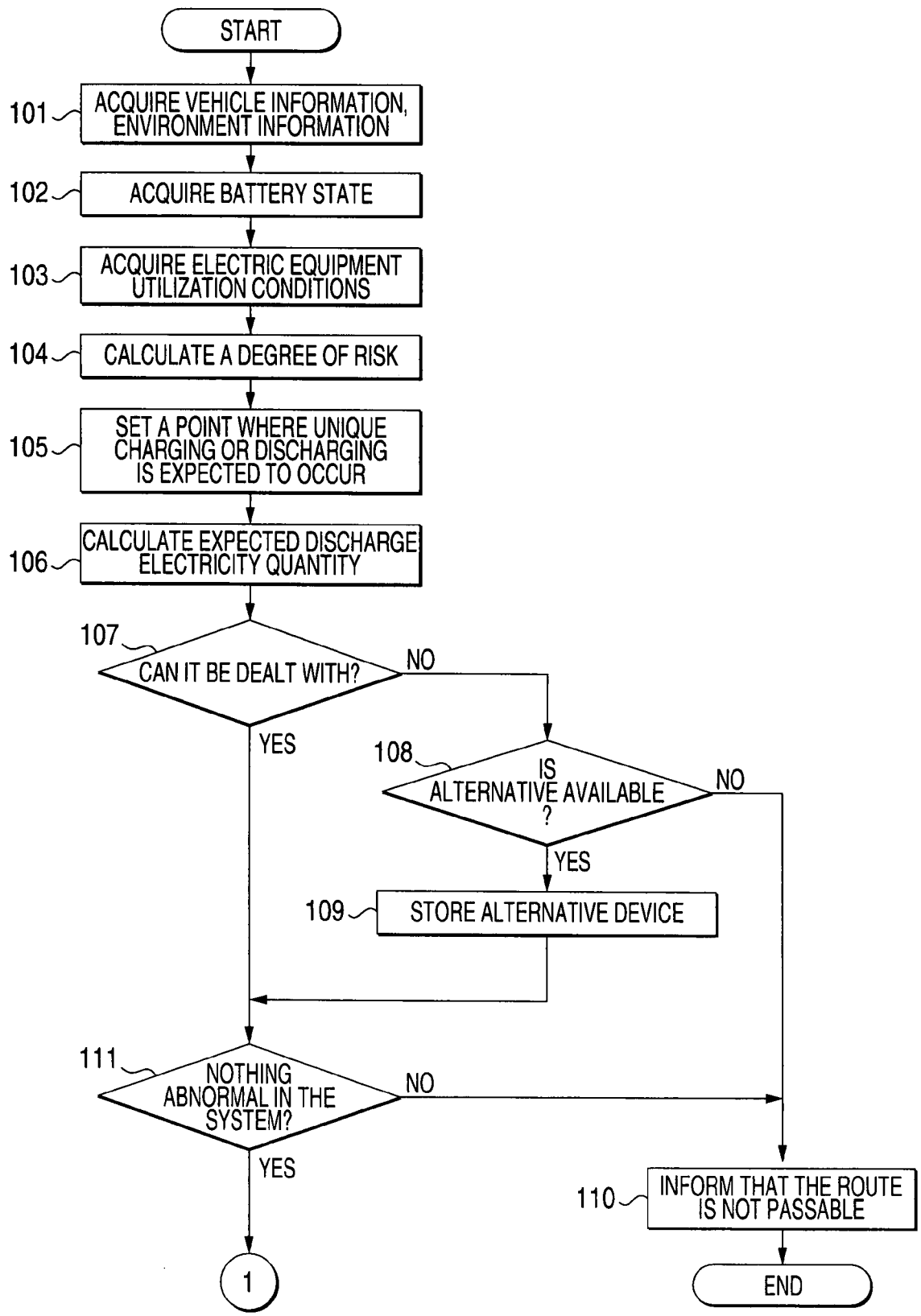
FIG. 7(A) is a flowchart which shows the function of the vehicle control apparatus.
Figure 7B:
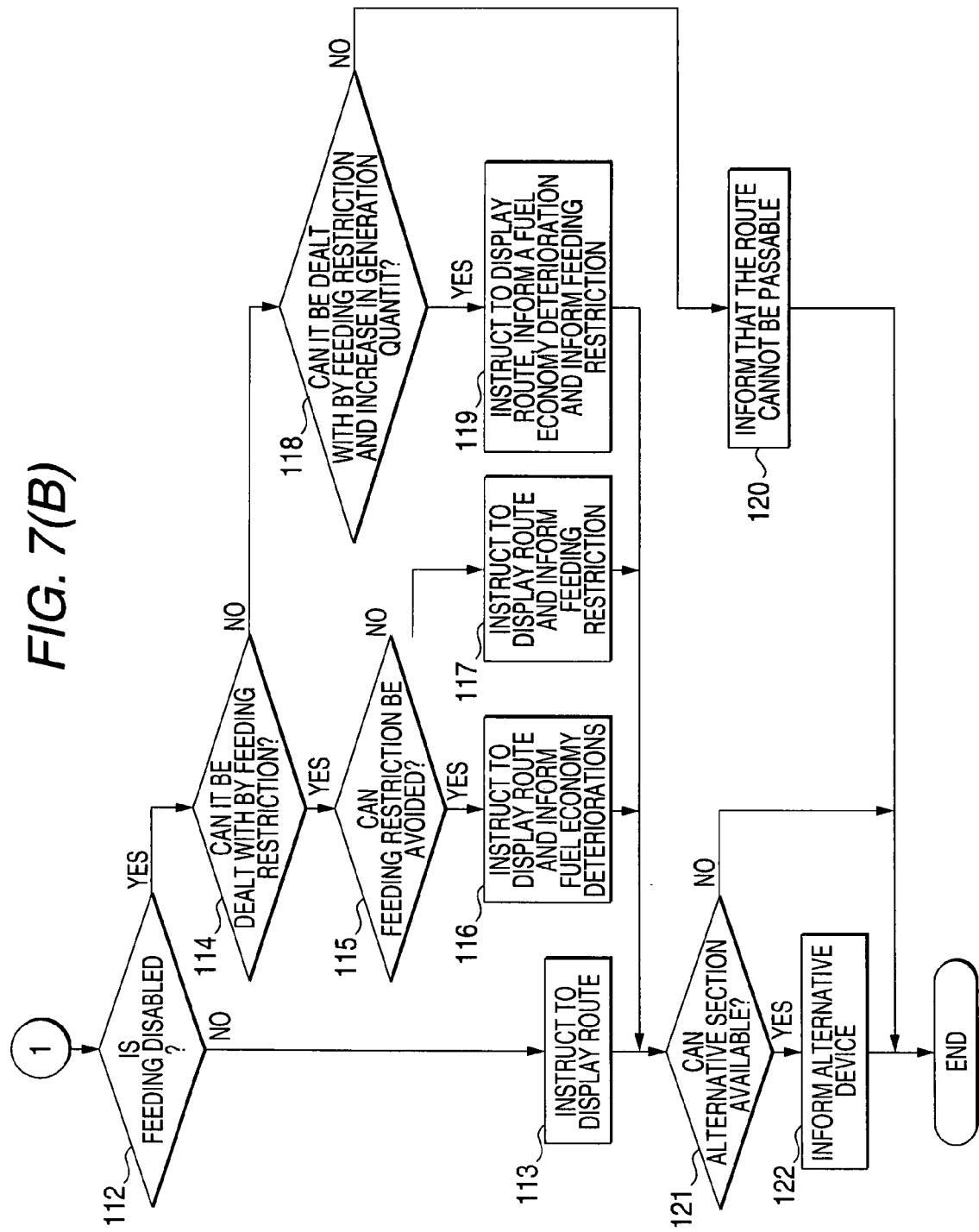
FIG. 7(B) is a flowchart which shows the function of the vehicle control apparatus.

Next, the functions of the functional sections of the vehicle control apparatus 1 will be described using the block diagram shown in FIG. 1 and flowcharts shown in FIGS. 7(A), 7(B).

When the driver sets a goal on the car navigation system 3, the CPU 11 of the vehicle control apparatus 1 starts a program to judge whether or not a risk avoidance is enabled or risk avoidance enablement judging program. Firstly, the list of vehicle equipment shown in FIG. 2 is acquired based on the information stored in the ROM 12 or the information from the vehicle information center 21, and environment information on a driving route to the goal is acquired, as is shown in FIG. 8, from road information, weather information, road surface information and the like on the driving route to the goal based on information from the car navigation unit 3 (step 101).

Figures 8, 9, 10:
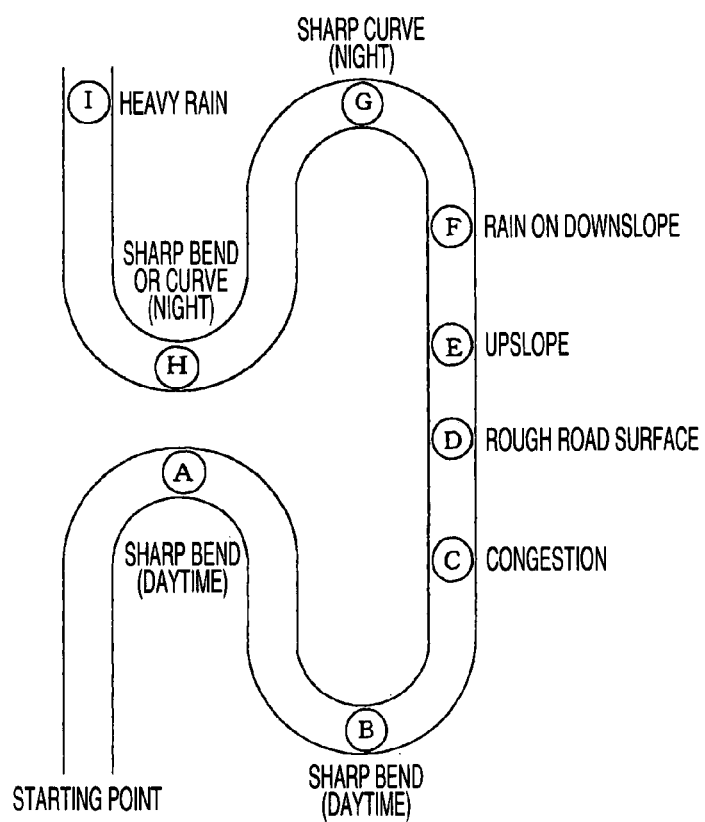
FIG. 8 is an example of a driving route to a goal which shows conditions of respective points thereon.
FIG. 9 is an example of battery conditions that are acquired by the vehicle control apparatus.
FIG. 10 is an example of expected quantities of electricity used by an EBD according to degrees of risk which are stored in the ROM.

Next, the CPU 11 acquires from the battery management unit 2, as is shown in FIG. 9, a battery state which is made up of charging rate, voltage, current, battery fluid temperature, internal resistance and a quantity of dischargeable current of the battery 6 (step 102) and acquires the state of electric equipment in use based on the activating conditions and driving conditions of the various electric equipment 4, 5, . . . (step 103).

Thereafter the CPU 11 calculates degrees of risk at respective points on the driving route to the goal using an accident risk level table shown in FIG. 3 which is stored in the ROM 12 based on driving environments such as environment information acquired in step 101 (step 104).

Namely, as for external environments (a), weather information on the driving route is extracted based on weather information and route information which are acquired via radio communication or the like, and thereafter, in the event that it is raining on the driving route, with a rain precipitation of 100 mm or more per hour, the level of rain is judged as a level 3, with 50 mm or more per hour, as a level 2, and with 30 mm or more per hour, as a level 1. In addition, in the event that it is snowing, with a fallen snow accumulation of 3 cm or more, the level of snow is judged as a level 3, with 2 cm or more, as a level 2, and with 1 cm or more, as a level 1. Furthermore, in the case of wind, with a wind speed of 30 m or faster, the level of wind is judged as a level 3, with a wind speed of 25 m or faster, as a level 2, and with a wind speed of 20 m or faster, as a level 1.

In addition, as for a driving state (b), the state of health of the driver is inputted into an on-board device by himself or herself by way of self-assessment. For example, in the event that the driver has a body temperature of 37 degrees or more, the health level of the driver is judged as a health level 3, in the event that the driver feels that he or she has a cold, then, the health level is judged as a health level 2, and in the event that the driver feels dull, the health level is judged as a health level 1. In addition, with a driving time of three hours or longer, the fatigue level of the driver is judged as a fatigue level 3, with a driving time of two hours or longer, the fatigue level is judged as a fatigue level 2, and with a driving time of one hour or longer, the fatigue level is judged as a fatigue level 1. Furthermore, with three times or more of drastic starts or panic brakes, the mental level of the driver is judged as a mental level 3, with twice or more of drastic starts or panic brakes, the mental level is judged as a mental level 2, and with once or more of drastic starts or panic brakes, the metal level is judged as a metal level 1.

Furthermore, as disturbances, degrees of risk are determined as for road surface conditions, area conditions, curve conditions, traffic conditions, up-slope/down-slope conditions and the like. As for road surface conditions, a road surface state of a driving route is extracted from a recording unit which stores road surface states of roads on which the vehicle has once been driven before when the driving route is set, or road surface information on the driving route is extracted from a recording unit at a center, not shown, which stores the road surface information of the roads which was recorded when other vehicles were driven thereon before through communication between the center and the vehicle via a radio wave communication or the like. Then, in the event that a road surface is rough as of an off-road rough terrain, the road surface state is judged as a level 3, in the event that the road surface is covered with pebbles, the road surface state is judged as a level 2, and in the event that the road surface is such as one that has just been paved, the road surface state is judged as a level 1.

In addition, as for area conditions, since the crowdedness of areas are recorded in advance together with map information, a crowdedness level of an area on the driving route is extracted therefrom when the driving route is set.

Furthermore, as for curve conditions, since curve information is recorded in advance together with the map information, curve information on the driving route is extracted when the driving route is set, or curve information on the driving route that was recorded in the recording unit at the center, not shown, when other vehicles were driven on the driving route and is now stored therein may be extracted from the recording unit through communication between the center and the vehicle via the radio wave communication or the like. Then, when a curve is recorded as R500, the curve level thereof is judged as a curve level 3, when the curve is recorded as R700, the curve level thereof is judged as a curve level 2, and when the curve is recorded as R1000, the curve level thereof is judged as a curve level 1.

In addition, traffic conditions are acquired from the VICS or radio, or from the recording unit at the center through communication between the center and the vehicle via the radio wave communication or the like, and based on the information so acquired, when a road is congested over 5 km or longer, the congestion level of the road is judged as a congestion level 3, when the road is congested over 3 km or longer, the congestion level is judged as a congestion level 2, and when the road is congested over 1 km or longer, the congestion level is judged as a congestion level 1.

Furthermore, as for up-slope and down-slope conditions, since information on up-slopes and down-slopes on the map is recorded in advance together with the map information, up-slope and down-slope information on the driving route is extracted when the driving route is set, or the up-slope and down-slope information may be extracted from the recording unit at the center, not shown, through communication between the center and the vehicle via the radio wave communication or the like. Then, when an up-slope or down-slope is 5 per cents or greater, the level of up-slope or down-slope is judged as a level 3, when the up-slope or down-slope is 3 per cents, the up-slope or down-slope level is judged as a level 2, and when the up-slope or down-slope is 2 per cents, the up-slope or down-slope level is judged as a level 1.

In addition, as for vehicle conditions (d), information on replacement timings of vehicle components such as tires, suspensions and shafts is stored in the storage unit, and when five years or more has now elapsed since the last replacement timing of those vehicle components, the vehicle conditions level is regarded as a level 3, when four years or more has now elapsed, the vehicle conditions level is regarded as a level 2, and when 3 years or more has elapsed, the vehicle conditions level is regarded as a level 1.

Then, scores which correspond to the levels of the respective events that have been described above are extracted, and a degree of risk [%] is obtained from a total value of the scores of the respective events, so as to calculate a degree of risk at points to the goal, whereafter in the points, those whose degree of risk so calculated is equal to or greater than a predetermined degree of risk are set as points A to I where a unique charging or discharging is expected to occur as shown in FIG. 8 (step 105). Note that when setting the points where the unique charging or discharging is expected to occur, in place of the degrees of risk which are calculated from the total value of the scores which correspond to the levels of the respective events, the degrees of risk based on the respective events such as curves, traffic congestions, road surface conditions, up-slopes, down-slopes, rain, snow, wind and the like on the driving route may be used, and the points whose degree of risk based on the events is the level 3 or higher may be set as the points where the unique charging or discharging is expected to occur.

When the points are set where the unique charging or discharging is expected to occur, the CPU 11 calculates expected quantities of electricity which is discharged by the systems which are activated to operate depending on the degrees of risk at the respective points on the driving route where the unique charging or discharging is expected to occur according to the degrees of risk (step 106). For example, in the case of the EBD (electronically controlled brake force distribution system), as shown by an example shown in FIG. 10, expected quantities of electricity which is used by the EBD according to the degrees of risk are stored in the ROM 12, and an expected quantity of electricity which is discharged according to the degree of risk by the activated system is calculated for each of the points where the unique charging or discharging is expected to occur, as is shown in FIG. 11.

Figure 12:
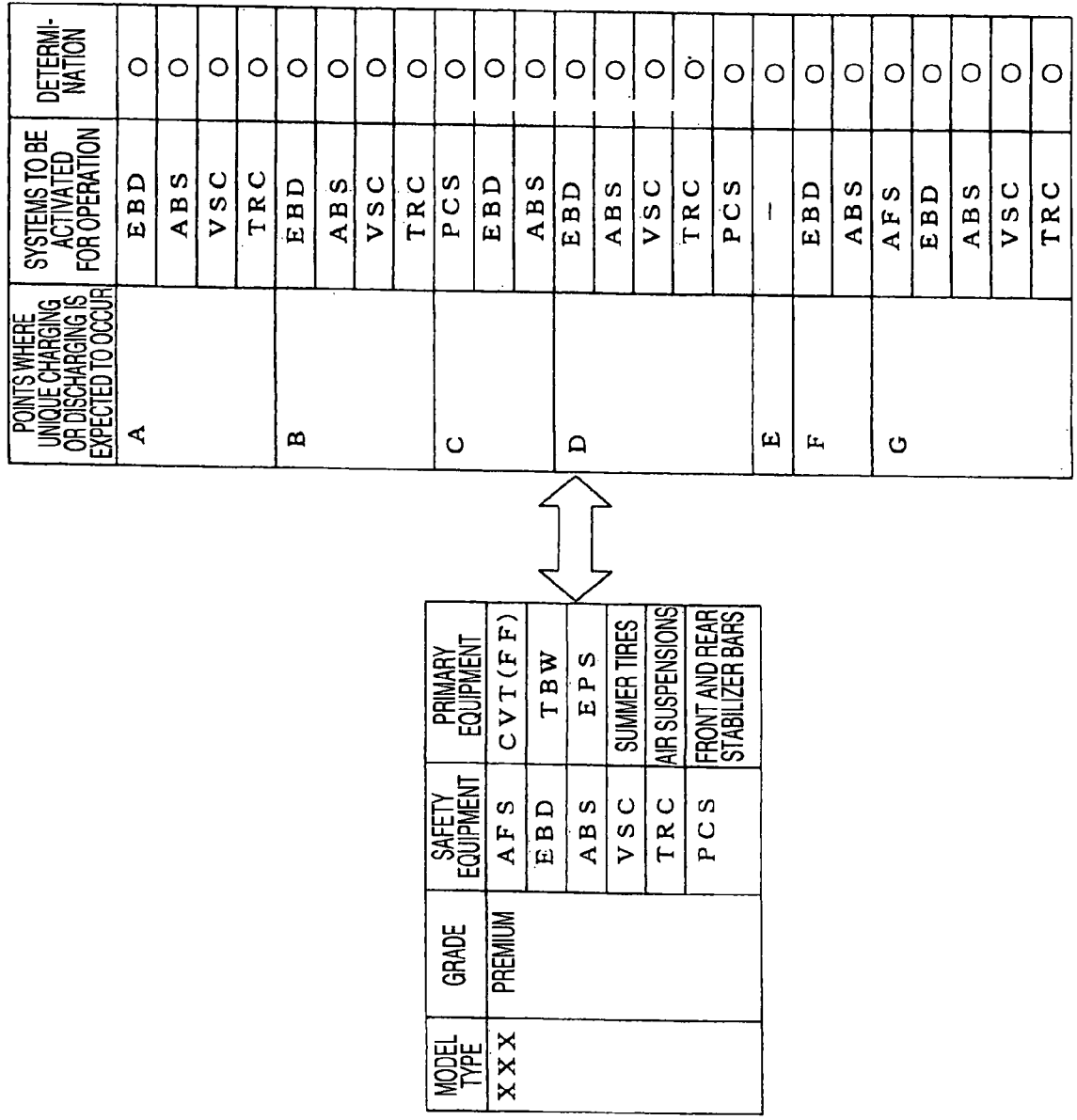
FIG. 12 is an example of the results of determination on whether or not a risk can be avoided by comparison between the safety systems equipped on the vehicle and the safety systems that are activated to operate according to the risky conditions.

Next, the CPU 11 determines whether or not risky conditions at the respective points on the driving route to the goal where the unique charging or discharging is expected to occur can be dealt with by the systems equipped on the vehicle (step 107). Namely, as is shown in FIG. 12, the CPU 11 determines whether or not the vehicle is equipped with the systems which are required to pass through the respective points on the driving route to the goal where the unique charging or discharging is expected to occur and determines whether or not expected risks at those points can be avoided by comparing the table shown in FIG. 4 which shows the systems which are adapted to be activated to operate at the respective points where the unique charging or discharging is expected to occur and the list shown in FIG. 2 which shows the systems which are equipped on the vehicle.

If it is determined in step 107 that the risky conditions cannot be dealt with by the systems equipped on the vehicle, the CPU 11 determines whether or not alternative section listed in FIG. 13(a) as replacing the corresponding systems can replace systems which are required to cope with the risky conditions (step 108). For example, due to a slip being anticipated at a curve, when passing through a heavily raining area and when passing through a road whose surface is rough, although it is judged that the TRC (traction control) and the VSC (skid preventing function) are necessary, in the event that the vehicle is not equipped with the TRC and VSC, the CPU 11 judges whether or not the functions of the TRC and VSC can be replaced by driving control by other devices equipped on the vehicle. As controls for preventing a skid, resting the vehicle speed, controlling the AT to use lower speed gears (to increase the effect of the engine brake and suppress the usage of the foot brake), restricting the acceleration by the TBW (electronic throttle control) and the like are raised, and the CPU 11 judges whether or not these controls can be executed as vehicle control, so as to obtain the results of the judgment as shown in FIG. 13(b).

In the event that the degree of risk is equal to or greater than a predetermined value or is equal to or greater than 80[%], the CPU 11 judges that a safe driving of the vehicle cannot be achieved with the alternative section and determines that no alternative section is available.

If it is judged in step 108 that alternative section is available, the CPU 11 stores alternative section which are used at the respective points where the unique charging or discharging is expected to occur in the RAM 13 (step 109), whereas if it is judged that no alternative section is available, the CPU 11 instructs the car navigation unit 3 to display the driving route and indicate that the driving route is not partially passable (step 110) and ends the program. As a result of the instruction, the driving route is displayed on a display screen of the car navigation unit 3 and a message reading, for example, "this route is not recommendable" is also displayed on the relevant screen.

Then, if it is determined in step 107 that the risky conditions can be dealt with by the systems which are equipped on the vehicle, or after storing the alternative section in step 109, the CPU 11 determines whether or not there is occurring anything abnormal in the systems (step 111), and if it is determined that there is occurring something abnormal in the systems, the CPU 11 instructs the car navigation unit 3 to display the driving route and indicate that the driving route is not partially passable (step 110).

Namely, the CPU 11 determines whether or not the necessary systems and alternative section for passage through the respective points lying before the goal fail by checking diagnosis codes thereof to thereby determine whether or not there exists anything abnormal in the systems. Then, if there exists something abnormal in the systems, the CPU 11 instructs the car navigation unit 3 to display the driving route and indicate that the driving route is not partially passable.

In addition, in this case, the replacement date of tires of the subject vehicle may be informed in advance to the vehicle information center 21, so that the abnormality of the systems is judged including the deterioration of the tires based on the number of days or the like which have elapsed since the last tire replacement date, which is given as a result of an inquiry to the information center 21 made when the abnormality is determined to be occurring in the systems.

If judging that there exists no abnormality in the systems, the CPU 11 determines whether or not feeding is disabled by the operation of the systems or alternative section necessary for passage through the respective points where the unique charging or discharging is expected to occur (step 112).

Namely, as is shown in FIG. 14(a), the CPU 11 reads out road information such as the road is straight-line, curved or up-slope and a weather condition for each area on the driving route to the goal from the RAM 13, estimates based thereon a driving mode for each area as shown in FIG. 14(b) to store it in the RAM 13 and, thereafter, as is shown in FIGS. 14(c), (d), estimates an engine speed and an average quantity of generation by the alternator for each area based on the environment information and the estimated driving mode for each area to store them in the RAM 13.

Next, the CPU 11 estimates a quantity of electricity used by the electric equipment for each area, as is shown in FIG. 14(f), based on consumed power of the pieces of electric equipment 4, 5, . . . which are currently in use and the environment information so read out and stores the quantity so estimated in the RAM 13.

Thereafter, the CPU 11 estimates from the quantity of electricity generated by the alternator (d) and a quantity of electricity, shown in FIG. 14(e) and estimated in step 106, that is to be used by the safety systems or alternative section which are expected to be activated for operation at the respective points where the unique charging or discharging is expected to occur, that is, the quantity of electricity used by the safety system (e) and the quantity of electricity used by the electric equipment (f) a quantity of electricity that is to be charged to the battery 6 {=the quantity of electricity generated by the alternator (d)–the quantity of electricity used by the safety systems (e)–the quantity of electricity used by the electric equipment (f)} and estimates, as is shown in FIG. 14(h), a battery state for each area, that is, a quantity of dischargeable electricity from a quantity of currently dischargeable electricity and the quantity of electricity to be charged to the battery (g) to store it in the RAM 13.

Then, in step 112, the CPU 11 determines whether or not the quantity of dischargeable electricity (h) for each area becomes a negative value to thereby judge for each of the points where the unique charging or discharging is expected to occur whether or not feeding is disabled, as is shown in FIG. 14(i).

Figure 14:
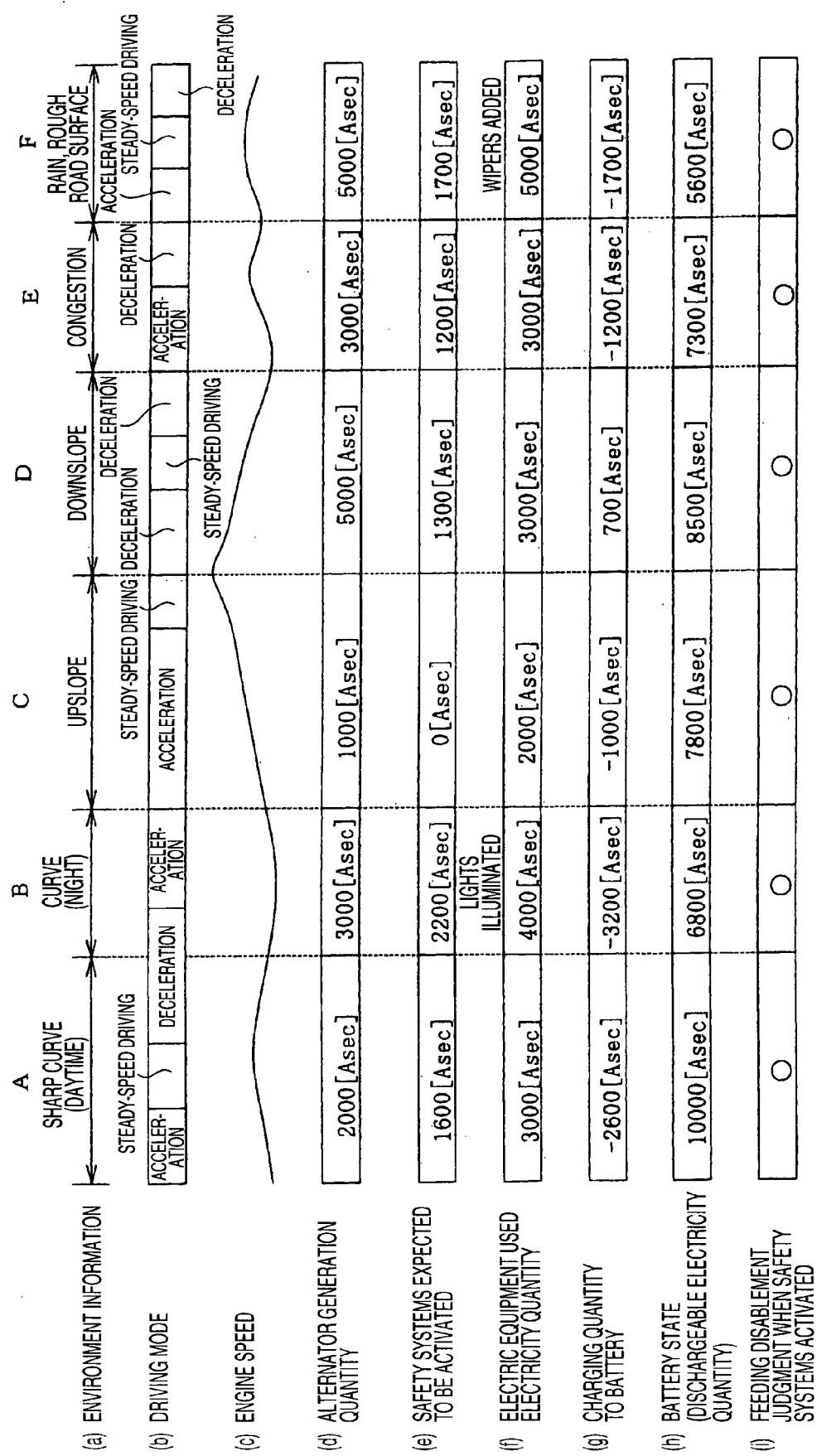
FIG. 14 is examples of driving conditions showing environment conditions at respective points to the goal, charging or discharging conditions of the battery and the results of determination on disablement of feeding.
Figure 15:
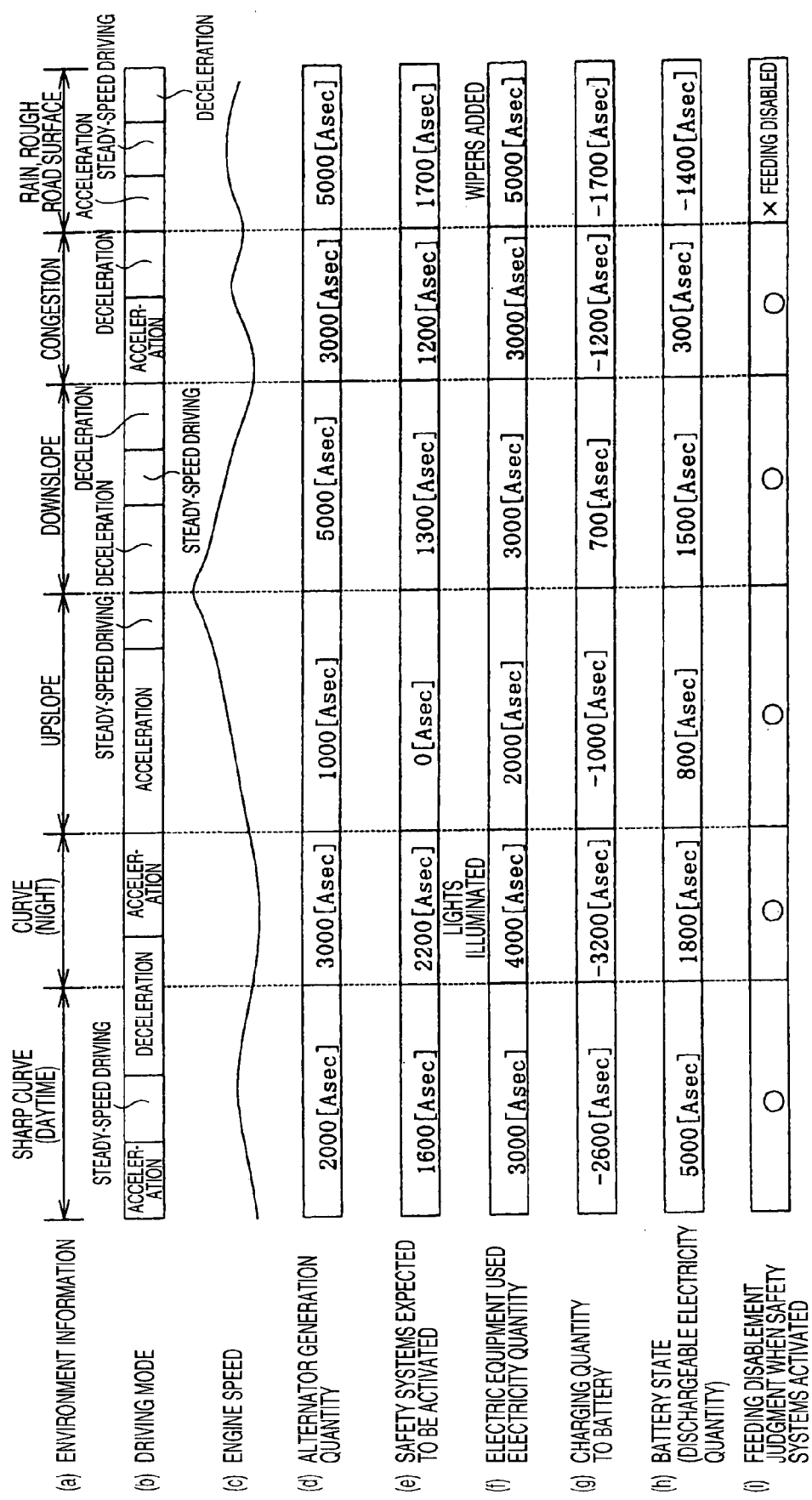
FIG. 15 is examples of driving conditions under which feeding disablement results.

In the state shown in FIG. 14, since the quantity of dischargeable electricity resulting when the driving route is set is 12600 [Asec], it is determined that feeding is not disabled at all the points where the unique charging or discharging is expected to occur. In the event that the quantity of dischargeable electricity resulting when the driving route is set is 7600 [Asec], however, feeding is disabled as is shown in FIG. 15.

If determining in step 112 that feeding is not disabled, the CPU 11 instructs the car navigation unit 3 to display the driving route (step 113), whereas if determining that feeding is disabled, the CPU 11 determines whether or not the disablement of feeding can be dealt with by imposing a restriction on feeding (step 114).

Namely, the CPU 11 decides whether or not there exist any devices of those equipped on the vehicle to which a load restriction can be applied from the order of preference of selection of the respective devices and required power for operation thereof at the respective levels in the table shown in FIG. 5 which is stored in the ROM 12 and which shows the order of preference of selection and consumed power of the respective devices equipped on the vehicle. For example, in the event that a shortage of feeding in power is 60 W, a load restriction is applied to the lights, and when the lights are not in use, the CPU 11 executes the load restriction determination on the device which is in the second lowest position in the order of preference of selection, that is, the navigation unit 3. In the event that the CPU 11 judges that feeding is disabled even though the load restriction is so imposed, the CPU 11 determines that the anticipated feeding disablement cannot be dealt with by the restriction on feeding.

Figure 16:
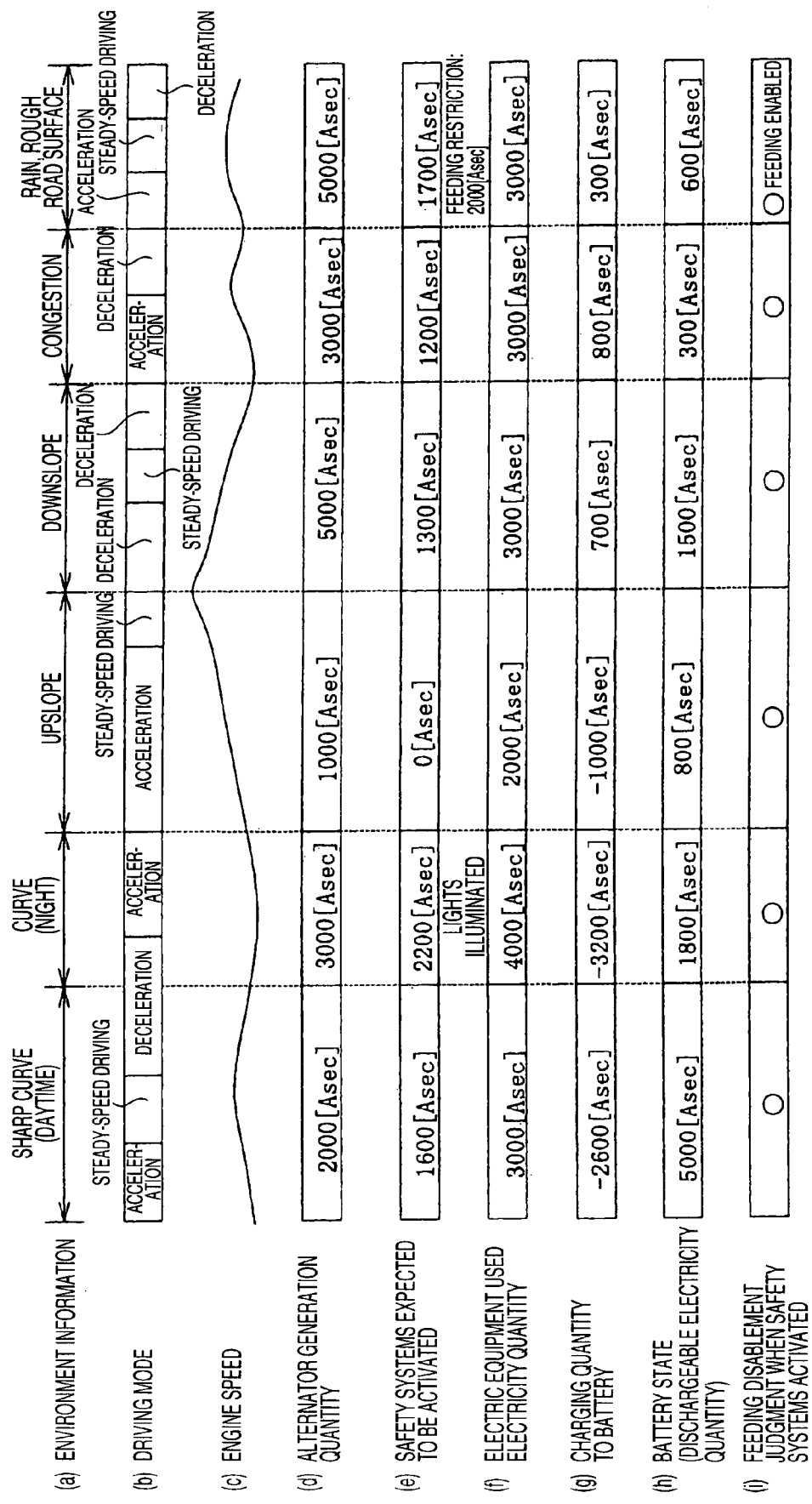
FIG. 16 is examples of driving conditions under which an insufficient electrical energy problem of the battery can be deal with by feeding restriction.

By this configuration, for example, as is shown in FIG. 16, in the event that the CPU 11 judges that a feeding restriction of 2000 [Asec] is enabled in a "rain and rough road surface" area, the CPU 11 determines that the anticipated feeding disablement can be dealt with by the feeding restriction.

Figure 17:
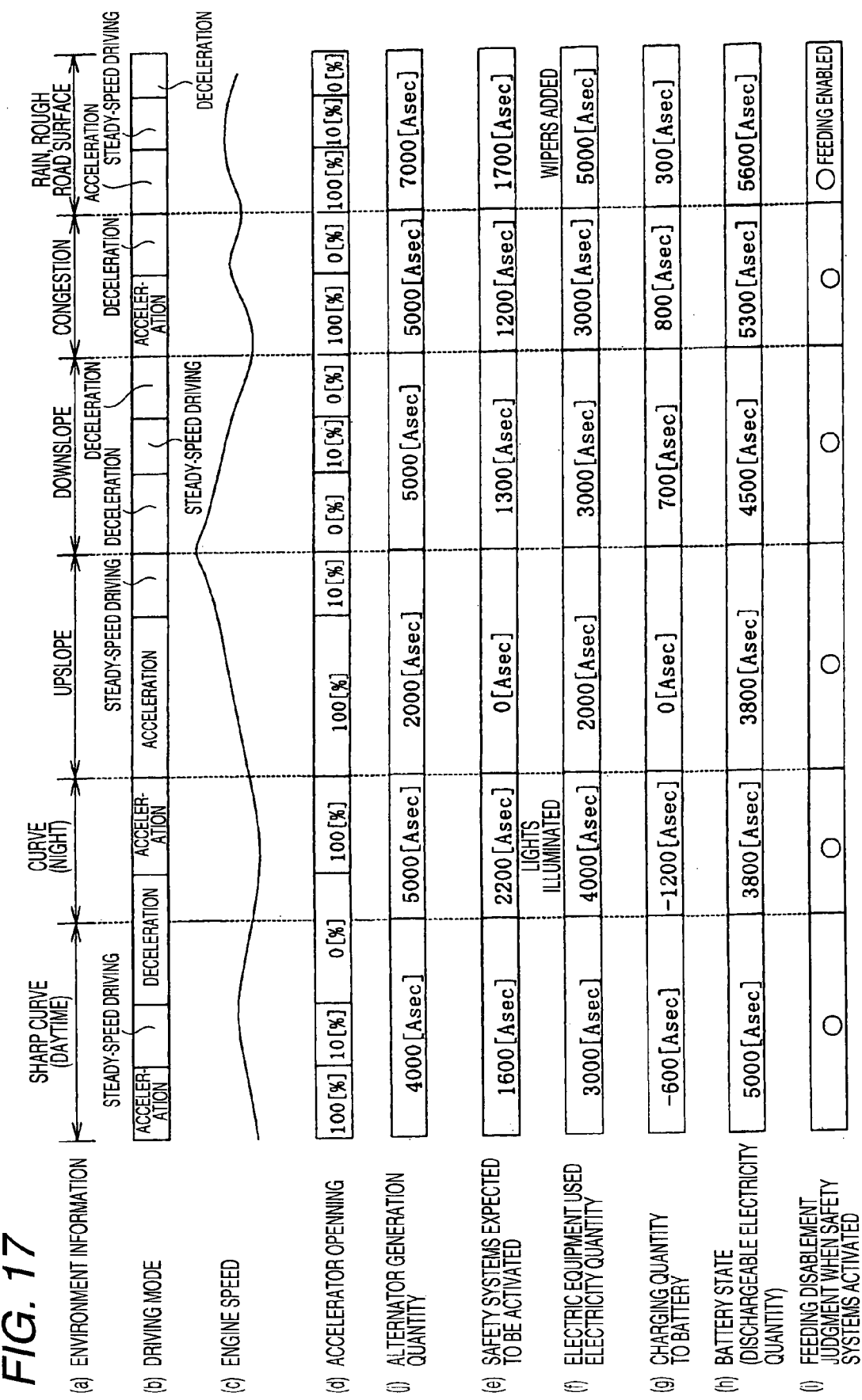
FIG. 17 is examples of driving conditions under which the insufficient electrical energy problem of the battery can be deal with by increasing the quantity of current to be generated.

If determining in step 114 that the anticipated feeding disablement can be dealt with by the feeding restriction, the CPU 11 determines whether or not the feeding restriction can be avoided by increasing the quantity of electricity that is generated (step 115). Namely, although normally the driving mode is in an acceleration mode, the generation of electricity is cut off, by switching the control of the battery management unit 2 to generate electricity even at the time of acceleration, the quantity of electricity generated by the alternator 7 can be increased as is shown in FIG. 17, and therefore, the CPU 11 determines whether or not the feeding restriction can be avoided by the increase in the quantity of electricity generated by the generator 7.

Then, if determining in step 115 that the feeding restriction can be avoided by increasing the quantity of generation of electricity, the CPU 11 instructs the car navigation unit 3 to display the driving route and inform the driver of a deterioration in fuel economy and instructs the battery management unit 2 to increase the quantity of generation of electricity (step 116). Namely, since the fuel economy is deteriorated when the electricity generation quantity by the alternator 7 is increased, the driving route is made to be displayed on the display screen of the car navigation unit 3, and a message reading, for example, "driving on this route may cause a possibility that fuel economy is deteriorated" is made to be displayed on the display screen so as to inform the driver of an anticipated deterioration in fuel economy.

Figure 18:
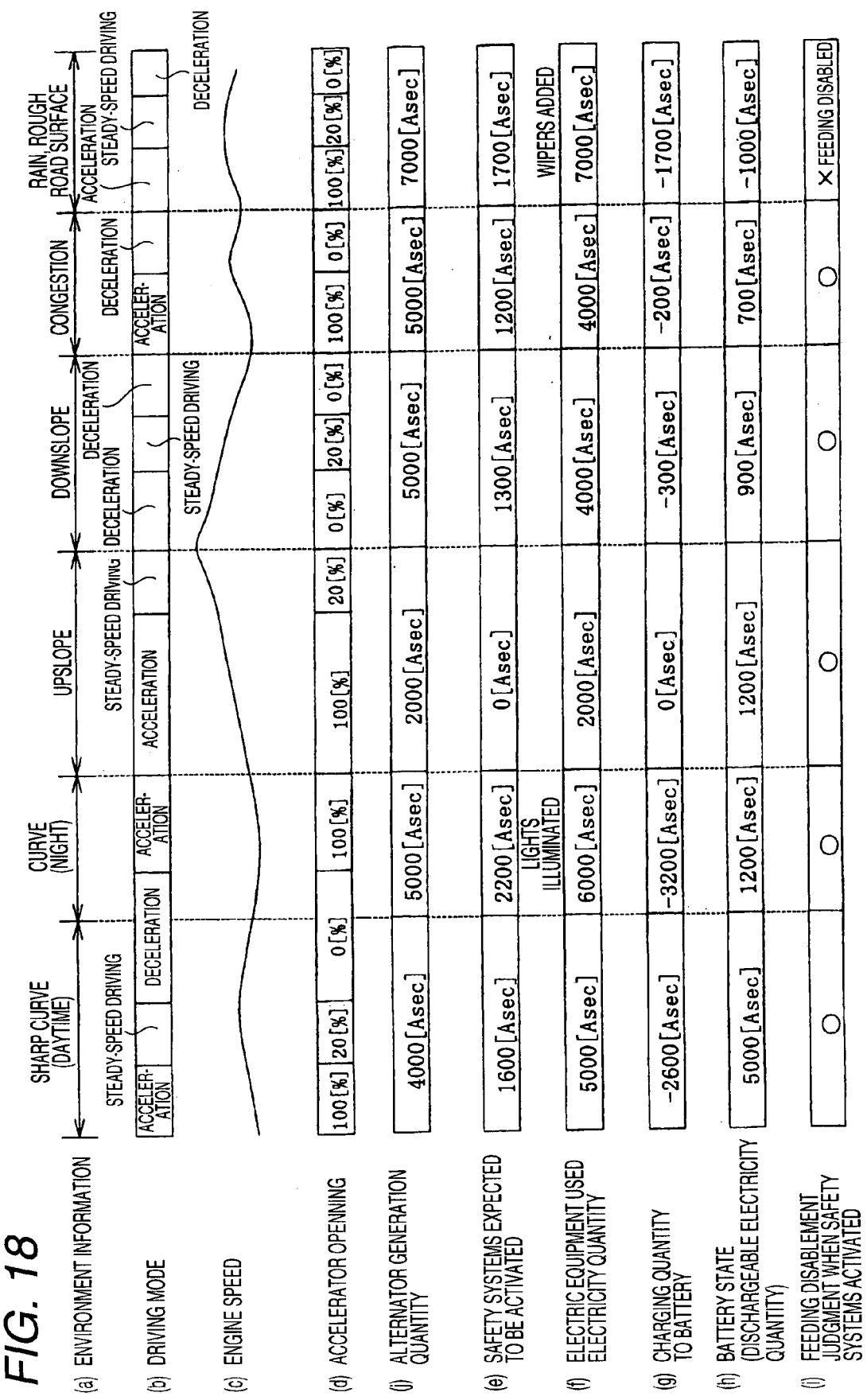
FIG. 18 is examples of driving conditions under which feeding is disabled despite the increase in quantity of current to be generated.

In addition, as is shown in FIG. 18, if determining in step 115 that feeding is disabled even though the quantity of electricity to be generated is increased due to the quantity of electricity used by the electric equipment being large, the CPU 11 instructs the car navigation unit 3 to display the driving route and inform the driver of there being executed a feeding restriction and instructs the battery management unit 2 to inform the driver of an area where the feeding restriction will be executed and the equipment on which the feeding restriction will be imposed (step 117). By this configuration, the driving route is displayed on the display screen of the car navigation unit 3 and a message reading, for example, "driving on this route may cause a possibility that a feeding restriction is imposed on an air conditioner" is also displayed on the display screen.

On the other hand, if determining in step 114 that the feeding disablement cannot be dealt with by the feeding restriction, the CPU 11 determines whether or not the feeding disablement can be dealt with by the feeding restriction and the increase in quantity of electricity to be generated (step 118), and if the CPU 11 determines that the feeding disablement can be dealt with by executing both the feeding restriction and the increase in quantity of electricity to be generated, the CPU 11 instructs the car navigation unit 3 to display the driving route and inform the driver that there will be executed a feeding restriction and caused a deterioration in fuel economy and instructs the battery management unit 2 to increase the quantity of electricity to be generated and inform the driver of an area where the feeding restriction will be executed and the equipment on which the feeding restriction will be imposed (step 119).

In addition, if determining that the feeding disablement cannot be dealt with by executing both the feeding restriction and the increase in quantity of electricity to be generated, the CPU 11 instructs the car navigation system 3 to display the driving route and indicate that there is an area on the driving route which is not passable (step 120) and, thereafter, ends the program. By this configuration, as with what has already been described above, the driving route is displayed on the display screen of the car navigation unit 3, and a message reading, for example, "this route is not recommendable" is displayed on the display screen.

Then, after having given the instructions to the car navigation unit 3 in steps 113, 116, 117 and 119, the CPU 11 determines whether or not it has judged in step 108 that the alternative section is used (step 121), and if the CPU 11 has judged that the alternative section is used in the step, the CPU 11 informs other control mechanisms of the usage of the alternative section stored in the RAM 13 together with an area where the alternative section will be used (step 122), whereby the alternative section will automatically be used in the area where the alternative section is used.

As has been described heretofore, the environment information such as road information, weather information, road surface information on the driving route to the goal is acquired from the navigation unit 3 and the like, the points whose degree of risk calculated based on the environment information so acquired is equal to or greater than the predetermined degree of risk are set as the points where the unique charging or discharging is expected to occur, and thereafter, whether or not the battery still holds the quantity of electrical energy necessary for the safety functions which are required at the respective points so set is judged. Consequently, in the event that the battery does not hold a sufficient quantity of electrical energy, an expected risk can be informed to the driver before he or she is aware that the safety functions do not work properly.

In addition, the CPU estimates the quantity of electricity used by the safety functions or the alternative section which are expected to be activated for operation at the respective points where the unique charging or discharging is expected to occur so as to determine whether or not the feeding disablement occurs, and in the event that it is judged that the feeding is disabled, the CPU judges whether or not the vehicle can be driven safely with the safety functions or the alternative section in properly operation by restricting the feeding or increasing the quantity of electricity to be generated. Consequently, whether or not the quantity of electrical energy of the battery will be insufficient can be judged accurately.

Note that while in the embodiment that has been described heretofore, the risk avoidance enablement judging program is described as being started when the goal point is set in the navigation unit 3 by the driver, in the event that there occurs an alteration in the driving route or a change in operating conditions of the equipment, or when, a predetermined period of time has elapsed or a predetermined mileage has been covered by the vehicle, the risk avoidance enablement judging program is desirably executed again.

In addition, while in the embodiment, the area or the driving route is displayed as not passable in the event that the risky conditions in the area cannot be dealt with properly or the feeding disablement cannot be avoided, it is possible to cause the car navigation unit to automatically retrieve other possible driving routes in the event that the risky conditions cannot be dealt with properly or the feeding disablement cannot be avoided.

Furthermore, while in the embodiment, the vehicle control apparatus of the invention, the car navigation unit and the battery management unit are provided individually, the function of the vehicle control apparatus of the invention can be incorporated into the car navigation unit, and the function of the vehicle control function of the invention can be incorporated into the battery management unit.

Embodiment 2

In the above embodiment, while when it is judged that there exits a possibility that feeding disablement may happen, the possible feeding disablement is dealt with by both the feeding restriction and increase in quantity of electricity to be generated, it is also possible to make the driver select a preference of one over another between fuel economy and drivability. Hereinafter, an embodiment will be described in which the driver is allowed to select a preference of one over another between fuel economy and drivability.

Note that since a system configuration drawing is the same as FIG. 1, the description of the configuration of a system will be omitted.

Figure 19A:
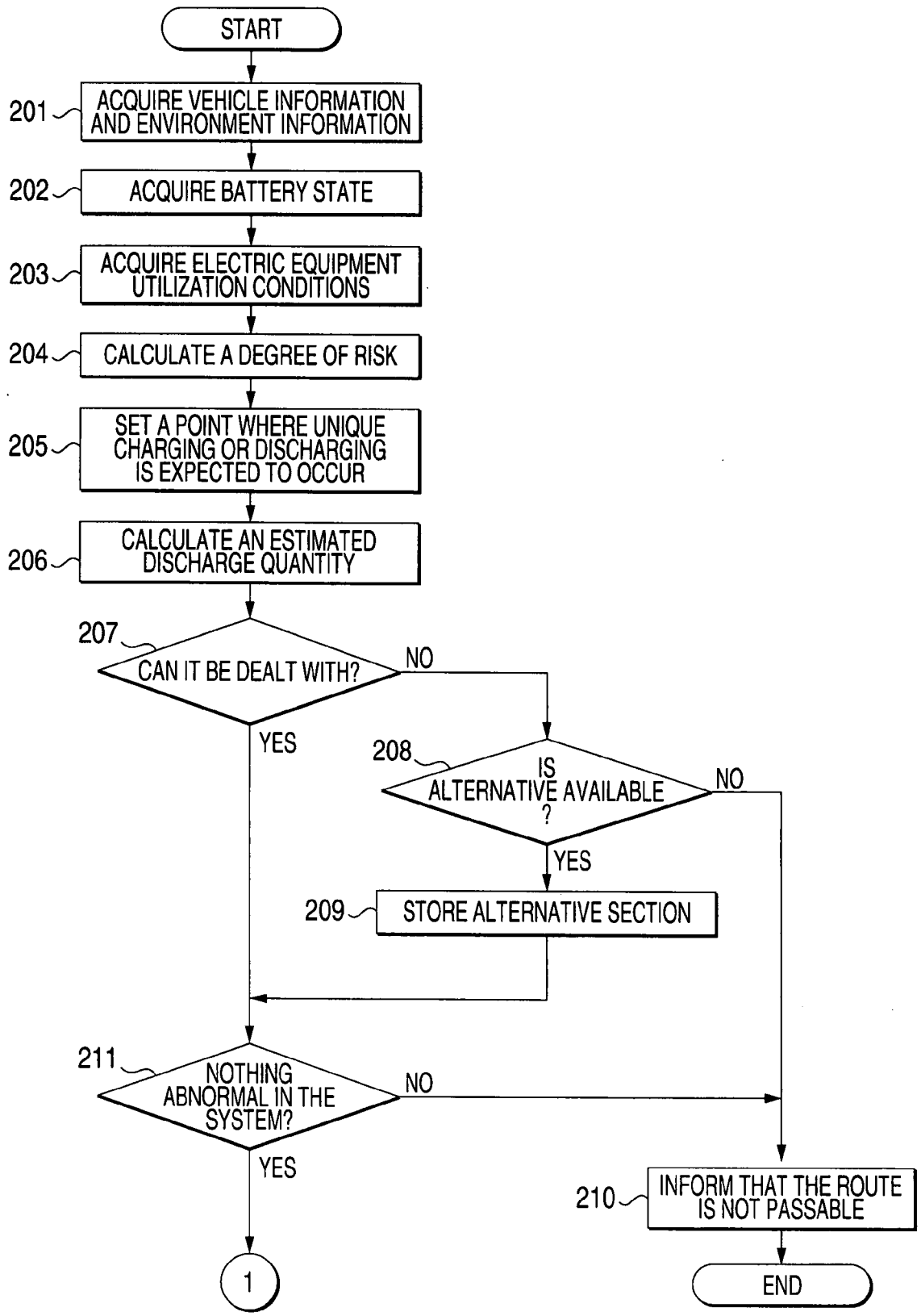
FIG. 19(A) is a flowchart which shows the function of a vehicle control apparatus according to another embodiment when judging whether or not a risk can be avoided.
Figure 19B:
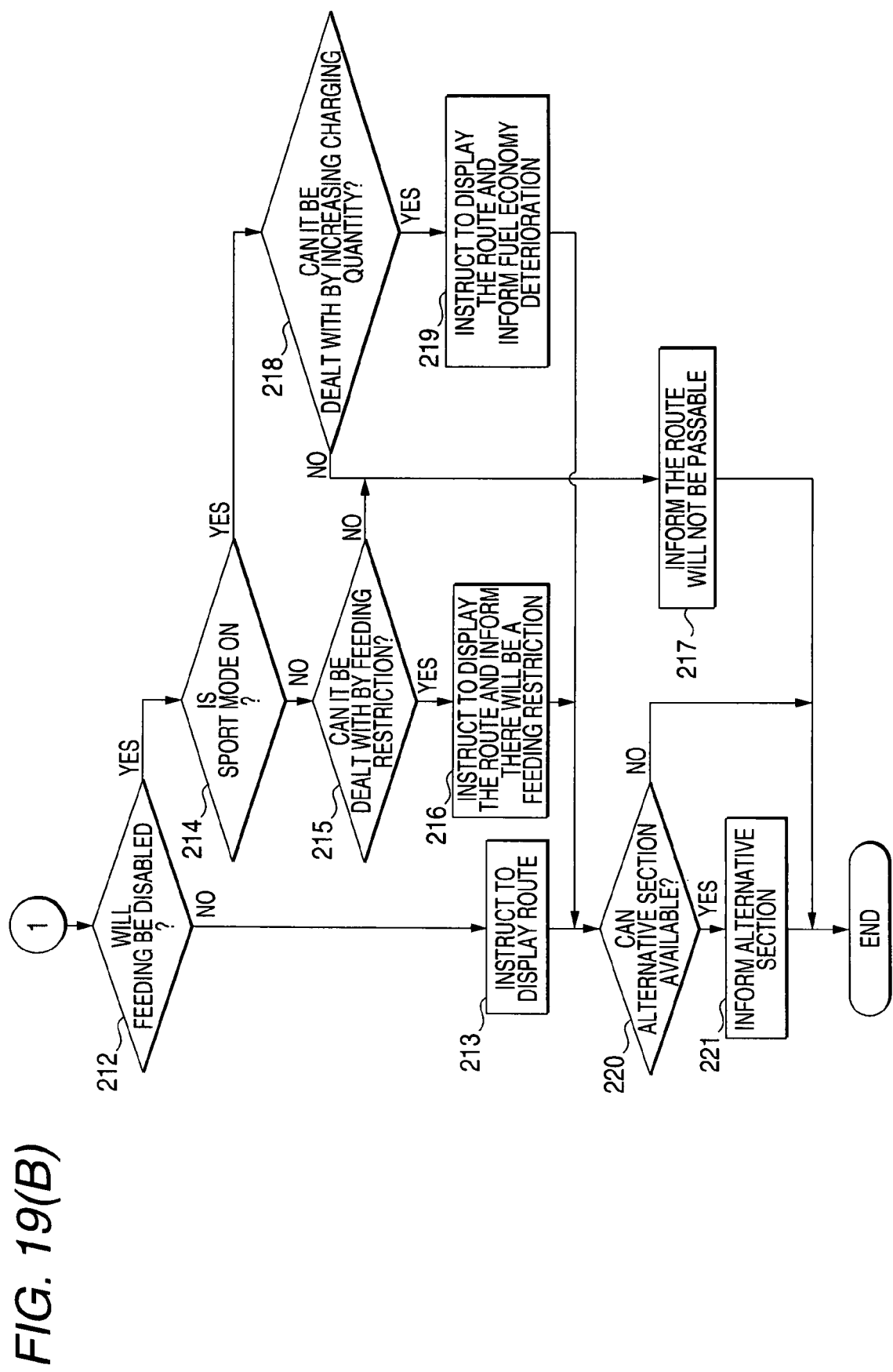
FIG. 19(B) is a flowchart which shows the function of a vehicle control apparatus according to a further embodiment when judging whether or not a risk can be avoided.

Hereinafter, the function of a vehicle control apparatus 1 of this embodiment when judging a risk avoidance enablement will be described by the use of the block diagram of FIG. 1 and flowcharts in FIGS. 19(A), 19(B).

When the driver sets his or her goal in a car navigation system 3, while a CPU 11 of the vehicle control apparatus 1 starts a risk avoidance enablement judging program shown in the flowcharts of FIGS. 19(A), 19(B), functions in steps 201 to 213 and steps 220, 221 are the same as the functions in steps 101 to 113 and steps 121, 122 of the flowcharts shown in FIGS. 7(A), 7(B), the description thereof will be omitted, and only functions in steps 214 to 219 will be described.

If it is determined in step 212 that a feeding disablement will occur, the CPU 11 detects which driving state or mode of "sports," "normal," and "economy" modes is being selected by the driver from the switched state of a driving mode selection switch 10 and determines whether or not the "sport" mode is being selected as the driving mode (step 214).

If determining that the "normal" or "economy" mode is being selected by the diver, the CPU 11 determines whether or not the anticipated feeding disablement can be dealt with by a feeding restriction (step 215), and if determining that the feeding disablement can be dealt with by the feeding restriction, the CPU 11 instructs the car navigation unit 3 to display a driving route and inform the driver of there being a feeding restriction and informs a battery management unit 2 of an area where the feeding restriction will take place and equipment on which the feeding restriction will be imposed (step 216).

In addition, if determining that the feeding disablement cannot be deal with by the feeding restriction, the CPU 11 instructs the car navigation unit 3 to display the driving unit and indicate a message that there will be an area on the set driving route which is not passable (step 217).

On the other hand, if determining in step 214 that the "sport" mode is being selected by the driver, the CPU 11 determines whether or not the anticipated feeding disablement can be dealt with by increasing a quantity of electricity to be generated (step 218), and if determining that the feeding disablement can be dealt with by increasing the quantity of electricity to be generated, the CPU 11 instructs the car navigation unit 3 to display the driving route and inform the driver that the fuel economy will be deteriorated and instructs the battery management unit 2 to increase the quantity of electricity to be generated (step 219). On the contrary, if determining that the feeding disablement cannot be dealt with by the increase in the quantity of electricity to be generated, the CPU 11 instructs the car navigation unit 3 to display the driving route and indicate a massage that there will be an area on the set driving route which is not passable (step 217).

As has been described heretofore, since by allowing the driver to select his or her preference of one over another between fuel economy and drivability, whether or not feeding disablement can be dealt with by the feeding restriction or the increase in the quantity of electricity to be generated can be judged according the preference of selection by the driver between fuel economy and drivability, a judgment based on the intention of the driver can be performed.

Note that while in the above embodiment, the risk avoidance enablement judging program is described as being started when the driver sets his or her goal in the car navigation unit 3, as with Embodiment 1, when the driving route is altered, when the operating conditions of the equipment are changed or when a predetermined period of time has elapsed or a predetermined mileage has been covered by the vehicle, the risk avoidance enablement judging program is desirably executed again.

In addition, while in the above embodiment, the message is displayed that there is a certain area on the driving route which is not passable when the risky conditions cannot be dealt with or when the feeding disablement cannot be avoided, as with Embodiment 1, when the risky conditions cannot be dealt with or when the feeding disablement cannot be avoided, the car navigation unit can be made to automatically retrieve other driving routes.

Embodiment 3

Hereinafter, an embodiment of a vehicle control apparatus of the invention will be described by the use of the drawings.

FIG. 20 is a block diagram which shows the configuration of a vehicle system which includes a vehicle control apparatus of the invention, and this system is made up of an idling stop control unit 1001, which is the vehicle control apparatus of the invention, an engine control ECU 1002, a battery 1003, an alternator 1004, a car navigation unit 1005, various pieces of electric equipment 1006, 1007, . . . , a starter motor 1008 and the like, these constituent components being connected to each other via a communication line 1009 and a power supply line 1010.

The idling stop control unit 1001 is such as to instruct the engine control ECU 1002 to automatically stop an engine when a predetermined engine stop condition is established and to start thereafter the starter motor, that is, the engine starter motor 1008 by supplying a current thereto from the idling stop control unit 1001 when a predetermined engine start condition is established and is made up of a CPU 1011, a ROM (Read Only Memory) 1012, a RAM (Random Access Memory) 1013, input and output circuits (not shown) and the like. The CPU 1011 controls hardware sections of the idling stop control unit 1001 and executes various programs including an economical running program which are stored in the ROM 1012. The ROM 1012 stores therein the various programs including the economical running program, vehicle information, accident risk level data based on various driving environments, a table of system which are adapted to be activated for operation according to risk conditions and consumed current data of pieces of electric equipment mounted on the vehicle. The RAM 1013 is made up of an SRAM and the like and stores data which is temporarily generated.

FIG. 21 shows an example of vehicle information that is stored in the ROM 1012, and a model type of a subject vehicle, its grade and a list of vehicle equipment including safety equipment and primary equipment are stored. In this list of vehicle equipment, an AFS (a movable lighting system or Adaptive Front-lighting System) is such that projector units of headlights are linked with the operation of a steering wheel in such a manner that directions thereof are changed to a direction in which the vehicle is steered when running on a curve or turning right or left at an intersection so as to illuminate a traveling direction of the vehicle. An EBD (electronically controlled brake force distribution system or Electronic Brake force Distribution) is a system in which a distribution of brake force (brake distribution to front and rear wheels at the time of application of the brakes is controlled by a computer so as maximize the braking potential.

In addition, an ABS (Anti-lock Brake System) is such as to prevent wheel lockup when a panic brake is applied in slippery road conditions, and a VSC (a skid preventing function or Vehicle Stability Control) is a system for assisting in application of a steering torque in a direction in which the behaviors of the vehicle are stabilized according to a steering angle of the steering wheel. Furthermore, a TCS (Traction Control System) is a system for preventing wheel spins at the time of acceleration of the vehicle by controlling the vehicle torque when such wheel spins are detected, and a PCS (Pre-Crash Safety System) is such as to increase the occupant restraining performance by retracting the seat belts of the driver's seat and front passenger's seat when a brake applied is judged as an emergency brake from a speed at which the brake pedal is depressed.

In addition, a CVT (Continuously Variable Transmission) is a continuously variable transmission which can perform gearshifts continuously in a stepless fashion by altering effective belt contact diameters of pulleys or disks, and a TBW (a linkless throttle wire or Throttle By Wire) is a throttle control method in which a throttle is controlled according to an effort applied to an accelerator pedal by the user and the throttle can be controlled flexibly according to a vehicle condition calculated by the computer. An EPS (Electric Power Steering) is a steering method in which an electric motor is driven according to a steering angle of a steering wheel so as to assist in steering, and an effort necessary for a steering operation can be reduced.

FIG. 22 shows an example of accident risk level data based on various driving environments which is stored in the ROM 1012, and a table is stored which shows accident risk level data for each of various driving environments which constitute accident risk elements such as external environments of rain, snow and the like, driving conditions of the driver including his or her state of health and the like, disturbances such as road surface conditions and traffic conditions, and deterioration of vehicle components. As is shown in FIG. 22(A), as external environments, degrees of risk are stored in score according to levels of rain, snow, wind and the like, and as driving conditions, as is shown in FIG. 22(B), degrees of risk are stored in score according to levels of degree of health, degree of fatigue and mental condition of the driver.

Furthermore, as is shown in FIG. 22(C), as disturbances, degrees of risk are stored in score according to levels of road surface conditions, area conditions, traffic conditions and the like, and as vehicle conditions, as is shown in FIG. 22(D), degrees of risk are stored in score according to levels of deterioration of tires, suspensions, shafts and the like.

In addition, FIG. 23 shows a table of systems which are adapted to be activated for operation according to risk conditions, and for example, the EBD, ABS, VSC, TRC are stored as being activated when the vehicle is at a sharp bent or curve in the daytime, and the PCS, EBD, ABS are stored as being activated when the vehicle is trapped in a traffic congestion in the daytime. Furthermore, FIG. 24 shows a table of consumed current data of the electric equipment, and consumed currents which are consumed when respective pieces of the electric equipment are activated to operate are stored in the form of a table.

On the other hand, outputs of various sensors 1021 are inputted into the idling stop control unit 1001. These sensors 1021 include an engine speed sensor and switches for detecting operating states of wipers, direction indicators, fog lamps and the like.

An electronic control ECU 1002 is such as to execute a predetermined arithmetic processing based on pieces of information on vehicle speed, engine speed, a quantity of intake air and the like which are detected a group of sensors mounted on the vehicle and sends out the results of the arithmetic (for example, signals to control the quantities of fuel to be injected, by-pass air and the like) to control mechanisms mounted on the vehicle such as an electric throttle, a starter injection valve and the like so as to control the quantities of fuel to be injected and air to be let in and is also such as to execute an automatic engine stop and an automatic engine restart by instructions from the idling stop control unit 1001.

In addition, the battery 1003 is such as to feed the electric equipment such as the idling stop control unit 1001 and the car navigation unit 1005 and various ECU's (not shown) via the power supply line 1010 and includes sensors (not shown) for detecting charging and discharging currents, terminal voltage and fluid temperature of the battery, and outputs of these sensors are inputted into the idling stop control unit 1001. The alternator 1004 is driven by an engine (not shown) and charges the battery 1003 via the power supply line 1010 and supplies power to other electric loads of the vehicle such as the ECU's and electric equipment.

In addition, the car navigation unit 1005 includes a current vehicle position detecting section which is made up of a GPS sensor and a gyro sensor and a map data storing section for storing map data which includes road map data and acquires road information, weather information, road surface information and the like to a goal of the vehicle via a radio communication with a vehicle information center 1022 and an inter-vehicle communication with other vehicles 1023 for input into the idling stop control unit 1001 via the communication line 1009.

Figure 25:
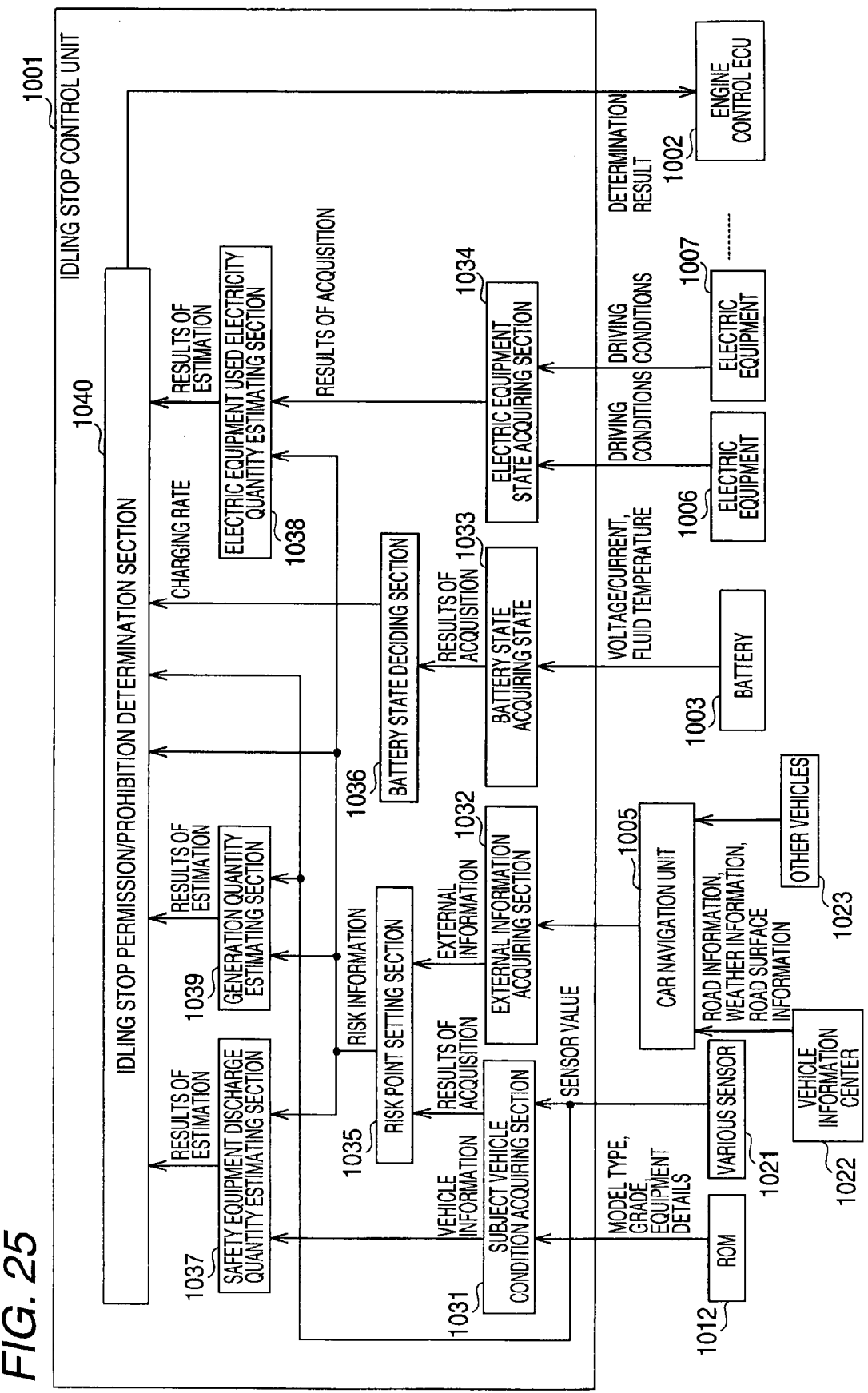
FIG. 25 is a function block diagram which represents the configuration of an idling stop control unit based on function.

FIG. 25 is a function block diagram which represents the configuration of the idling stop control unit 1001 shown in FIG. 20 based on function, and each section is made up of a CPU 1011, a ROM 1012 and a RAM 1013, functions shown therein being executed by software.

A subject vehicle condition acquiring section 1031 acquires vehicle information such as a model type of the subject vehicle, its grade, the details of equipment mounted thereon and the like which is stored in the ROM 12, which is a non-volatile memory and signals such as indicating engine speed and the like which are sent from the various sensors 1021 for input into a risky point setting section 1035 and a safety equipment discharge quantity estimating section 1037. An external information acquiring section 1032 acquires external information such as road information, weather information, road surface information and the like of respective areas lying before the goal which are acquired by the car navigation unit 1005 based on information from the vehicle information center 1022 and other vehicles 1023 for input into the risky point setting section 1035.

In addition, a battery state acquiring section 1033 acquires a voltage, current, battery fluid temperature which are acquired by the various sensors for input into a battery state deciding section 1036, and an electric equipment state acquiring section 1034 acquires activating states and driving states of the various pieces of electric equipment 1006, 1007, . . . for input into an electric equipment used electricity quantity estimating section 1038.

The risky point setting section 1035 calculates a degree of risk of each of points on a driving route to a goal based on information inputted from the subject vehicle condition acquiring section 1031 and external information such as road information, weather information and road surface information on the driving route to the goal which are inputted from the external information acquiring section 1032 and sets a paint whose degree of risk so calculated is equal to or greater than a predetermined degree of risk as a risky point. Then, the risky point setting section 1035 inputs the external information and degrees of risk of respective risky points so set together with information on the risky points into the safety equipment discharge quantity estimating section 1037, the electric equipment used electricity quantity estimating section 1038, a generation quantity estimating section 1039 and an idling stop permission/prohibition determination section 1040.

Furthermore, the battery state deciding section 1036 decides a charging rate of the battery 1003 based on a voltage, current and battery fluid temperature of the battery 1003 and inputs it into the idling stop permission/prohibition determination section 1040. The safety equipment discharge quantity estimating section 1037 confirms safety functions which are required at the respective risky points and estimates discharge quantities of the pieces of safety equipment which are necessary at the respective risky points for input into the idling permission/prohibition determination section 1040.

In addition, the electric equipment used electricity quantity estimating section 1038 estimates a quantity of electricity that is used by the electric equipment based on the current electric equipment utilizing conditions and information on sections of the route which lead to the respective risky points for input into the idling stop permission/prohibition determination section 1040, and the generation quantity estimating section 1039 estimates a transition of the driving mode and the engine speed which will result until the vehicle arrives at each of the risky points based on risk information from the risky point setting section 1035 and engine speed information from the various sensor 1021 and estimates an expected generation quantity required by the vehicle until it arrives at each of the risky points from the results of the estimation for input into the idling stop permission/prohibition determination section 1040.

Then, the idling stop permission/prohibition determination section 1040 estimates a quantity of residual electric energy of the battery to the next coming risky point within a predetermined distance range to each of the risky points based on the current charging rate of the battery, an expected quantity of electricity used by the electric equipment to the next coming risky point, an expected quantity of electricity generated by the alternator 1004, an expected quantity of electricity discharged by the safety equipment to the next coming risky point and the like and inputs it into the engine control ECU 1002.

Next, the functions of the functional sections of the vehicle control apparatus 1001 will be deathbed using the block diagram shown in FIG. 20 and flowcharts.

Figure 26:
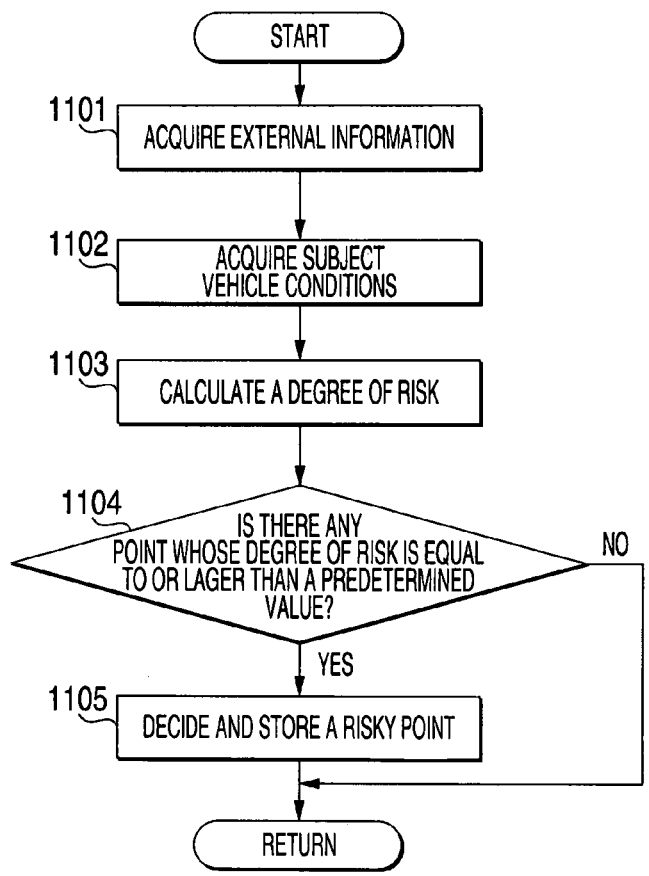
FIG. 26 is a flowchart which shows the function of a risky point setting program.

When the driver sets a goal on the car navigation system 1005, the CPU 11 of the idling stop control unit 1001 starts a risky point setting program shown in FIG. 26 Firstly, external information such as road information, weather information and road surface information on a driving route to the goal is acquired based on information from the car navigation unit 1005 to be stored in the RAM 1013 (step 1101), and thereafter, and subject vehicle conditions such as driving time and tire conditions are acquired from the ROM 1012 and the sensors 1021 to be stored in the RAM 1013 (step 1102).

Next, the CPU 11 calculates degrees of risk at the respective risky points on the driving route to the goal using an accident risk level table shown in FIG. 22 based on the external information and the subject vehicle conditions which are acquired in steps 1101, 1102 (step 1103).

Namely, as for external environments (a), weather information on the driving route is extracted based on weather information and route information which are acquired via radio communication or the like, and thereafter, in the event that it is raining on the driving route, with a rain precipitation of 100 mm or more per hour, the level of rain is judged as a level 3, with 50 mm or more per hour, as a level 2, and with 30 mm or more per hour, as a level 1. In addition, in the event that it is snowing, with a fallen snow accumulation of 3 cm or more, the level of snow is judged as a level 3, with 2 cm or more, as a level 2, and with 1 cm or more, as a level 1. Furthermore, in the case of wind, with a wind speed of 30 m or faster, the level of wind is judged as a level 3, with a wind speed of 25 m or faster, as a level 2, and with a wind speed of 20 m or faster, as a level 1.

In addition, as for a driving state (b), the state of health of the driver is inputted into an on-board device by himself or herself by way of self-assessment. For example, in the event that the driver has a body temperature of 37 degrees or more, the health level of the driver is judged as a health level 3, in the event that the driver feels that he or she has a cold, then, the health level is judged as a health level 2, and in the event that the driver feels dull, the health level is judged as a health level 1. In addition, with a driving time of three hours or longer, the fatigue level of the driver is judged as a fatigue level 3, with a driving time of two hours or longer, the fatigue level is judged as a fatigue level 2, and with a driving time of one hour or longer, the fatigue level is judged as a fatigue level 1. Furthermore, with three times or more of drastic starts or panic brakes, the mental level of the driver is judged as a mental level 3, with twice or more of drastic starts or panic brakes, the mental level is judged as a mental level 2, and with once or more of drastic starts or panic brakes, the metal level is judged as a metal level 1.

Furthermore, as disturbances (c), degrees of risk are determined as for road surface conditions, area conditions, curve conditions, traffic conditions, up-slope/down-slope conditions and the like. As for road surface conditions, a road surface state of a driving route is extracted from a recording unit which stores road surface states of roads on which the vehicle has once been driven before when the driving route is set, or road surface information on the driving route is extracted from a recording unit at a center, not shown, which stores the road surface information of the roads which was recorded when other vehicles were driven thereon before through communication between the center and the vehicle via a radio wave communication or the like. Then, in the event that a road surface is rough as of an off-road rough terrain, the road surface state is judged as a level 3, in the event that the road surface is covered with pebbles, the road surface state is judged as a level 2, and in the event that the road surface is such as one that has just been paved, the road surface state is judged as a level 1.

In addition, as for area conditions, since the crowdedness of areas are recorded in advance together with map information, a crowdedness level of an area on the driving route is extracted therefrom when the driving route is set.

Furthermore, as for curve conditions, since curve information is recorded in advance together with the map information, curve information on the driving route is extracted when the driving route is set, or curve information on the driving route that was recorded in the recording unit at the center, not shown, when other vehicles were driven on the driving route and is now stored therein may be extracted from the recording unit through communication between the center and the vehicle via the radio wave communication or the like. Then, when a curve is recorded as R500, the curve level thereof is judged as a curve level 3, when the curve is recorded as R700, the curve level thereof is judged as a curve level 2, and when the curve is recorded as R1000, the curve level thereof is judged as a curve level 1.

In addition, traffic conditions are acquired from the VICS or radio, or from the recording unit at the center through communication between the center and the vehicle via the radio wave communication or the like, and based on the information so acquired, when a road is congested over 5 km or longer, the congestion level of the road is judged as a congestion level 3, when the road is congested over 3 km or longer, the congestion level is judged as a congestion level 2, and when the road is congested over 1 km or longer, the congestion level is judged as a congestion level 1.

Furthermore, as for up-slope and down-slope conditions, since information on up-slopes and down-slopes on the map is recorded in advance together with the map information, up-slope and down-slope information on the driving route is extracted when the driving route is set, or the up-slope and down-slope information may be extracted from the recording unit at the center, not shown, through communication between the center and the vehicle via the radio wave communication or the like. Then, when an up-slope or down-slope is 5 per cents or greater, the level of up-slope or down-slope is judged as a level 3, when the up-slope or down-slope is 3 per cents, the up-slope or down-slope level is judged as a level 2, and when the up-slope or down-slope is 2 per cents, the up-slope or down-slope level is judged as a level 1.

In addition, as for vehicle conditions (d), information on replacement timings of vehicle components such as tires, suspensions and shafts is stored in the storage unit, and when five years or more has now elapsed since the last replacement timing of those vehicle components, the vehicle conditions level is regarded as a level 3, when four years or more has now elapsed, the vehicle conditions level is regarded as a level 2, and when 3 years or more has elapsed, the vehicle conditions level is regarded as a level 1.

Then, scores which correspond to the levels of the respective events that have been described above are extracted, and a degree of risk [%] is obtained from a total value of the scores of the respective events, so as to calculate a degree of risk at points to the goal.

Figure 27:
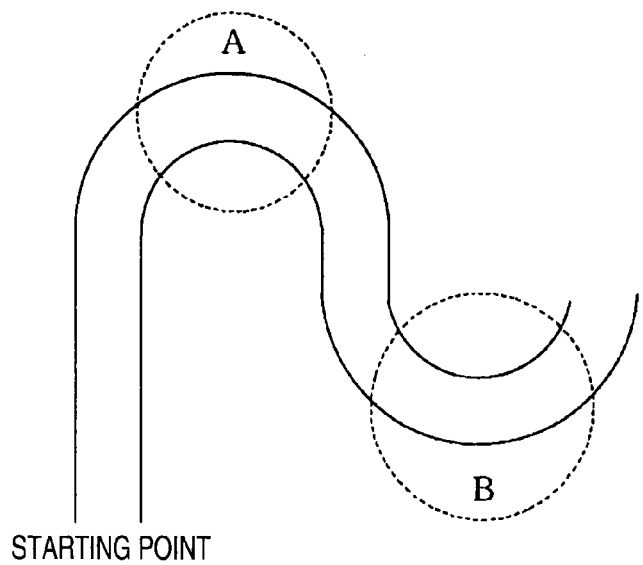
FIG. 27 shows a setting example of risky points on a driving route.

After degrees of risk at the respective points on the driving route have been so calculated, the CPU 1011 determines whether or not there are any points whose degree of risk so calculated is equal to or greater than a predetermined degree of risk (step 1104) and when determining that there is or are points whose degree of risk is equal to or greater than the predetermined degree of risk, the CPU 1011 sets decides the points as risky points A, B, as is shown in FIG. 27, and stores them in the RAM 1013 together with the degrees of risk of the risky points (step 1105). Note that when setting the risky points, in place of the degrees of risk which are calculated from the total value of the scores which correspond to the levels of the respective events, the degrees of risk based on the respective events such as curves, traffic congestions, road surface conditions, up-slopes, down-slopes, rain, snow, wind and the like on the driving route may be used, and the points whose degree of risk based on the events is the level 3 or higher may be set as the risky points.

Figure 28:
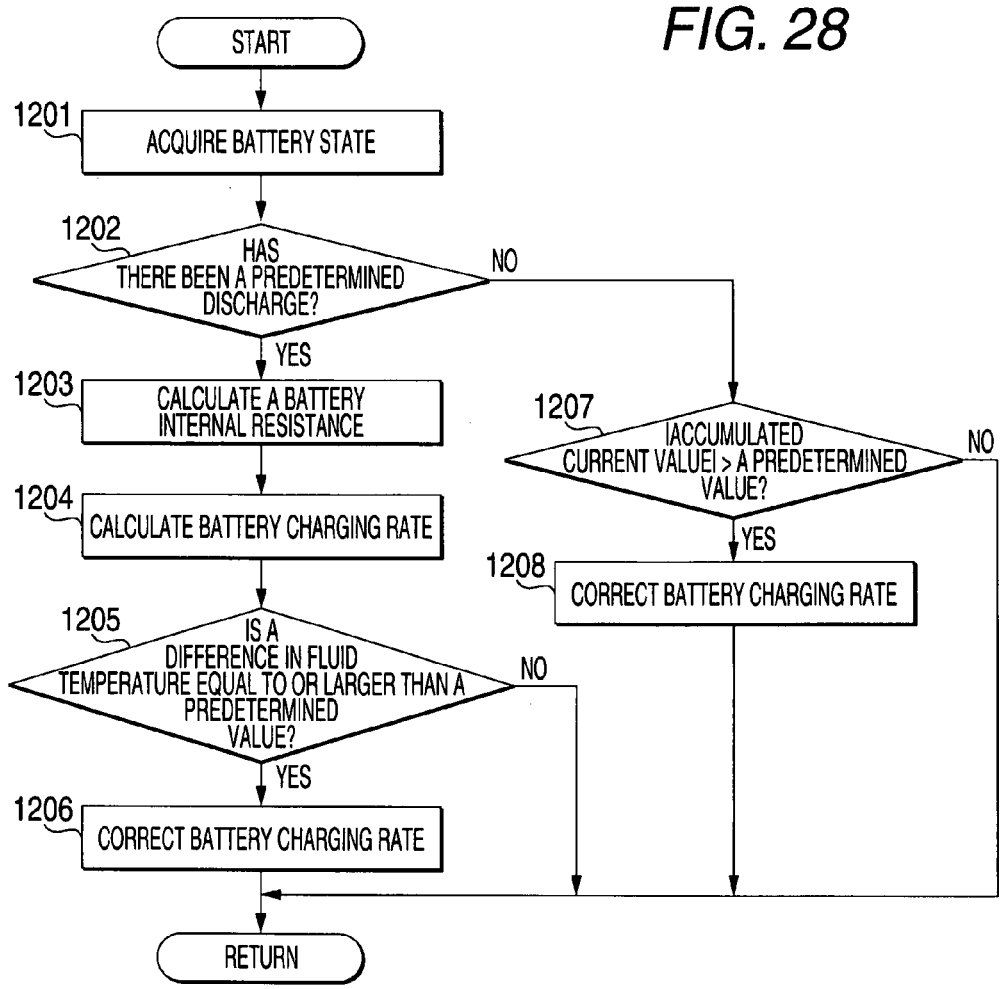
FIG. 28 is a flowchart which shows the function of a battery state decision program.

On the other hand, the CPU 1011 of the idling stop control unit 1001 executes a battery state deciding program shown in FIG. 28 once every certain period of time, and when this program is started, firstly, a battery state such as a voltage, current, battery fluid temperature of the battery 1003 is acquired from a sensor thereof for storage in the RAM 1013 (step 1201). Thereafter, by determining whether or not a change greater than a certain value has occurred in the voltage so acquired, the CPU 1011 determines whether or not a predetermined discharging has occurred (step 1202).

Figure 29:
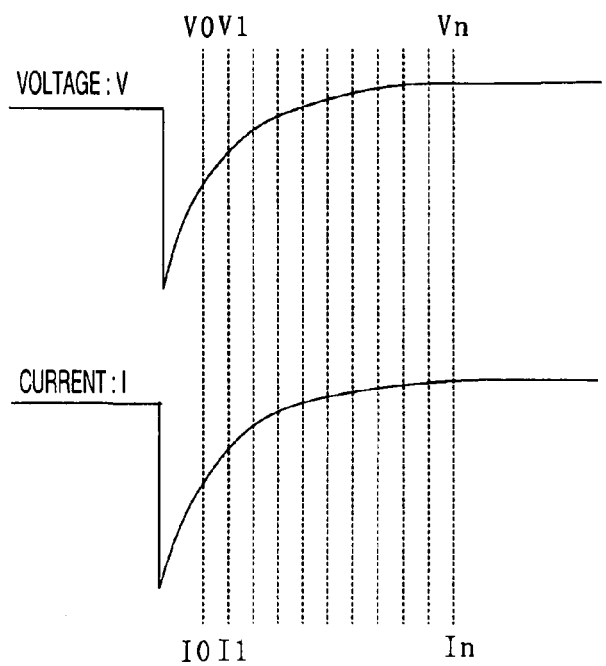
FIG. 29 is a diagram which shows wave forms of voltage and current of a battery.

If determining in step 1202 that the predetermined discharge has happened, the CPU 1011 calculates an internal resistance of the battery and stores it in the RAM 1013 (step 1203). Namely, as is shown in FIG. 29, the CPU 1011 computes sequentially to obtain individual internal resistances R0, R1, . . . , Rn based on voltage and current values of the battery which are sampled once every certain period of time from the following equations;

$$R0=(V1-V0)/(I1-I0), \ldots$$

$$Rn=(Vn\cdot 1-Vn)/(I\cdot 1-In)$$

and thereafter, a final internal resistance R is obtained from the following equation;

$$R=(R0+R1+\ldots +Rn)/n$$

Having calculated the internal resistance of the battery, the CPU 1011 calculates a charging rate of the battery and stores it in the RAM 1013 (step 1204). Namely, having converted voltage into charging rate based the battery voltage using a conversion table shown in FIG. 11(A), the CPU 1011 reads out a correction value based on the internal resistance calculated in step 1203 using a correction value table shown in FIG. 11(B), so as to decide a charging rate by multiplying the charging rate by a correction coefficient or the charging rate×a correction coefficient. Note that since, if the resistance is smaller than a reference value R, the charging rate is increased, the correction value becomes a value which is larger than 1.

Next, the CPU 1011 determines whether or not a difference between the battery fluid temperature and a reference temperature is equal to or larger than a predetermined value (step 1205), and if determining that the difference between the battery fluid temperature and the reference temperature is equal to or larger than the predetermined value, the CPU reads out a correction value which is associated with the fluid temperature using a correction value table shown in FIG. 31, corrects the charging rate by multiplying the charging rate by a correction coefficient and stores the corrected charging rate in the RAM 1013 (step 1207), ending the program.

On the other hand, if determining in step 1202 that there has occurred no predetermined discharge, the CPU 1011 determines whether or not an absolute value of an accumulated current value which resulted after the last predetermined discharge had occurred is equal to or larger than a predetermined value (step 1207), and if determining that the accumulated current value is equal to or smaller than the predetermined value, the CPU 1011 ends the program, whereas if determining that the accumulated current value is equal to or larger than the predetermined value, the CPU 11 adds a charging rate correction value which is associated with the accumulated value which had been accumulated until then to the current charging rate using a correction table shown in FIG. 32 and stores the resulting charging rate in the RAM 1013 (step 1208), thereafter, ending the program.

Figure 33:
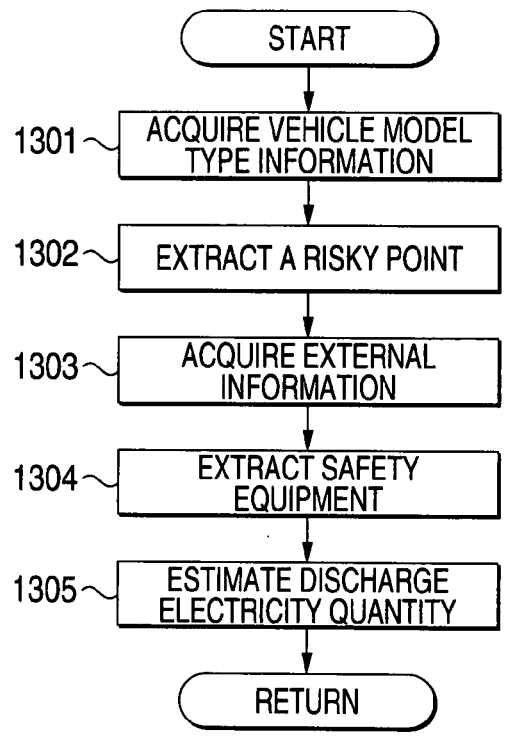
FIG. 33 is a flowchart which shows the function of a safety equipment discharging quantity estimation program.

In addition, the CPU 1011 of the idling step control unit 1001 executes a safety equipment discharge quantity estimation program shown in FIG. 33 once every certain period of time, and when starting this program, firstly, the CPU 1011 acquires the vehicle information shown in FIG. 21 from the ROM 1012 (step 1301) and thereafter extracts the next risky point on the driving route (step 1302). Following this, the CPU 1011 acquires external information such as road information, weather information and road surface information of the following risky point (step 1303), extracts safety equipment from the model type information (step 1304), and thereafter, estimates a quantity of electricity that will discharged by the safety equipment at the following risky point based on the risk matching map shown in FIG. 23 and stores it in the RAM 1013 (step 1305). For example, it is estimated that the EBD, ABS, VSC and TRC are activated for operation at a sharp bend or curve in the daytime, and when the vehicle is equipped on these safety devices, an expected discharge electricity quantity becomes 1600 [Asec].

Figure 34:
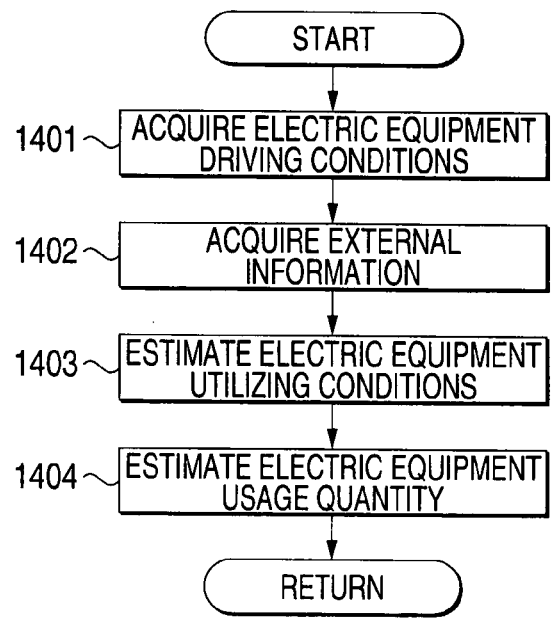
FIG. 34 is a flowchart which shows the function of an electric equipment usage estimation program.

Furthermore, the CPU 1011 of the idling stop control unit 1001 executes an electric equipment used electricity quantity estimating program shown in FIG. 34 once every certain period of time, and when starting this program, firstly, the CPU 1011 acquires driving conditions of the pieces of electric equipment 1006, 1007 at that point in time for storage into the RAM 1013 (step 1401). Then having acquired external information such as road information, weather information and road surface information on the driving route to the goal which is stored in the RAM 1013 (step 1402), the CPU 1011 estimates utilizing conditions of the electric equipment to the following risky point based on the external information so acquired (step 1403), reads out consumed current of the relevant electric equipment which is estimated to be used at the following risky pot from the table of consumed current of the electric equipment shown in FIG. 24 and estimates a quantity of electricity that will be consumed by the electric equipment based on an arrival time at the following risky point for storage into the RAM 1013 (step 1404).

Figure 35:
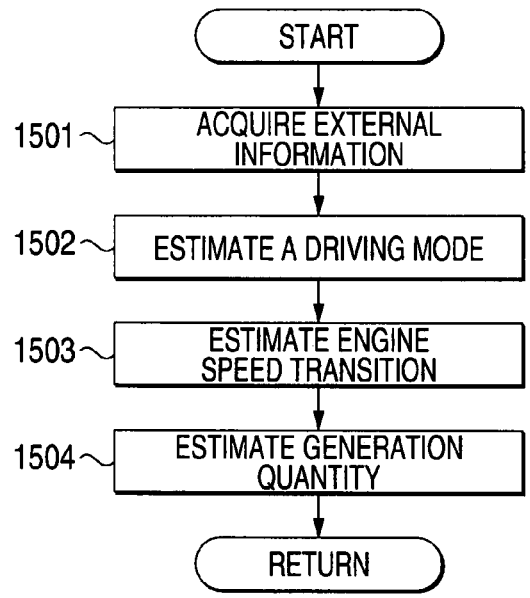
FIG. 35 is a flowchart which shows the function of a current generating quantity estimation program.
Figure 36:
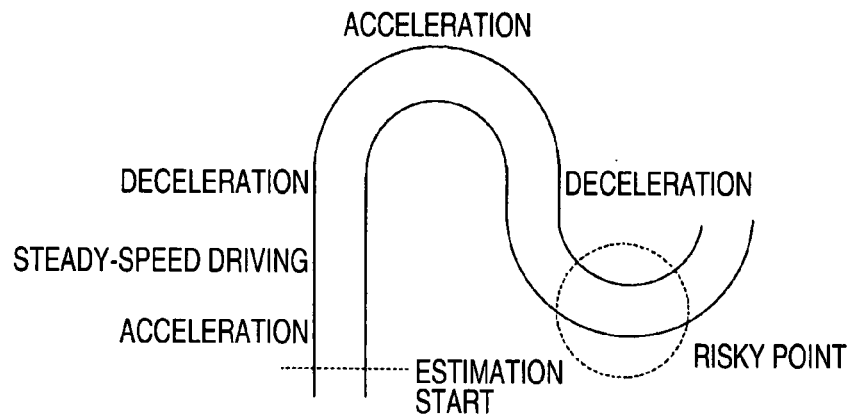
FIG. 36 shows an example of an estimated driving mode to a risky point.
Figure 37:
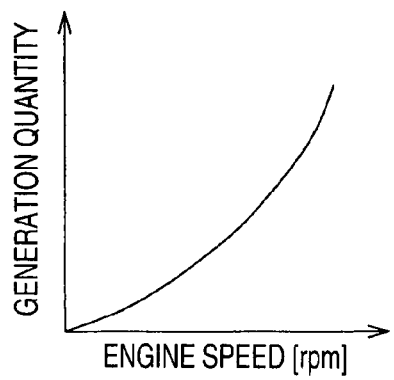
FIG. 37 is a table in which engine speed is associated with current generating quantity.

Similarly, the CPU 1011 of the idling stop control unit 1001 executes a generation quantity estimating program shown in FIG. 35 once every certain period of time, and when starting this program, firstly, having acquired external information such as road information, weather information and road surface information to the following risky point (step 1501), the CPU 1011 estimates a driving mode of the vehicle, that is, a driving state of the vehicle such as accelerated, steady-speed driving and decelerated as shown in FIG. 36 to the following risky point based on the external information so acquired (step 1502). Next, having estimated a transition of engine speed based on an engine at that point in time acquired from the various sensors 1021 and the estimated driving mode (step 1503), the CPU 1011 estimates a generation quantity by the alternator 1004 to the following risky point based on the engine speed transition and the driving mode and stores it in the RAM 1018 (step 1504). Namely, since generation is cut off at the time of acceleration, the CPU 1011 calculates a time other than the time of acceleration during which charging can be performed and obtains a total generation quantity by multiplying the result of the calculation by a generation quantity, which is decided based on a table shown in FIG. 37 in which engine speed is associated with generation quantity.

Figure 38:
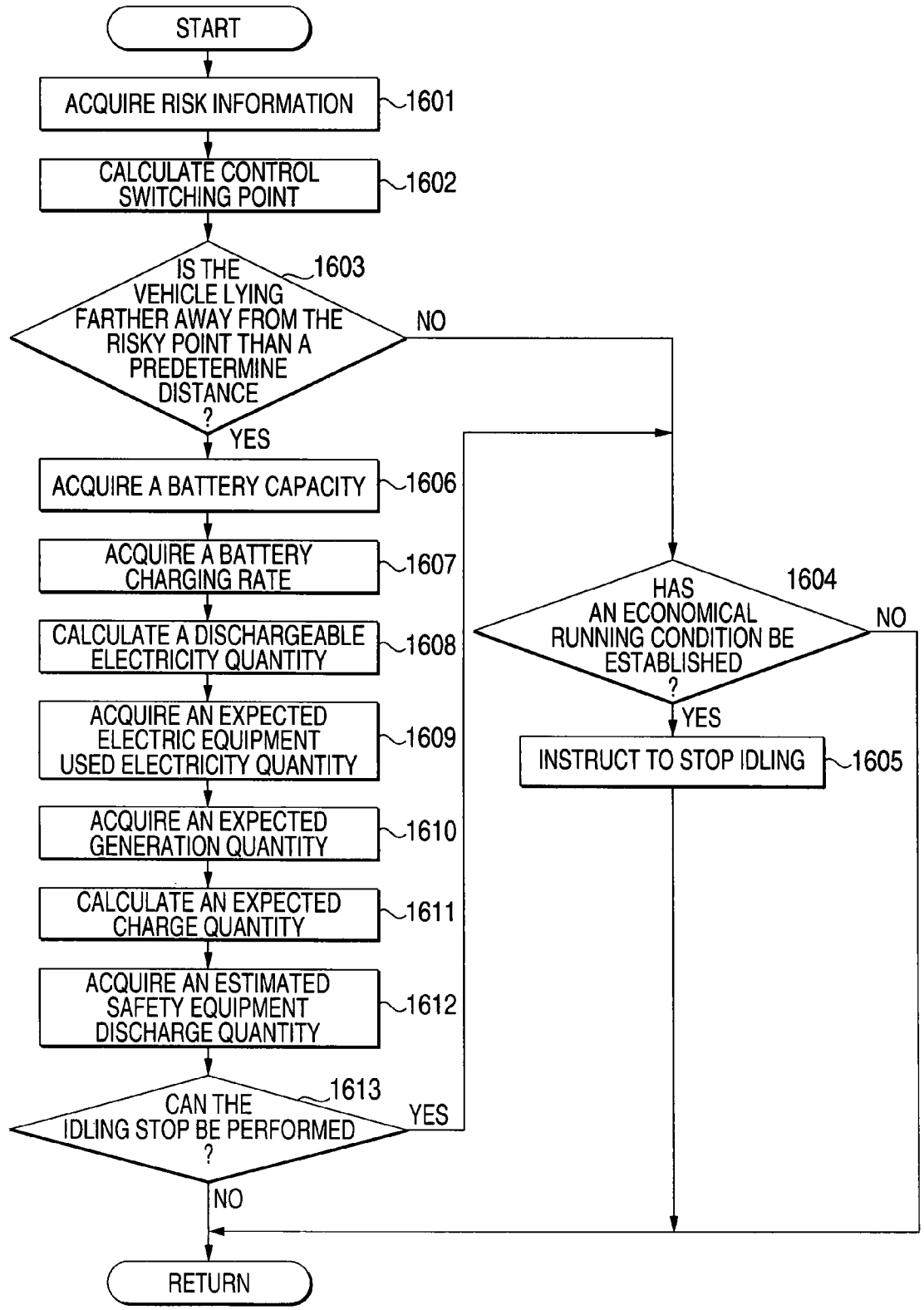
FIG. 38 is a flowchart which shows the function of an idling stop permission/prohibition determination program.

On the other hand, the CPU 1011 of the idling stop control unit 1001 executes an idling stop permission/prohibition determination program shown in FIG. 38 once every certain time at the same time as executing the various estimating programs that have been described above, and when starting this program, firstly, having acquired the following risky point and a degree of risk of the risky point from the RAM 1013 (step 1601), the CPU 1011 decides according to the degree of risk so acquired a predetermined distance where an idling stop permission/prohibition determination is started by referring to a table showing association of degree of risk with determination starting distance and stores the distance so decided in the RAM 1013 (step 1602).

Next, the CPU 1011 determines whether or not the position of the vehicle at the point at which the distance is so decided and stored falls within a range of the predetermined distance from the following risky point (step 1603), and if determining that the vehicle lies farther than the predetermined distance away from the following risky point, the CPU 1011 determines whether or not a normal economical running condition is established (step 1604).

Namely, if determining that the normal economical running condition is established or that an idle state in which, for example, the accelerator pedal is not depressed while the brake pedal is depressed, the vehicle speed is zero and the engine speed is in the range of 600 to 1000 rpm continues for a predetermined period of time, for example, 2 seconds, the CPU 1011 instructs the engine ECU 1012 to execute the idling stop (step 1605), whereas if determining that the aforesaid economical running condition is not established, the CPU 1011 ends the program.

On the other hand, if determining in step 1603 that the vehicle lies within the range of the predetermined distance from the following risky point, the CPU 1011 acquires the capacity of the battery 1003 installed on the vehicle from the vehicle information stored in the ROM 1012 (step 1060), thereafter acquires the charging rate of the battery 1003 at that point in time from the RAM 1013 (step 1607) and thereafter calculates a dischargeable electricity quantity of the battery 1003 (step 1608).

For example, assuming that the battery capacity is 198000 [Asec], the current charging rate is 90% and the discharge terminating charge rate is 30%, a dischargeable electricity quantity is calculated by the following equation:

Dischargeable electricity quantity=198000*{(90·30)/ 100}=188800 [Asec].

Next, the CPU 1011 acquires an expected quantity of electricity which will be used by the electric equipment or an expected electric equipment used electricity quantity to the following risky point from the RAM 1013 (step 1609), also acquires an expected generation quantity by the alternator 1004 to the flowing risky point from the RAM 1003 (step 1610), and thereafter, obtains an expected discharging quantity by the following equation: an expected discharge quantity=expected generation quantity−expected electricity used electricity quantity (step 1601).

Thereafter, the CPU 1011 acquires an expected safety equipment discharge quantity at the following risky point from the RAM 1013 (step 1612), thereafter, estimates a residual electrical energy of the battery at the following risky point and determines whether or not the idling stop can be enabled (step 1613).

For example, assuming that the dischargeable electricity quantity is 118800 [Asec], the expected discharge quantity is −1000 [Asec], and the expected safety equipment used electricity quantity is 1600 [Asec], then, the residual electrical energy of the battery is:

Residual electrical energy of the battery=118800 [Asec]−1000 [Asec]−1600 [Asec]=115400 [Asec]

and since the expected residual electrical energy of the battery is larger than 0 [Asec], the CPU 1011 determines that the idling stop can be enabled.

If determining in step 1613 that the idling stop is disabled, the CPU 1011 ends the program without determining whether or not the economical running condition is established, whereas if determining that the idling stop is enabled, the CPU 1011 determines whether or not the predetermined economical running condition is established (step 1604).

As has been described heretofore, the environment information such as road information, weather information and road surface information on the driving route to the goal is acquired from the car navigation unit or the like, the points on the driving route whose degree of risk calculated based on the environment information so acquired is equal to or greater than the predetermined degree of risk are set as the risky points, and thereafter, whether or not the battery holds the quantity of electrical energy which is necessary for the safety equipment which is required to operate at each of the risky points is judged. Then, if the battery does not hold a sufficient quantity of electrical energy to operate the safety equipment at the required risky point, the idling stop is prohibited, thereby making it possible to perform the economical running while suppressing the disablement of feeding to the safety system in an ensured fashion.

Note that while in the embodiment, whether or not the idling stop is enabled is determined by determining whether or not the residual quantity of electrical energy of the battery at the risky point is positive, a plurality of determination factors are set, so that the determination factors for use for the determination of enablement of the idling stop can be selectively changed according to the degree of risk at each of the risky points.

Figures 39, 40:
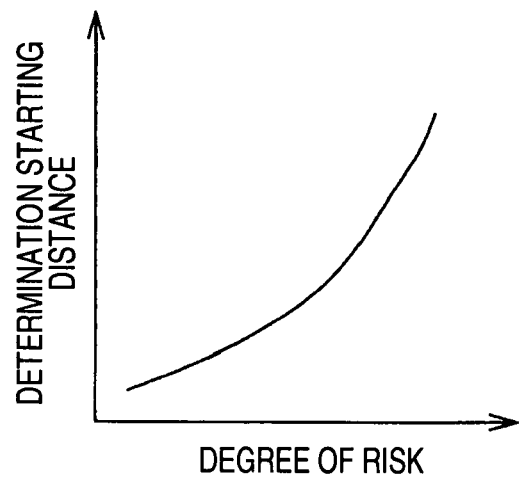
FIG. 39 is a table in which degree of risk is associated with determination starting distance.
FIG. 40 shows a determination element selection table in which a plurality of determination elements are changed according to degrees of risk.

FIG. 40 shows a table which exemplifies a case where a plurality of determination factors are set, so that the determination factors so set for use for determination can be selectively changed according to the degree of risk at each of the risky points. In this example, a condition on the quantity of residual electrical energy of the battery or "Is a quantity of residual electrical energy of the battery positive?" is used for the determination of enablement of idling stop at all the degrees of risk, and for example, a condition on the gradient of an up-slope or "Is a gradient less than a predetermined value?" is not used for the determination of enablement of idling stop in the event that the degree of risk is less than 20 but is used for the determination of enablement of idling stop only when the degree of risk is equal to or larger than 20.

In this way, by setting the plurality of determination factors, so that the determination factors so set for use for determination are selectively changed according to the degree of risk at each of the risky points, the enablement of idling stop can be determined with higher accuracy.

In addition, while in the embodiment, the risky point setting program shown in the flowchart of FIG. 26 is executed when the driver sets his or her goal in the car navigation unit, the risky point setting program is desirably executed again when there occurs a change in the driving route, when there occurs a change in the operating conditions of the equipment or when a predetermined period of time has elapsed or a predetermined mileage has been covered by the vehicle.

Furthermore, while in the embodiment, the idling stop control unit and the engine control ECU are provided separately, the function of the idling stop control unit can be incorporated into the engine control ECU.

Embodiment 4

Hereinafter, a vehicle control apparatus of the invention will be described using the drawings.

Figure 41:
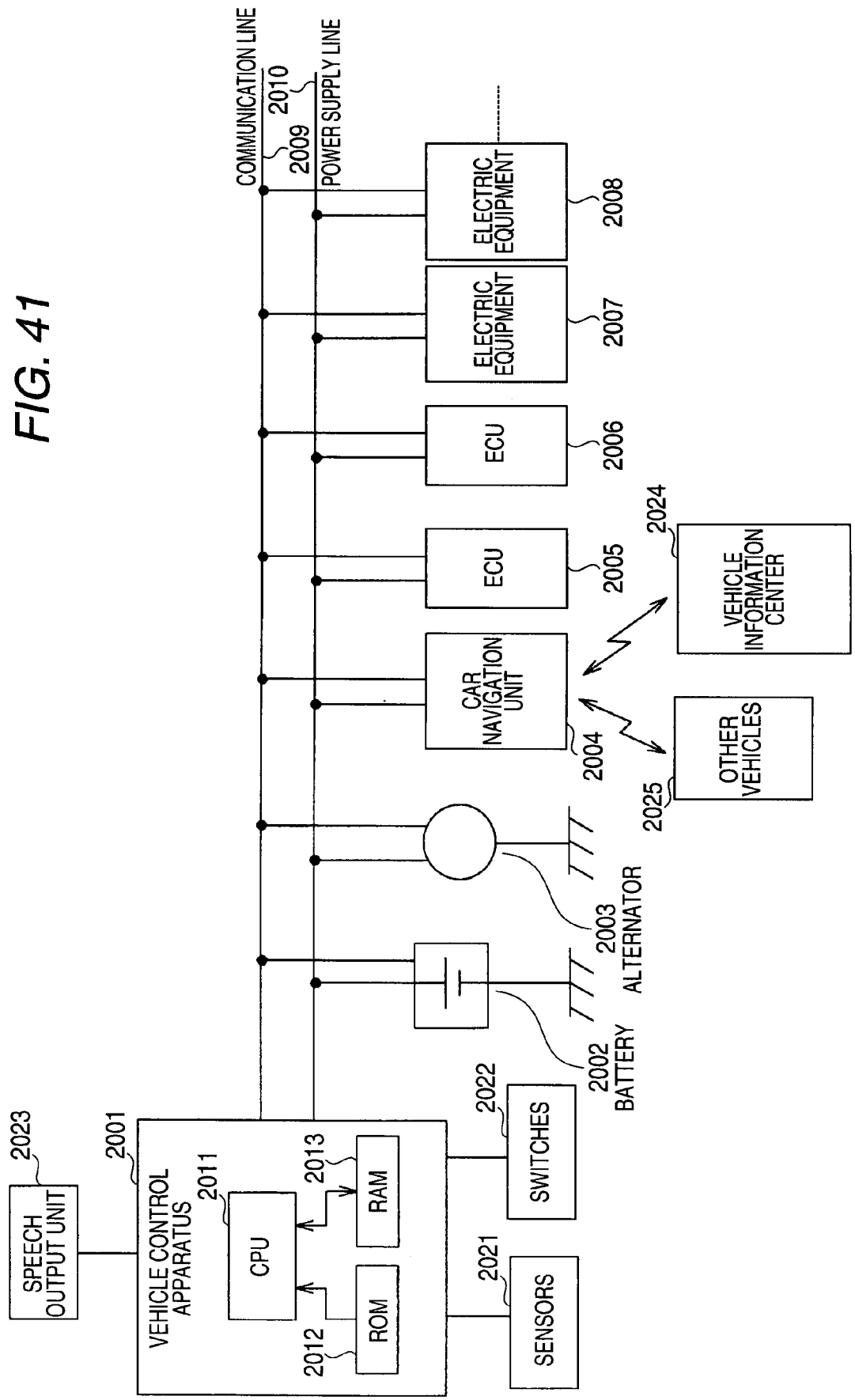
FIG. 41 is a block diagram which shows the configuration of a vehicle system which includes a vehicle control apparatus of the invention.

FIG. 41 is a block diagram showing the configuration of vehicle system which includes a vehicle control apparatus of the invention. This vehicle system is made up of a vehicle control apparatus 2001, which is the vehicle control apparatus of the invention, a battery 2002, an alternator 2003, a car navigation unit 2004, various ECU's 2005, 2006, pieces of electric equipment 2007, 2008, ..., and the like, and these constituent components are connected to each other via a communication line 2009 and a power supply line 2010.

The vehicle control apparatus 2001 is such as to estimate an activation of safety equipment from various conditions of driving areas to perform a feeding load restriction and is made up of a CPU 2011, a ROM (Read Only Memory) 2012, a RAM (Random Access Memory) 2013, input and output circuits (not shown) and the like. The CPU 2011 controls hardware sections of the vehicle control apparatus 2001 and executes various programs such as feeding load restriction based on programs stored in the ROM 2012. The ROM 2012 stores therein various programs such as the feeding load restriction program, score data (risk element map) for each risk element based on various driving environments, a treatment table showing treatments according to risk levels, a table of systems adapted to be activated for operation according to risk levels, the order of preference of selection of devices equipped on the vehicle and warning messages, and the RAM 2013 is made up of an SRAM (Stand-by RAM) and the like and stores data which is generated temporarily.

In addition, outputs of various sensors 2021 and switches 2022 are inputted into this vehicle control apparatus 2001, and a speech output unit 2033 is also connected thereto. The sensors 2021 includes a vehicle speed sensor, a G sensor for detecting the inclination of the vehicle, an illuminance sensor for detecting the illuminance inside the vehicle and the like. The switches 2022 include switches for detecting operating conditions of wipers, direction indicator lamps, fog lamps and the like and a driver's intention selection switch for selecting a table of safety equipment whose activation for operation is estimated by the driver according to risk levels. In addition, the speech output unit 2023 is such as to issue a voice warning in the form of a warning message stored in the ROM 2012.

FIG. 42 shows an example of a risk element map stored in the ROM 2012, and the map stores therein road gradient, operating states of vehicle devices such as wipers and external conditions such as vehicle speed, disturbances such as road surface conditions and wind, driver's state such as his or her state of health, subject vehicle conditions such as deterioration states of vehicle components and the like in the form of scores corresponding to conditions for each of various risk elements which constitute risk elements of accidents.

In addition, FIG. 43 shows an example of a table of treatments according to risk levels which is stored in the ROM 2012, and in this example, a preparation for occurrence of an accident is made when the risk level is 95 or higher, when the risk level is in the range of 80 to 95, a warning is issued, and a feeding load restriction a is performed. In addition, when the risk level is in the range of 60 to 80, a warning is issued and a feeding load restriction b, which is less severer than the feeding load restriction a, is performed, and when the risk level is in the range of 40 to 60, it is designed that the driver is alerted.

Furthermore, FIG. 44 shows a table of safety equipment which are expected to be activated for operation according to risk levels, and this table is stored in the ROM 2012. In this example, the driver is allowed to select either of two tables, and in a part A of the table, it is set such that when the degree of risk is in the range of 70 to 90, ABS and EBD are activated for operation, and when the degree of risk is 90 or higher, ABS, EBD, airbags, and VSC are activated for operation. In addition, in a part B of the table, it is set such that the ABS is expected to be activated for operation when the degree of risk is in the range of 70 to 90, and the ABS and the airbags are expected to be activated for operation when the degree of risk is 90 or higher.

In addition, FIG. 45 shows an example of a table, stored in the ROM 2012, which shows the order of preference of selection of devices equipped on the vehicle and consumed power data for those devices, and the table stores therein the order of preference of selection and consumed power (W) in levels of operations on a unit-by-unit basis for the devices and safety equipment mounted on the vehicle.

On the other hand, the battery 2002 is such as to feed electric equipment such as the vehicle control apparatus 2001 and the car navigation unit 2004 and the various ECU's 2005, 2006, ... via the power supply line 2010 and includes sensors (not shown) for detecting charging and discharging current, terminal voltage, battery fluid temperature of the battery, and outputs of these sensors are inputted into the vehicle control apparatus 2001 via the communication line 2009. The alternator 2003 is driven by an engine (not shown), and charges the battery 2002 and supplies other electric loads of the vehicle such as the ECU's and electric equipment with electric power via the power supply line 2010.

In addition, the car navigation unit 2004 includes a current position detecting section made up of a GPS sensor and a gyro sensor and a map data storing section for storing map data including road map data, acquires road information, weather information, road surface information and the like in driving areas of the vehicle via radio communication with a vehicle information center 2024 and inter-vehicle communication with other vehicles 205 and inputs these pieces of information into the vehicle control apparatus 2001 via the communication line 2009.

Figure 46:
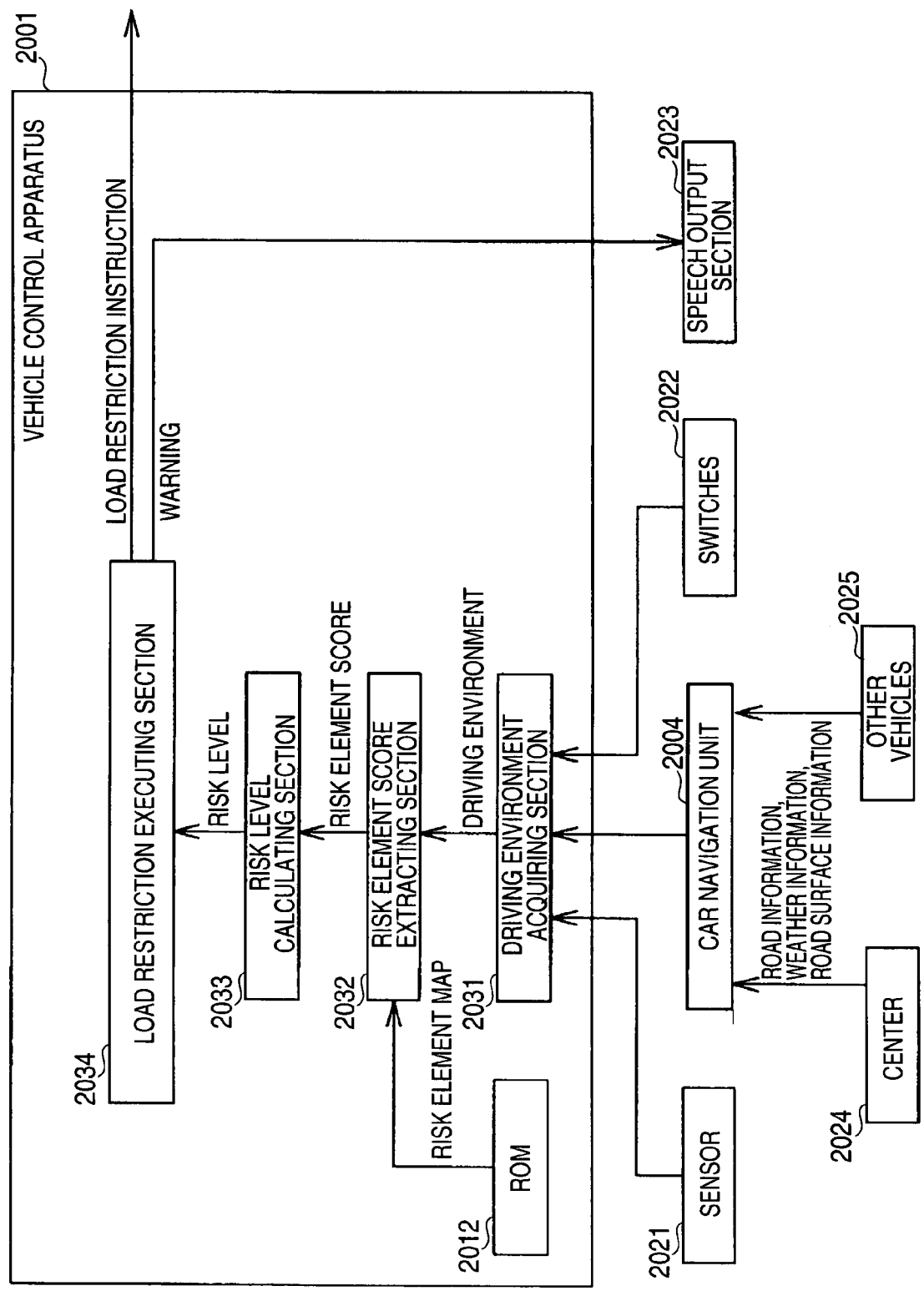
FIG. 46 is a function block diagram which represents the configuration of a vehicle control apparatus based on function.

FIG. 46 is a functional block diagram of the configuration of the vehicle control apparatus 2001 based on function, and each section is made up of a CPU 2011, a ROM 2012 and a RAM 2013 and these functions are executed through software.

A driving environment acquiring section 2031 acquires road information, weather information, road surface information and the like which are acquired by the car navigation unit 2004 from the vehicle information center 2024 and the other vehicles 2025, as well as vehicle speed, road gradient, operating information on the wipers and driving environments made up of illuminance inside the vehicle and the like which sent from the sensors 2021 and switches 2022 and inputs them so acquired into a risk element score extracting section 2032.

In addition, the risk element score extracting section 2032 extracts a score for each risk element in a specific area from the risk element map shown in FIG. 42, which is stored in the ROM 2012, based on road information, weather information, road surface information and driving environments such as vehicle conditions in the relevant area which are sent from the driving environment acquiring section 2031 for input into a risk level calculating section 2033. Then, the risk level calculating section 2033 adds up scores for the respective risk elements in the area to thereby calculate an accident risk level and inputs it into a load restriction executing section 2034.

Then, the load restriction executing section 2034 expects the activation of the safety equipment according to the accident risk level sent from the risk level calculating section 2033, and when expecting the activation of the safety equipment, a warning is made to be issued from the speech output unit 2023 or a feeding load restriction is performed by executing a feeding cut-off to the loads.

Next, the functions of the respective functional sections of the vehicle control apparatus 2001 will be described by the use of the block diagram shown in FIG. 41 and a flowchart in FIG. 47.

Figure 47:
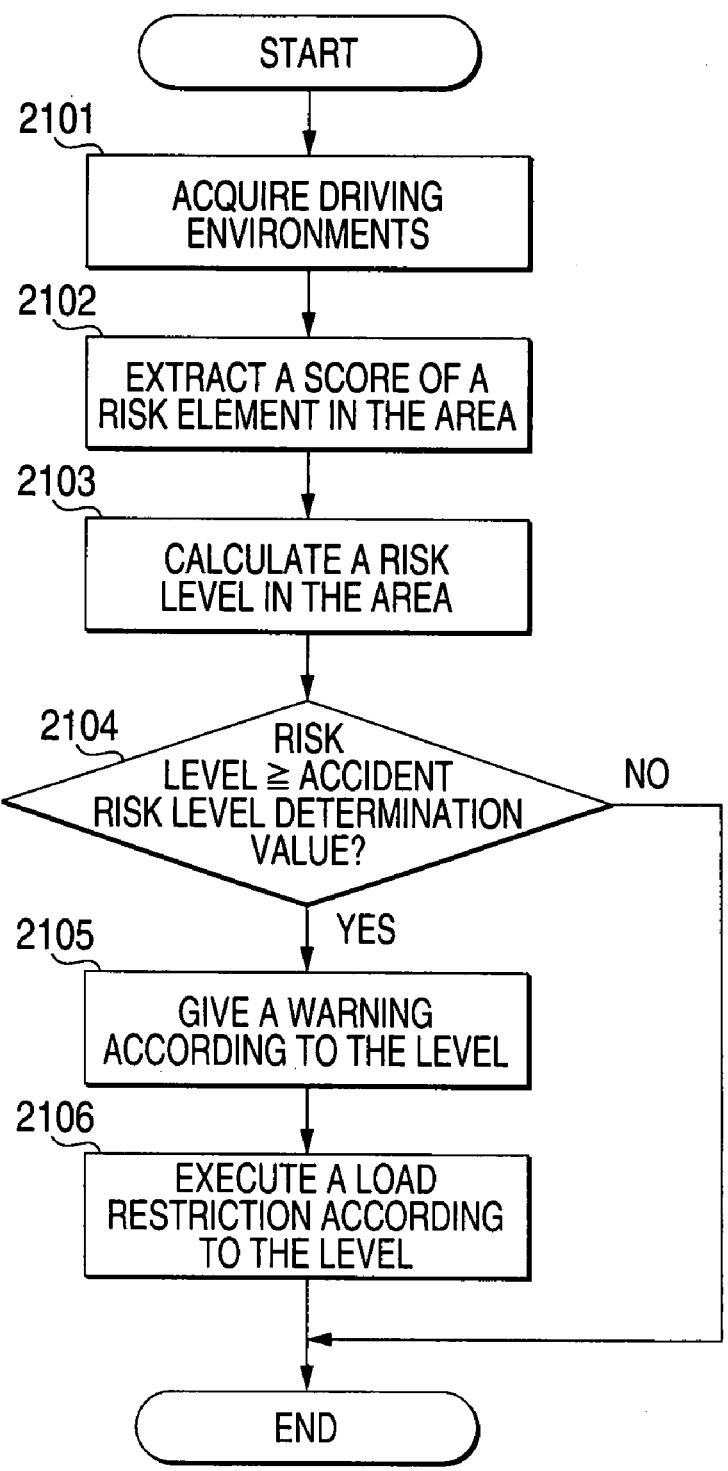
FIG. 47 is a flowchart which shows the fiction of the vehicle control apparatus.

The CPU 2011 of the vehicle control apparatus 2001 executes a feeding load restricting program shown in the flowcharts in FIG. 47 once every certain period of time, for example, every 15 microseconds, and when starting this program, firstly, the CPU 2011 acquires road information, weather information, road surface information and the like of an area where the vehicle is currently being driven from the car navigation unit 2004 and also acquires driving environments by acquiring vehicle speed, road gradient, operating information on the wipers and the like, the illuminance inside the vehicle and the like from the sensors 2021 and the switches 2022 (step 2101).

Next, the CPU 2011 extracts scores of various risk elements utilizing the risk element map shown in FIG. 42, which is stored in the ROM 2012 (step 2102) and, thereafter, calculates an accident risk level by adding together the scores of the respective risk elements (step 2103).

Figure 48:
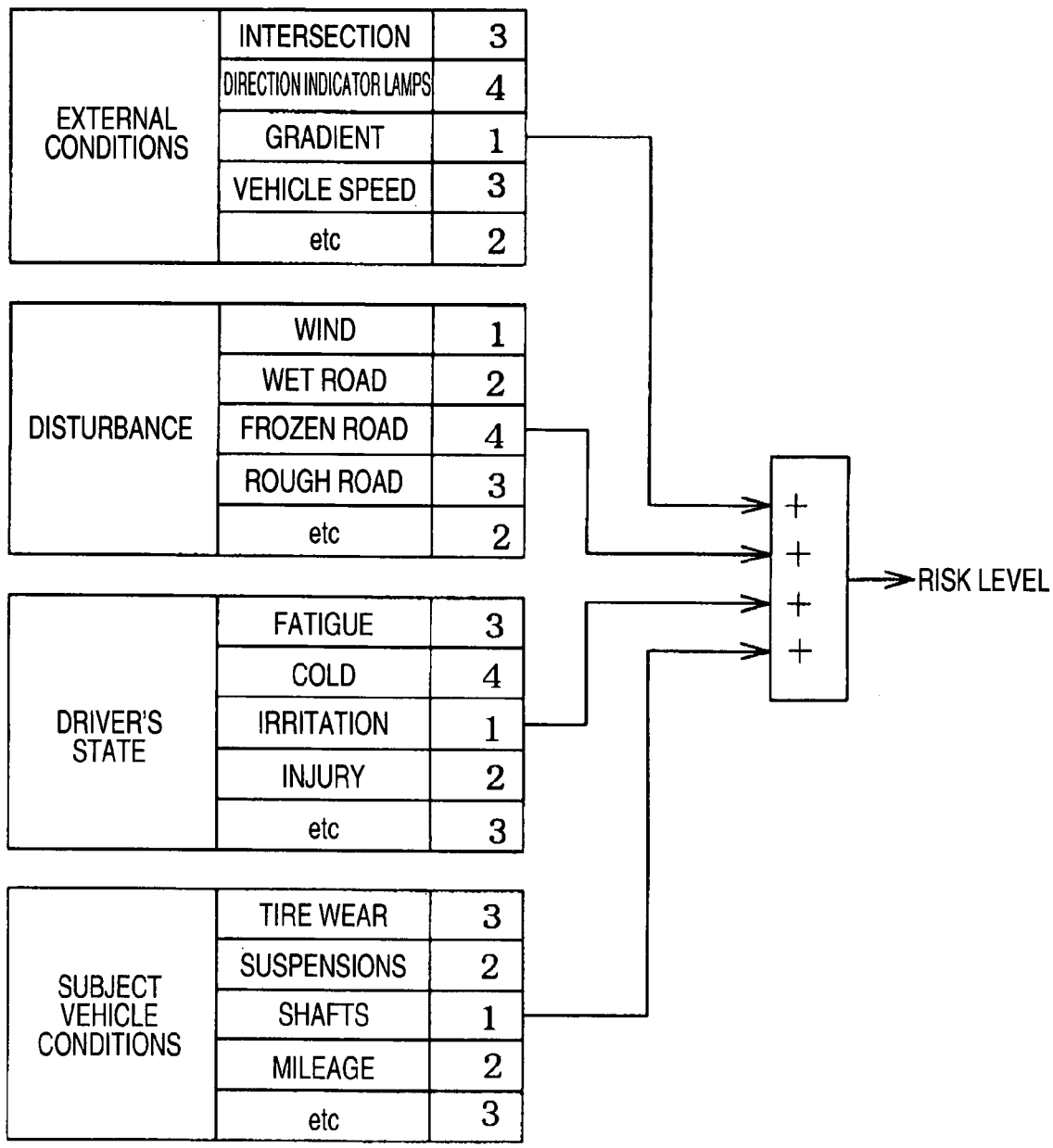
FIG. 48 is a drawing which explains a method of calculating an accident risk level.

Namely, as is shown in FIG. 48, the CPU 2011 extracts scores of the risk elements in the subject vehicle's driving conditions and calculates the risk level by adding together these scores so extracted.

Here, as risk elements in the external conditions, conditions in intersections, whether or not the devices sum as the wipers are in operation, the gradient of roads, vehicle speed and the like are included, and as disturbance elements, wind, wetness of road surfaces, freezing on road surfaces, rough road surfaces and the like are included. In addition, as elements of the driver's state, fatigue, whether or not he or she is suffering from cold, irritation, injury and the like are included, and as risk elements in the subject vehicle conditions, wear conditions of tires, how long suspensions and shafts have been in use, mileage covered by the vehicle and the like are included.

Note that the driver's fatigue conditions, whether or not he or she is having cold, irritated conditions, injury conditions and the like may be inputted from a display and operating unit (not shown) by the driver based on self-assessment, or the fatigue conditions can be made to be calculated from the driving time when he or she continues driving without breaks. Furthermore, the driver's state may be made to be detected via sensors and/or a camera.

Then, having calculated a risk level in the relevant area, the CPU 2011 compares the risk level so calculated with an accident risk level determination value, for example, 40 to thereby determine whether or not there is caused a possibility that the safety equipment is activated (step 2104), and if it determines that the calculated risk level is smaller than the accident risk level determination value, the CPU 2011 ends the program.

On the other hand, if determining in step 2104 that the calculated risk level is larger than the accident risk level determination value, the CPU 2011 executes issuing of a warning according the risk level based on the treatment table in FIG. 43 (step 2105), decides a target load whose operation is to be stopped according to the risk level and instructs the target electric equipment or the ECU which drives it to stop its operation via the communication line 2009, to thereby stop the target electric equipment or the ECU (step 2106).

By this configuration, when the risk level is in the range of 40 to 60, a voice message saying "An accident may occur. Please drive carefully." is given from the speech output unit 2023, and when the risk level is in the range of 60 to 80, a voice message saying "An accident is likely to occur. Please drive carefully." is given from the speech output unit 2023, and together with this wag, for example, a feeding load restriction of 400 W is executed. In addition, when the risk level is in the range of 80 to 95, a voice message saying "An accident is likely to occur. Please drive carefully." is given from the speech output unit 2023, and together with this warning, for example, a feeding load restriction of 600 W is executed, and when the risk level is 95 or higher, the preparation for occurrence of an accident is started to be made.

In addition, when executing the feeding load restriction, the CPU 2011 decides on a unit or device to which a feeding restriction is applied based on the order of preference of selection and required power in the respective levels of operation which are described on the unit-by-unit base for the respective devices on the vehicle equipment preference table shown in FIG. 46 which is stored in the ROM 2012. For example, in the case of the feeding restriction of 400 W, feeding to a massage seat, rearview mirror heaters, and seat heaters, and in the event that the massage seat is not in use, the feeding restriction is applied to a device on the table having the next lower preference of selection.

As has been described heretofore, since the driver can be warned against the anticipated risk by being given a warning according to the risk level that is obtained from the scores of the respective risk elements in the driving environments and the feeding restriction can be applied to the loads according the risk level, the occurrence of insufficient feeding can be prevented when the safety equipment is activated, thereby making it possible to ensure the activation of the safety equipment.

Embodiment 5

While in the above embodiment, the activation of the safety equipment is estimated by calculating the risk level by adding together the scores of the respective risk elements in the driving environments, for example, since the degree of risk changes when the environment changes depending on time of the day and weather conditions such as rain while the same driver continues to drive, the scores of disturbance, the driver's state and the conditions of the subject vehicle can be weighted according to the total score of the external conditions, and hereinafter, an embodiment will be described in which the scores of disturbance, the driver's state and the conditions of the subject vehicle are weighted.

Note that since the configurations of a vehicle system and a vehicle control apparatus remain the same as described in FIGS. 41 to 46, the description thereof will be omitted here.

Figure 49:
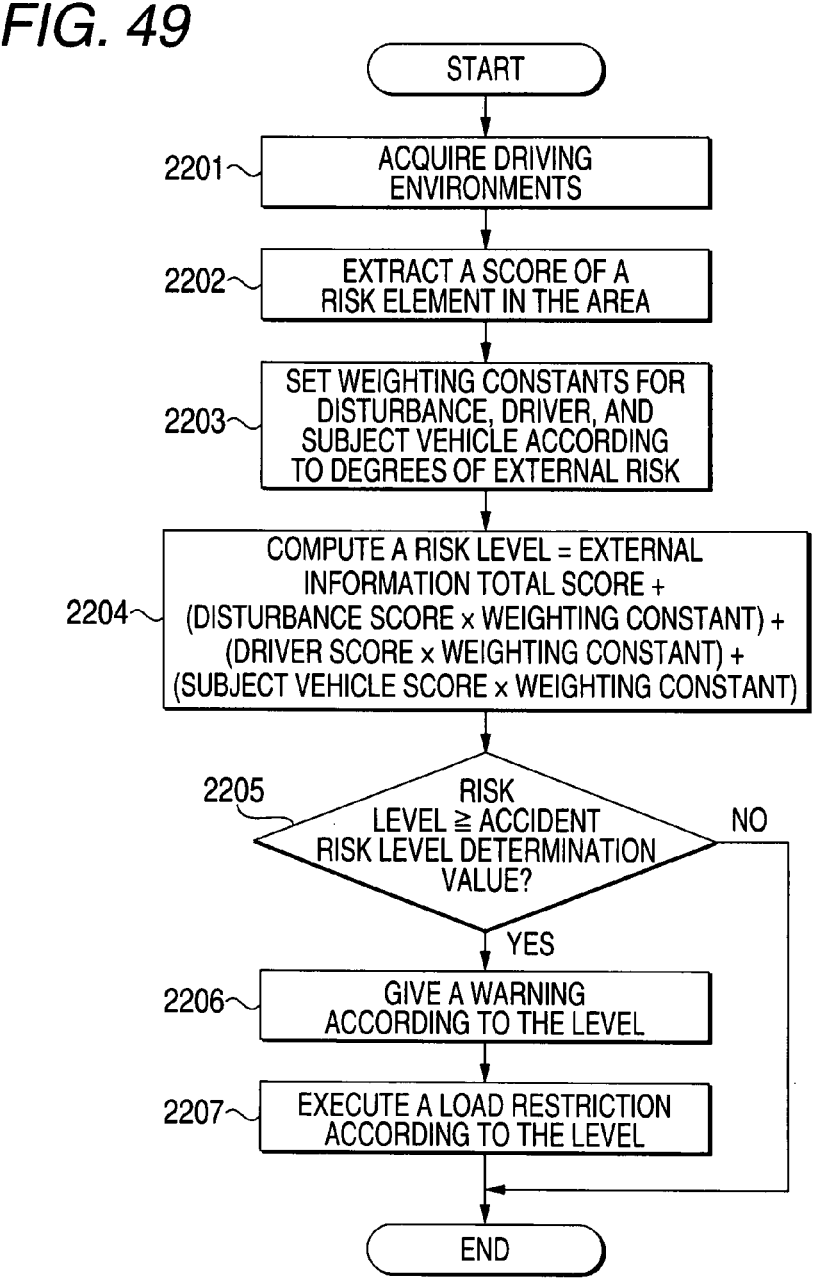
FIG. 49 is a flowchart which shows the function of a vehicle control apparatus of another embodiment.

A CPU 2011 of a vehicle control apparatus 2001 executes a feeding load restriction program shown in a flowchart in FIG. 49 once every certain period of time, for example, 15 microseconds, and when starting this program, firstly, as with what has been described in the above embodiment, the CPU 2011 acquires information on driving environment from a car navigation unit 2004, sensors 2021 and switches 2022 (step 2201) and thereafter extracts scores of respective risk elements based on the information so acquired by the use of the risk element map shown in FIG. 42 (step 2202).

Next, the CPU 2011 decides weighting constants for disturbance, the driver's state and the conditions of the subject vehicle according to a degree of external risk, that is, the total score of risk elements of the external conditions (step 22023).

In addition, in this case, by setting weighting constants for disturbance, the driver's state and the conditions of the subject vehicle for each predetermined range of total scores of the external conditions so as to be stored in the ROM 2012 as a weighting constant table, different weightings can be performed individually for disturbance, the driver's state and the conditions of the subject vehicle according to the degree, of external risk.

Figure 50:
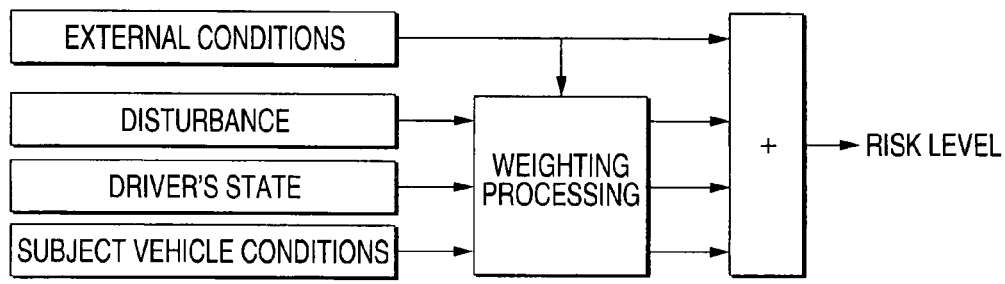
FIG. 50 is a drawing which shows a method of calculating a risk level by weighting scores of respective risk elements of disturbance, the state of the driver and the conditions of a subject vehicle.

Next, as is shown in FIG. 50, the CPU 2011 weights the scores of the respective risk elements of disturbance, the driver's state and the conditions of the subject vehicle with the weighting constants according to the total score of the external information and thereafter adds them up to thereby compute a risk level (=total score of external conditions+(disturbance score×weighting multiplier A)+(driver score× weighting multiplier B)+(subject vehicle score×weighting multiplier C)) (step 2204). Thereafter, the CPU 2011 compares the risk level so calculated with an accident risk level determination value to thereby determine whether or not there exists a possibility that the safety equipment is activated (step 2205). Then, if determining that the calculated risk level is larger than the accident risk level determination value, the CPU 2011 executes the issuance of warning according the risk level (step 2206) and decides a target load whose operation is to be stopped according to the risk level, whereby the CPU 2011 instructs the relevant electric equipment or an ECU which governs the driving of the target electric equipment to stop its operation via a communication line 2009 to thereby stop the electric equipment or the ECU (step 2207).

Embodiment 6

In addition, while in the embodiment, in the event that the important loads such as the safety system, running system and the like are expected to be activated in the future vehicle control, the feeding restriction is applied to the loads so that the expected activation of the loads can be attained, in the event that the activation of the loads is anticipated, the feeding load restriction can be executed by judging whether or not a shortage of power is caused by an increase in power consumption due to the activation of the relevant loads, and hereinafter, an embodiment will be described in which whether or not a shortage of power is caused by an increase in power consumption due to the activation of loads which are expected to be activated for operation. Note that since the configuration of a vehicle system remains the same as that described in FIGS. 41 to 45, the description thereof will be omitted here.

Figure 51:
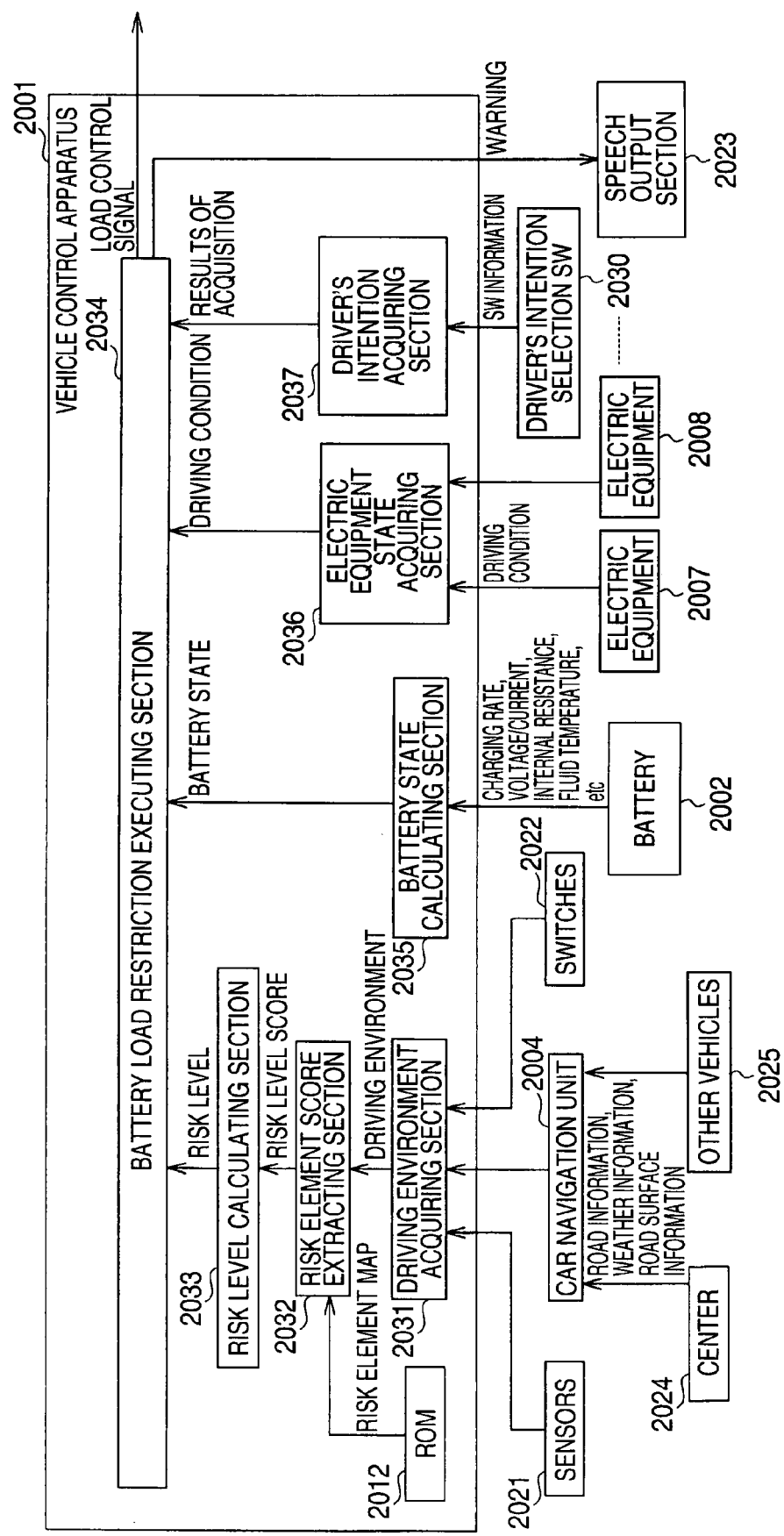
FIG. 51 is a function block diagram which represents the configuration of a vehicle control apparatus of an embodiment based on function.

FIG. 51 is a functional block diagram which represents the configuration of a vehicle control apparatus 2001 of this embodiment based on function, and as with what has been described in the above embodiment, each section of the unit is made up of a CPU 2011, a ROM 2012 and a RAM 2013, and these functions are executed through software. In this configuration, since the functions of a driving environment acquiring section 2021, a risk element score extracting section 2032 and a risk level calculating section 2033 are the same as the functions of the corresponding functional sections shown in FIG. 46, the description thereof will be omitted.

A battery state calculating section 2035 acquires the voltage, current, battery fluid temperature and the like of the battery from the battery 2002 so as to calculate a quantity of residual electrical energy of the battery and a battery state such as an internal resistance thereof for input into a load restriction executing section 2034. An electric equipment state acquiring section 2036 acquires activating state and driving state of various pieces of electric equipment for input into the load restriction executing section 2034.

In addition, a driver's intention acquiring section 2081 detects the selecting state of a driver's intention selection switch 2030 by which the driver designates which table or part of the table shown in FIG. 44 is to be used when expecting the activation of safety equipment for input into the load restriction executing section 2034. Namely, since whether or not the safety equipment is activated largely depends on the way the driver drives, the driver is allowed to designate the table to be used.

Then, the load restriction executing section 2034 estimates the activation of the safety equipment according to an accident risk level sent from the risk level calculating section 2083 and judges whether or not a shortage of power is caused by an increase in power consumption due to the activation of the safety equipment from the battery state and the driving state of the electric equipment so as to execute a load restriction on the electric equipment and ECU's.

Next, the functions of the respective functional sections of the vehicle control apparatus 2001 will be described by the use of the block diagram shown in FIG. 41 and a flowchart shown in FIG. 52.

Figure 52:
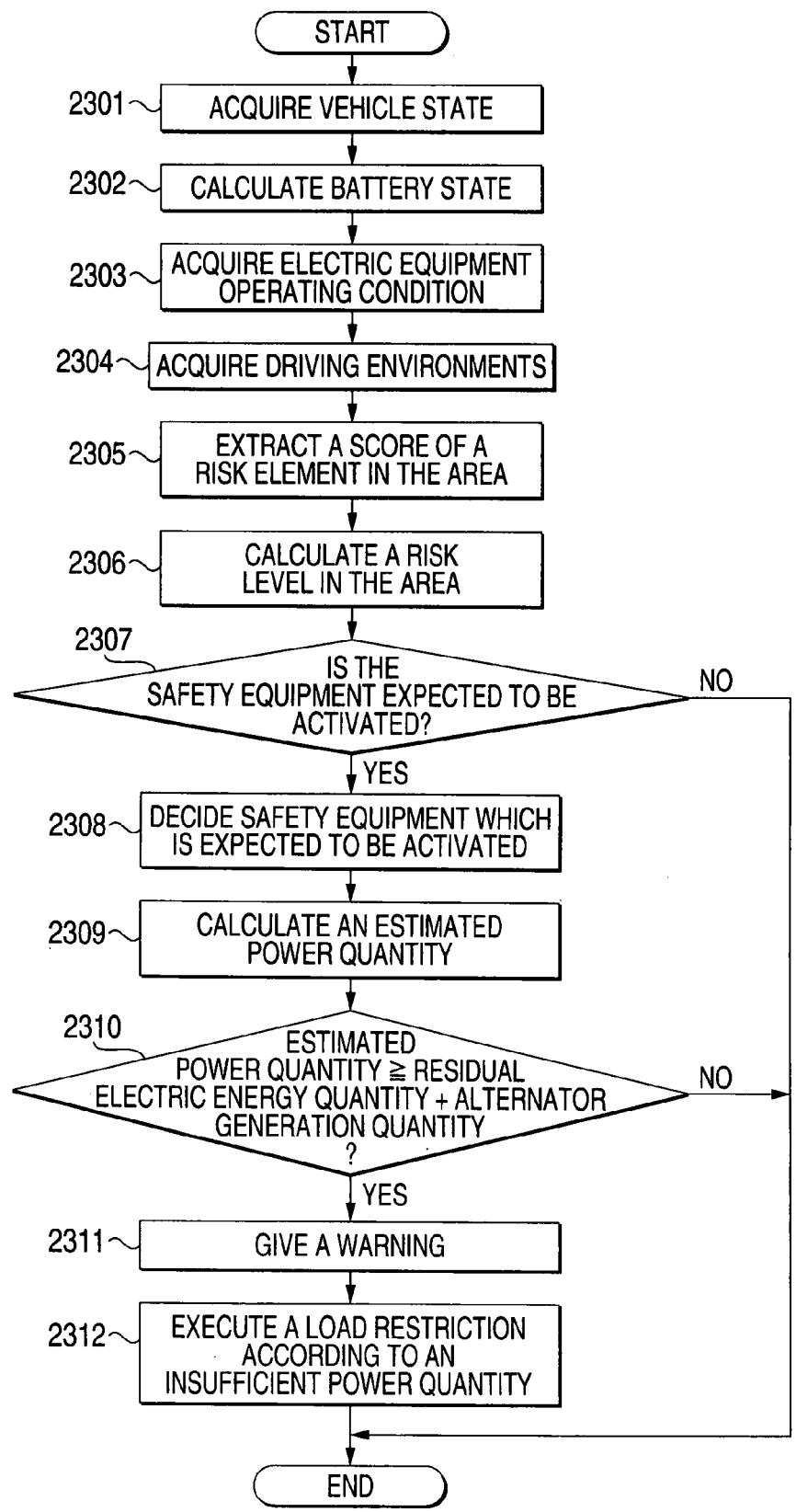
FIG. 52 is a flowchart which shows the function of the vehicle control apparatus in FIG. 51.

The CPU 2011 of the vehicle control apparatus 2001 executes a feeding load restriction program shown in the flowchart in FIG. 52 once every certain period of time, for example, 15 microseconds, and when starting this program, firstly, the CPU 2011 detects the vehicle state such as acceleration or deceleration, engine speed and the like of the vehicle (step 2301) and acquires the voltage, current, battery fluid temperature and the like of the battery from the battery 2002 so as to calculate a quantity of residual electrical energy of the battery and the battery state such as an internal resistance thereof (step 2302).

Next, having detected the operating conditions of electric equipment such as an air conditioner, au audio unit and a car navigation unit and ECU's (step 2303), the CPU 2011 acquires driving environments from the car navigation unit 2004, sensors 2021 and switches 2022 (step 2304). Thereafter, the CPU 2011 extracts scores of respective risk elements in a specific area from the risk element map shown in FIG. 42 based on the driving environment information so acquired (step 2305), and calculates an accident risk level by adding up the scores of the respective risk elements (step 2306).

Then, having calculated the risk level, the CPU 2011 determines whether or not the activation of the safety equipment is expected based on the calculated risk level by referring to the safety equipment operation estimating table shown in FIG. 44 (step 2307), and if determining that the activation of the safety equipment is not expected, the CPU 2011 ends the program.

On the other hand, if determining that the activation of the safety level is expected from a risk level being 70, the CPU 2011 selects either of the table A and the table B of the safety equipment operation estimating table in FIG. 44 according to the switching state of the driver's intention selection switch 2030 and decides on the safety equipment which is expected to be activated for operation based on the risk level.

Next, the CPU 2011 reads out power necessary for activation of the safety equipment which is expected to be activated for operation from the consumed power data in the table shown in FIG. 45 and adds consumed power of the loads which are now being driven to the consumed power so read out to thereby calculate an estimated power quantity (step 2309). Thereafter, the CPU 2011 determines whether or not the estimated power quantity so calculated is larger than a sum of a quantity of residual electrical energy of the battery 2002 and a generation quantity by an alternator 2003 which is calculated from the acceleration/deceleration of the vehicle and the engine speed (step 2310), and if determining that the estimated power quantity is smaller than the sum of the quantity of residual electrical energy of the battery 2002 and the generation quantity by the alternator 2003, the CPU 2011 ends the program.

In addition, if determining that the calculated estimated power quantity is larger than the sum of the quantity of residual electrical energy of the battery 2002 and the generation quantity of the alternator 2003, the CPU 2011 executes the issuance of a warning (step 2311), decides on a target load whose operation is to be stopped based on a quantity of power which will be short and the order of preference of selection of the devices equipped on the vehicle which is shown in FIG. 45. Then, the CPU 2011 instructs the target electric equipment or the ECU which governs the driving of the target electric equipment to stop operation via the communication line 2009, whereby the target electric equipment or the governing ECU is so stopped so as to execute the load restriction (step 2312).

As has been described heretofore, by executing the feeding load restriction by judging whether or not a shortage of power is caused by an increase in consumed power due to the activation of the load when the load is expected to be activated, an unnecessary feeding load restriction can be prevented.

Embodiment 7

Furthermore, while in the embodiment, when executing the feeding load restriction, the vehicle control apparatus instructs the target electric equipment or its governing ECU to stop operation via the communication line so that the electric equipment or the ECU stops operation on its own, the vehicle control apparatus can directly stop the operation of the relevant electric equipment or the ECU, and hereinafter, an embodiment will be described below in which the vehicle control apparatus stops directly the target electric equipment or its governing ECU.

Figure 53:
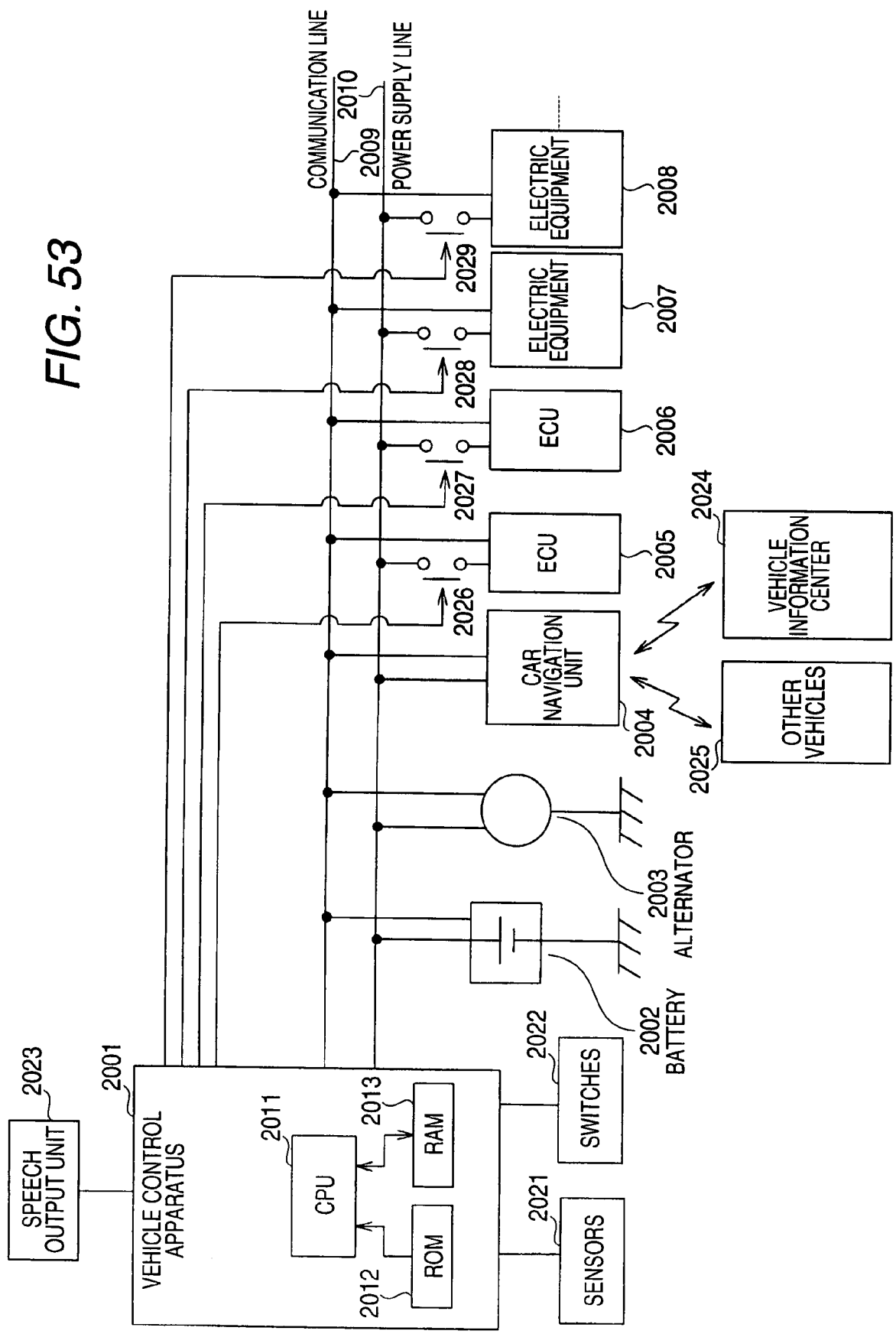
FIG. 53 is a block diagram which shows the configuration of a vehicle system which includes a vehicle control apparatus of a father embodiment.

FIG. 53 is a block diagram showing the configuration of a vehicle system which includes a vehicle control apparatus of this embodiment, and this vehicle control system is the same as the vehicle system shown in the block diagram of FIG. 41 except that power supply switches 2026 to 2029 are provided on ECU's 2005, 2006 and pieces of electric equipment 2007, 2008 . . . , respectively, and therefore, the description thereof will be omitted herein.

In this embodiment, the ECU's 2005, 2006 and the pieces of electric equipment 2007, 2008 are activated by the power supply switches 2026 to 2029 being switched on by the vehicle control apparatus 2001, and when the activation of safety equipment is expected and a feeding load restriction is executed, the power supply switches 2026 to 2029 are switched off by the vehicle control apparatus 2001, whereby the driving of the ECU's or the electric equipment to which the feeding restriction is applied is stopped.

In addition, when performing the feeding restriction on the ECU, a master ECU is provided which acquires driving environments from the car navigation unit 2004, and the sensors 2021 and the switches 2022, so that the driving environments so acquired is then transferred to the respective ECU's from the master ECU, whereby the respective ECU's judge on the enforcement of a feeding load restriction on their own, so that the ECU's can stop the operations on their own as required.

Embodiment 8

In addition, while in the embodiment, the feeding load restriction is executed by estimating the activation of the safety equipment according the risk level, a risk avoidance control can be executed according the risk level, and an embodiment will be described below in which a lip avoidance control is performed according to the risk level.

Figure 54:
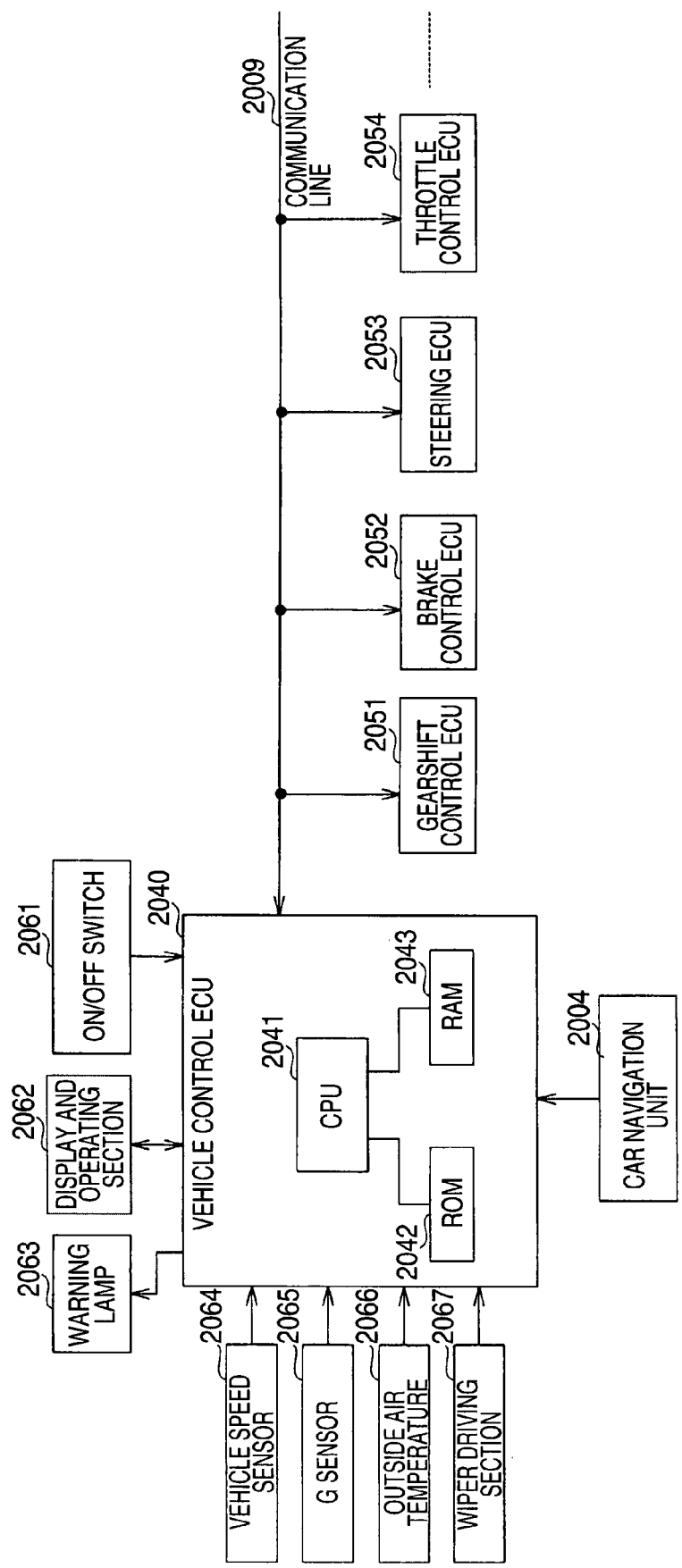
FIG. 54 is a block diagram which shows the configuration of a slip avoidance system.

FIG. 54 is a block diagram showing the configuration of a vehicle system which includes a vehicle control ECU which performs a slip avoidance control, and this system is made up of a plurality of ECU's such as a vehicle control ECU 2040, a change-speed or gearshift control ECU 2501, a brake control ECU, a steering control ECU 2053, and a throttle control ECU 2054, and these ECU's are connected to each other via communication line 2009.

The vehicle control ECU 2040 is such as to calculate a curve entering permissible speed and a permissible G based on road conditions and driving environments so as to perform a slip avoidance control and is made up of a CPU 2041, a ROM (Read Only Memory) 2042, a RAM (Random Access Memory) 2043, a communication section (not shown), input and output circuits (not shown) and the like. The CPU 2041 controls hardware sections of the vehicle control ECU 2040 and executes various programs including a slip avoidance control based on programs stored in the ROM 2042. The ROM 2042 stores therein programs including the slip avoidance control program and data such as accident risk levels based on various driving environments. The RAM 2043 is made up of an SRAM and the like and stores data which is temporarily generated.

An ON/OFF switch 2061, a display and operation section 2062 and a warning lamp 2063 are connected to the vehicle ECU 2040. The ON/OFF switch 2061 is designed for the driver to select the enablement of the slip avoidance control, and when this ON/OFF switch is switched off, the vehicle control ECU 2001 performs neither a deceleration control nor slip suppressing control.

The display and operation section 2062 displays various types of data which results in association with the implementation of the slip avoidance control and is also designed for the driver to input his or her state of health. As this display and operation section 2062, a display and operation section of the car navigation unit 2004 can be used, and by utilizing a touch-panel switch disposed on an LCD display section of the car navigation unit, various types of data can be inputted.

Furthermore, the warning lamp 2063 is designed to be illuminated or caused to flash by the vehicle control ECU 2040 when there exists a possibility of slip.

Furthermore, sensors such as a vehicle speed sensor 2064, a G sensor 2065 and outside air temperature sensor 2066, a wiper driving section 2067 and the like are connected to the vehicle control ECU 2040, so that detection outputs of the various sensors and driving condition signals are inputted thereinto, and road information such as curve information and weather information are inputted into the vehicle control ECU 2040 from the car navigation unit 2004.

On the other hand, the gearshift control ECU 2051 is such as to perform a gearshift control of the vehicle, inputs a current gear position into the vehicle control ECU 2040 via the communication line 2009, and performs a downs when receiving a speed reduction instruction from the vehicle control ECU 2040. In addition, the brake control ECU 2052 is such as to perform an anti-lock brake control, an automatic brake control and the like and inputs a current brake state into the vehicle control ECU 2040 via the communication line 2009, performing a braking operation, a braking force enhancement and the like when receiving a speed reduction instruction from the vehicle control ECU 2040.

Furthermore, outputs from a torque sensor for detecting a torque acting on both ends of a torsion bar are inputted into the steering ECU 2053, whereby the steering ECU 2053 moves a steering shaft in a direction in which the torque acting on both the ends of the torsion bar can be cancelled, and the steering ECU 2053 performs a steering operation when receiving a slip suppressing control instruction from the vehicle control ECU 2040.

In addition, the throttle control ECU 2054 is such as to take in a travel of a depressed accelerator pedal as an electric signal by a sensor and apply a predetermined arithmetic processing to the signal so taken in for supply to an actuator made up of an electric motor or the like, so that the actuator controls the opening and closing of a throttle valve, and when receiving a speed reduction instruction from the vehicle control ECU 2040, the throttle control ECU 2054 performs a control to close the throttle valve.

Next, a function of the vehicle control ECU 2040 when performing a slip avoidance control will be described by reference to a flowchart shown in FIG. 55.

Figure 55:
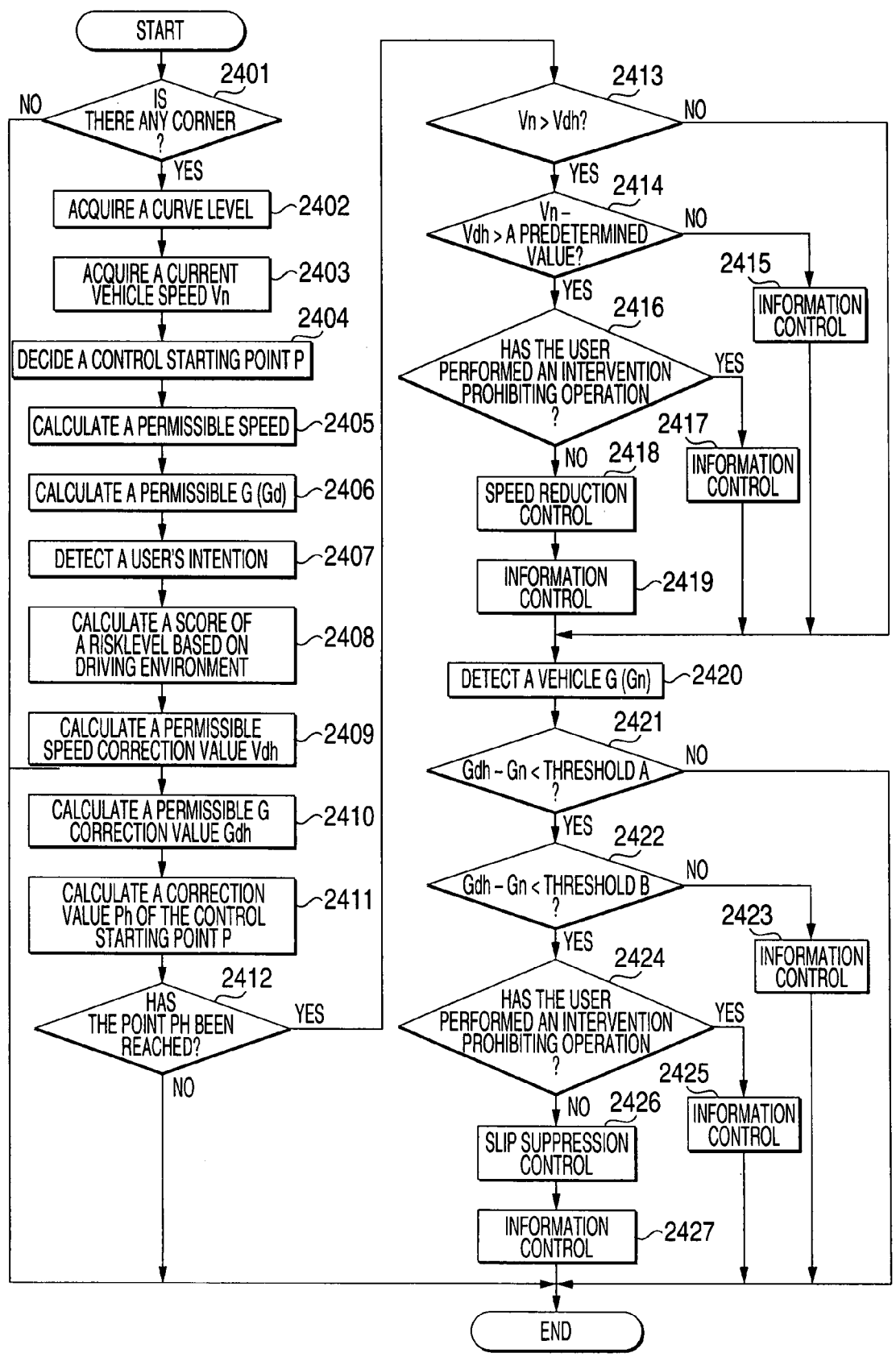
FIG. 55 is a flowchart which shows the function of a vehicle control ECU when performing a slip avoidance control.

When an ignition switch of the vehicle is switched on, the CPU 2041 of the vehicle control ECU 2040 executes a program shown in the flowchart in FIG. 55 once every certain period of time, and when starting the program, firstly, the CPU 2041 determines whether or not there exists a curve or a corner such as an intersection on the driving course ahead of the vehicle within a predetermined distance based on map information obtained from the navigation unit 2004 (step 2401). If determining that there exists no corner on the driving course ahead of the vehicle, the CPU 2041 ends the program, whereas if determining that there exists a corner on the driving course ahead of the vehicle, the CPU 2041 calculates a radius of curvature of the curve on the driving course ahead of the vehicle by processing the map information so obtained and acquires a curve level (step 2402).

Figure 56A:
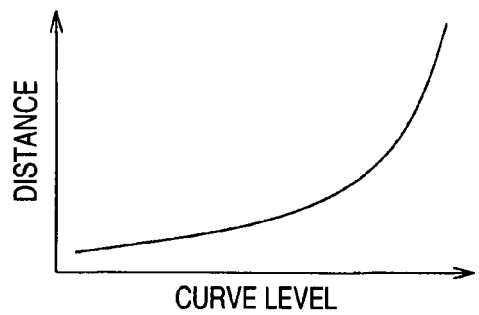
FIG. 56 shows an example of tables stored in the ROM which show associated relationships between curve level and control starting distance, and vehicle speed and control starting distance correction value, respectively.
Figure 56B:
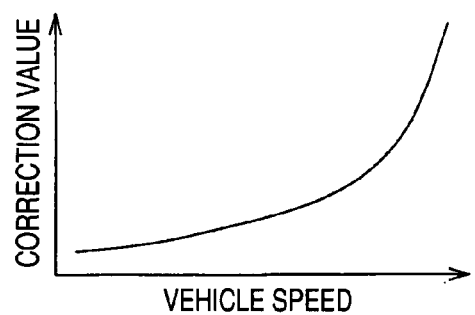

Having acquired the curve level, the CPU 2041 acquires a current vehicle speed Vn based on an output of the vehicle speed sensor 2064 (step 2403). Next, the CPU 2041 obtains a control starting distance based on the curve level obtained in step 2402 by utilizing a table shown in FIG. 56(A) and stored in the ROM 2042 in which curve levels are associated with control starting distances and thereafter, obtains a correction value based on the vehicle speed Vn by utilizing a table shown in FIG. 56(B) and stored in the ROM 2042 in which correction values are associated with control starting distances, deciding a control starting point P by correcting the control starting distance by the correction value so obtained (step 2404).

Figure 57A:
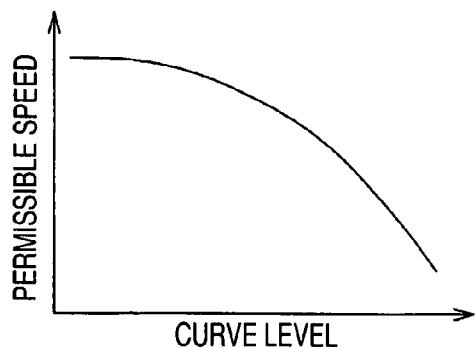
FIG. 57 shows an example of tables stored in the ROM which show associated relationships between curve level and permissible speed, and curve level and permissible G, respectively.
Figure 57B:
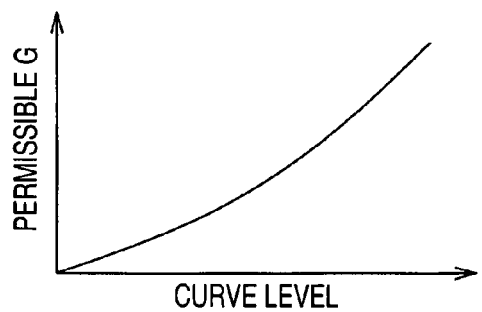

Next, the CPU 2041 obtains a permissible speed Vd based on the curve level by utilizing a table stored in the ROM 2042 and shown in FIG. 57(A) in which curve levels are associated with permissible speeds (step 2405) and obtains a permissible G (Gd) based on the curve level by utilizing a table stored in the ROM 2042 and shown in FIG. 57(B) in which curve levels are associated with permissible G's (step 2406). Thereafter, the CPU 2401 determines whether or not the ON/OFF switched is switched off to thereby detect an intention of the user or the driver relative to the slip avoidance control (step 2407).

Figure 58A:
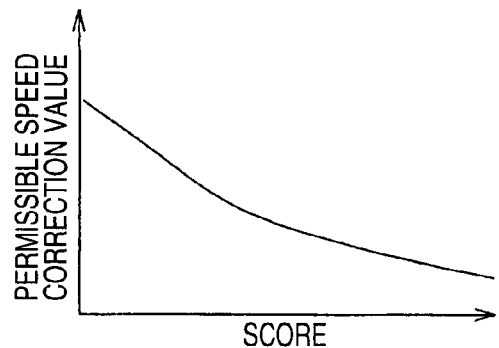
FIG. 58 shows an example of tables stored in the ROM which show associated relationships between score of risk level and permissible speed correction value, and score of risk level and permissible G correction value, respectively.

Next, the CPU 2041 calculates a score for a risk level based on driving environments (step 2408), thereafter, reads out a correction value of the permissible speed by utilizing a table stored in the ROM 2042 and shown in FIG. 58(A) in which total scores of risk levels are associated with correction values of permissible speeds and corrects the permissible speed Vd which was calculated in step 2405 by the corrected value so read out, so as to calculate a permissible speed correction value Vdh (step 2409).

Figure 58B:
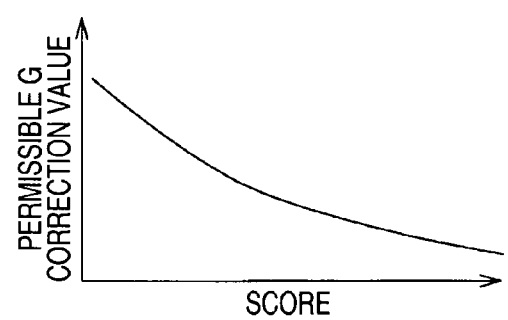

In addition, similarly, the CPU 2041 reads out a correction value of the permissible G by utilizing a table stored in the ROM 2042 and shown in FIG. 58(B) in which scores of risk levels are associated with correction values of permissible G's, corrects the permissible G (Gd) which was calculated in step 2406 by the correction value so read out, and calculates a permissible G correction value Gdh (step 2410). Namely, the correction is performed such that as the total score of risk levels increases, the permissible G correction value Gdh decreases.

Next, the CPU 2041 reads out a correction value of the control starting point by utilizing a table (not shown) stored in the ROM 2042 in which scores of risk levels are associated with correction value of control starting points, corrects the control starting point P which was calculated in step 2404 by this correction value so read out, and calculates a control starting point correction value Ph (step 2411). Namely, the correction is performed such that as total scores of risk levels increases, the control starting point lies farther away from the corner.

Figure 59:
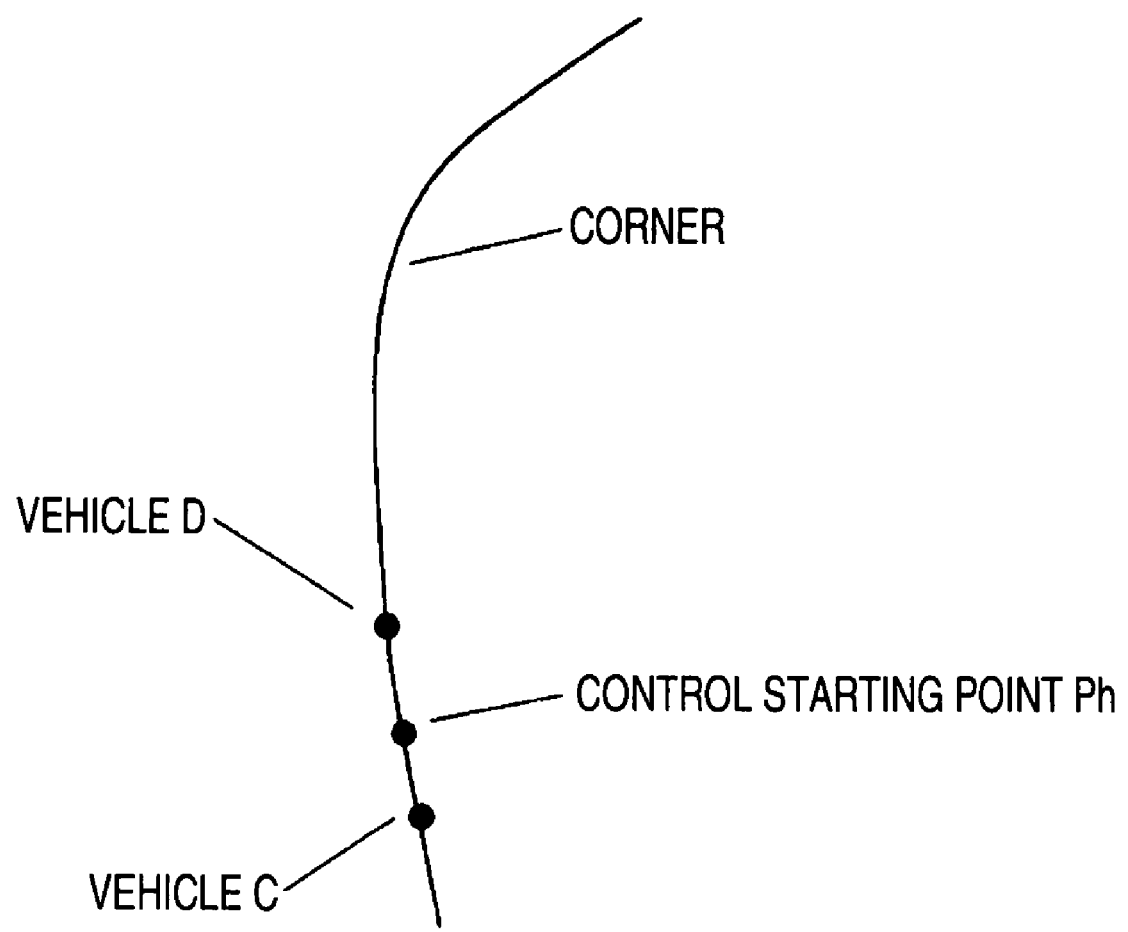
FIG. 59 is a drawing which explains a positional relationship between corner, vehicle positions and control starting point.

Having calculated the correction values (Vdh, Gdh, Ph) of the permissible speed, permissible G, and the control starting point, the CPU 2041 determines whether or not the vehicle lies closer to the corner than the control starting point Ph based on vehicle position information from the navigation unit 2004 (step 2412), and if determining that the vehicle has not yet reached the control starting point Ph as shown in FIG. 59, the CPU 2041 ends the program.

On the other hand as is shown in FIG. 59, if determining that the vehicle D has passed the control starting point Ph, the CPU 2041 determines whether or not the current vehicle speed Vn exceeds the permissible speed Vdh (step 2413). If determining that the current vehicle speed Vn exceeds the permissible speed Vdh, the CPU 2041 determines whether or not a difference between the current vehicle speed Vn and the permissible speed Vdh exceeds a predetermined value (step 2414).

If determining that the difference between the current vehicle speed Vn and the permissible speed Vdh does not exceed the predetermined value, the CPU 2041 informs the diver that the current vehicle speed exceeds the permissible speed Vdh (step 2415). In addition, if determining that the difference between the current vehicle speed Vn and the permissible speed Vdh exceeds a predetermined value, the CPU 2041 determines whether or not the user has performed an intervention prohibiting operation based on the results of the detection of the intention of the user cared out in step 2407. If determining that the user has switched off the ON/OFF switch 2061, the CPU 2041 informs the user or the driver that the current vehicle speed largely exceeds the permissible speed by causing the warning lamp 2063 to flash (step 2417).

On the other hand, if determining in step 2416 that the user has performed no intervention prohibiting operation, the CPU 2041 performs a speed reduction control by instructing the gearshift control ECU 2501 to perform a downshift, the brake control ECU 2052 to perform a braking operation and a brake force enhancement and the throttle control ECU 2054 to control the throttle valve to close so that at least one of the three ECU's executes the instruction properly (step 2418), and thereafter, informs the driver that the speed reduction control is being performed by causing the warning lamp 2063 to flash (step 2419).

Then, if determining in step 2413 that the current vehicle speed does not exceed the permissible speed, or after having informed the driver as has been described before in step 2415, step 2417 or step 2419, the CPU 2041 detects the current vehicle G (Gn) based on an output from the G sensor 2065 (step 2420). Following this, the CPU 2041 determines whether or not a difference between the current vehicle G (Gn) and the permissible G (Gdh) is smaller than a primary threshold A (step 2421), and if determining that the difference is larger than the primary threshold A, the CPU 2041 ends the program.

On the other hand, if determining in step 2421 that the difference between the current vehicle G (Gn) and the permissible G (Gdh) is smaller than the primary threshold, the CPU 2401 determines whether or not the difference between the current vehicle G (Gn) and the permissible G (Gdh) is smaller than a secondary threshold B (B<A) (step 2422). If determining that the difference is larger than the secondary threshold B, the CPU 2041 informs the driver that the current vehicle G is approaching the permissible G (Gdh) by causing the warning lamp 2063 to flash (step 2433). In addition, if determining that the difference between the current vehicle G (Gn) and the permissible G (Gdh) is smaller than the secondary threshold B, the CPU 2041 determines whether or not the user has performed an intervention prohibiting operation based on the results of the detection of the user's intention carried out in step 2407 (step 2424), and if determining that the user has switched off the ON/OFF switch 2061, the CPU 2041 informs the driver that the current vehicle G has substantially reached the permissible G by causing the warning lamp 2063 to flash (step 2425).

Then, if determining in step 2424 that the user has performed no intervention prohibiting operation, the CPU 2041 performs a slip suppression control by instructing the gearshift control ECU 2501 to perform a dow, the brake control ECU 2052 to perform a braking operation and a brake force enhancement, the throttle control ECU 2054 to control the throttle valve to close, or the steering ECU to perform a steering operation so that at least one of the four ECU's executes the instruction properly (step 2426), and thereafter, informs the driver that the slip suppression control is being performed by causing the warning lamp 2063 to flash (step 2427).

Note that while in the embodiment that has been described heretofore, the warning lamp 2063 is caused to flash in the warning control in the steps 2417, 2419, 2425 and 2427, a configuration may be adopted in which the warning lamp 2063 is caused to flash in steps 2417, 2425, while in steps 2419, 2427, the warning lamp 2063 is illuminated in a different color, so as to have different informing methods. In addition, the information in steps 2415, 2417, 2419, 2423, 2425 and 2427 can be implemented in voice or characters which are displayed on the display and operating section 2026.

In the above described embodiments, the degrees of risk is calculated by the vehicle control apparatus mounted on the vehicle A based on external information and information acquired from the car navigation system. However, the calculation of the degree of risk is not limited by the above described embodiments. For example, a vehicle information center B may calculate the degree of risk. Specifically, the following embodiment can be applied to the invention.

Figure 60:
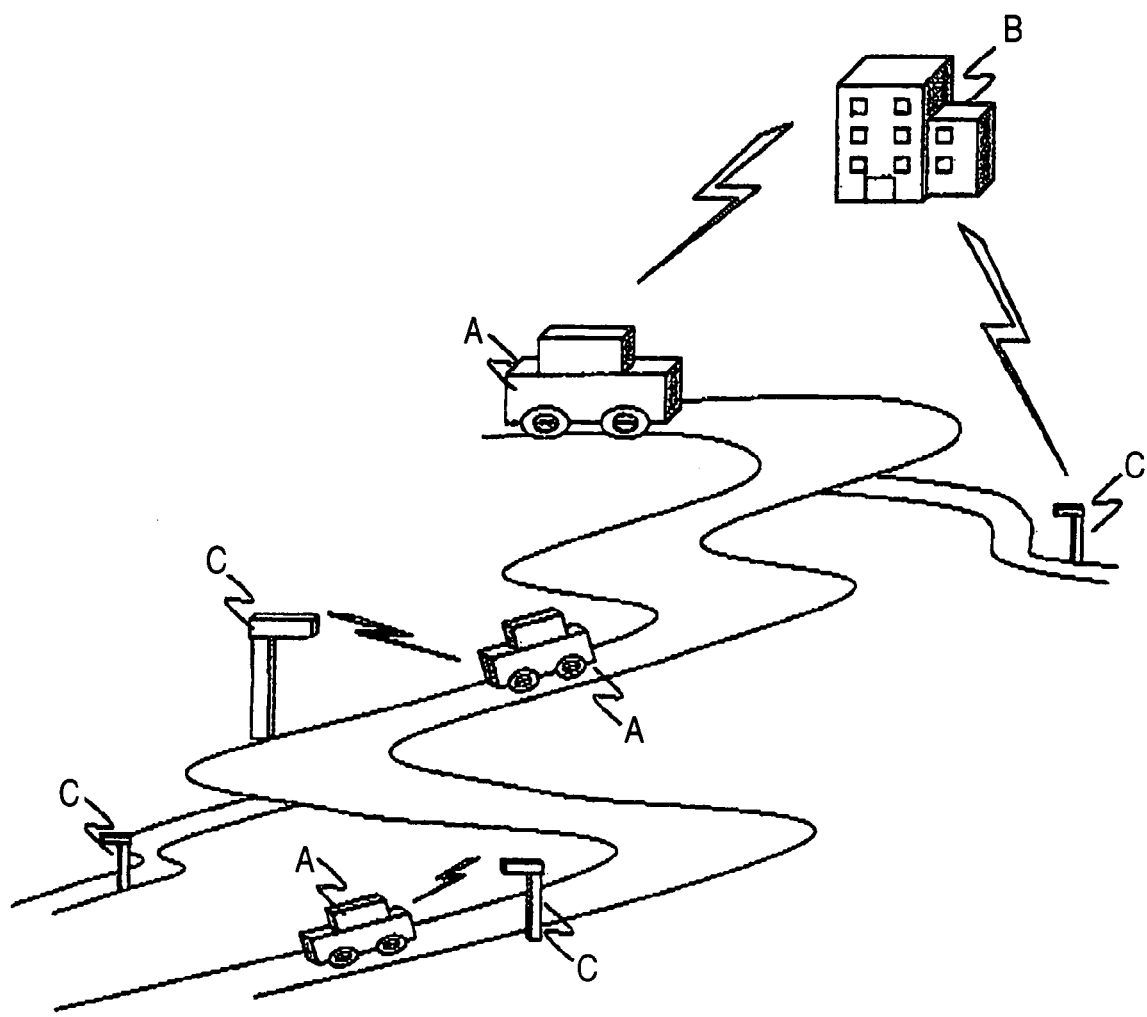
FIG. 60 is a view showing a radio communication between a vehicle information center and a vehicle according to an embodiment of the present invention.

The vehicle information center B calculates the degree of risk at the risky point on the road. Specifically, after the user sets the goal in the car navigation system mounted on the vehicle A and selects the driving route to the goal, the vehicle information center B receives the selected driving route from the vehicle A. The vehicle information center B calculates the degree of risk at the risky point on the driving route by weighting scores of each of the risk elements which are included in the road information, the weather information, and the road surface information or the like which are acquired from, for example, different systems from the vehicle information center B. Then, the vehicle information center B transmits the calculated degree of risk to the vehicle A through the radio communication. The vehicle control apparatus which is mounted on the vehicle A receives the transmitted information on the degree of risk and executes the respective vehicle controls explained in the above described embodiments based on the received information on the degree of risk together with the map information stored in the car navigation system. As shown in FIG. 60, the radio communication between the vehicle information center B and the vehicle A is not only directly implemented, but also indirectly implemented via a intermediate apparatus C provided in a road side in the driving route.

In addition, if the user does not set the goal on the car navigation apparatus in the vehicle, the driving route to be transmitted from the vehicle A to the vehicle information center B does not exist. In this case, the vehicle information center B predicts information on a provisional goal based on the information on the traveling direction of the vehicle A, information on the vehicle speed, information on operation of the direction indicator, and information on the driving history, which are received from the vehicle A and the vehicle information center B determines a provisional driving route based on the predicted information on the provisional goal. The vehicle information center B calculates the degree of risk at the risky point on the determined provisional driving route by weighting scores of each of the risk elements which are included in the road information, the weather information, the road surface information or the like which are acquired from, for example, the different systems from the vehicle information center B. Then, the vehicle information center B transits the calculated degree of risk to the vehicle A through the radio communication. The vehicle control apparatus which is mounted on the vehicle A receives the transmitted information on the degree of risk and executes the respective vehicle controls explained in the above described embodiments based on the received information on the degree of risk together with the map information stored in the car navigation system. As shown in FIG. 60, the radio communication between the vehicle information center B and the vehicle A is not only directly implemented, but also indirectly implemented via the intermediate apparatus C provided in a road side in the driving route.

Further, in order to simplify the system configuration of the above embodiment, when the vehicle A comes within a predetermined distance from the risky point existed on the traveling direction of the vehicle A, the vehicle information center B calculates the degree of risk at this risky point by weighting scores of each of the risk elements which are included in the road information, the weather information, the road surface information or the like which are acquired from, for example, the different systems from the vehicle information center B. Then, the vehicle information center B transmits the calculated degree of risk to the vehicle A through the radio communication. The vehicle control apparatus which is mounted on the vehicle A receives the transmitted information on the degree of risk an executes the respective vehicle controls explained in the above described embodiments based on the received information on the degree of risk together with the map information stored in the car navigation system. As shown in FIG. 60, the radio communication between the vehicle information center B and the vehicle A is not only directly implemented, but also indirectly implemented via the intermediate apparatus C provided in a road side in the driving route.

What is claimed is:

1. A vehicle control apparatus adapted to be mounted on a vehicle, comprising:
   a receiving section operable to receive information on a degree of risk in a point through which the vehicle is predicted to drive from outside of the vehicle; and
   a vehicle control section operable to control the vehicle based on the information received from the outside of the vehicle.

2. A method for controlling a vehicle, comprising:
   receiving information on a degree of risk in a point through which a vehicle is predicted to drive from outside of the vehicle; and
   controlling the vehicle based on the information received from the outside of the vehicle.

3. A vehicle control method, comprising:
   calculating a degree of risk in a risky point through which a vehicle is predicted to drive;
   controlling the vehicle based on the calculated degree of risk;
   comparing the calculated degree of risk with a predetermined value; and
   executing a cut-off of feeding to a load according to the calculated degree of risk in a case where the calculated degree of risk is greater than the predetermined value.

4. A vehicle control method, comprising:
   calculating a degree of risk in a risky point through which a vehicle is predicted to drive based on environment information on a driving route through which the vehicle is predicted to drive;
   setting a point on the driving route, where the calculated degree of risk thereof is equal to or greater than a predetermined degree of risk as a point where unique charging or discharging of a battery is predicted;
   judging whether the battery has a power required to activate a safety function required at the set point; and
   notifying a driver of a predicted risk in a ease where the battery does not have the power required to activate the safety function.

5. A vehicle control method as set forth in claim 4, further comprising:
   predicting a charging or discharging control of the battery based on a battery condition of the battery, a driving condition of electric equipment mounted on the vehicle, the acquired environment information on the driving route, and the unique charging or discharging of the battery; and judging whether a restriction for feeding the power to the electric equipment and intervene in the charging control are required based on the predicted charging or discharging control.

6. A vehicle control apparatus adapted to be mounted on a vehicle, comprising:
a vehicle control section operable to control the vehicle based on information on a degree of risk in a risky point through which the vehicle is predicted to drive; and
a degree-of-risk calculating section operable to calculate the degree of risk in a driving area through which the vehicle is predicted to drive,
wherein the vehicle control section is a load restriction executing section operable to compare the calculated degree of risk with a predetermined value and execute a cut-off of feeding to a load according to the calculated degree of risk in a case where the calculated degree of risk is greater than the predetermined value.

7. The vehicle control apparatus as set forth in claim 6, wherein the degree-of-risk calculating section calculates the degree of risk in the driving area by weighting a score of risk element.

8. The vehicle control apparatus as set forth in claim 6, wherein the load restriction executing section predicts an activation of a safety equipment mounted on the vehicle according to the calculated degree of risk and determines whether the cut-off of the feeding to the load is executed based on a quantity of power to be used by the predicted activation of the safety equipment, a quantity of power of the battery, and a quantity of power generated by an alternator.

9. The vehicle control apparatus as set forth in claim 6, wherein the load control executing section instruct the load to stop an operation thereof, whereby the load stops the operation thereof in a case where the load control executing section executes the cut-off of the feeding to the load.

10. The vehicle control apparatus as set forth in claim 6, wherein the load control executing section cuts off a power supply to the load in a case where the load control executing section executes the cut-off of the feeding to the load.

11. A vehicle control apparatus adapted to be mounted on a vehicle, comprising:
a vehicle control section operable to control the vehicle based on information on a degree of risk in a risky point through which the vehicle is predicted to drive;
an environment information acquiring section operable to acquire environment information on a driving route through which the vehicle is predicted to drive;
a degree-of-risk calculating section operable to calculate the degree of risk based on the acquired environment information on the driving route;
a point setting section operable to set a point on the driving route, where the calculated degree of risk thereof is equal to or greater than a predetermined degree of risk as a point where unique charging or discharging of a battery is predicted; and
a safety function confirming section operable to confirm a safety function required at the set point on the driving route,
wherein the vehicle control section is a control section operable to judge whether the battery has a power required to activate the safety function required at the set point, and notify a driver of a predicted risk in a case where the battery does not have the power required to activate the safety function.

12. The vehicle control apparatus as set forth in claim 11, further comprising:
an alternative availability judging section operable to judge whether the safety function required at the set point is replaceable with the other function equipped on the vehicle in a case where the required safety function is not equipped on the vehicle.

13. The vehicle control apparatus as set forth in claim 11, wherein the control section judges whether a restriction for feeding the power to the electric equipment and intervene in the charging control are required by predicting a charging or discharging control of the battery based on a battery condition of the battery, a driving condition of electric equipment mounted on the vehicle, the acquired environment information on the driving route, and the unique charging or discharging of the battery.

14. The vehicle control apparatus as set forth in claim 13, further comprising:
a driver's intention acquiring section operable to acquire a driver's intention,
wherein the control section judges whether the restriction for feeding the power to the electric equipment and the intervene in the charging control are required based on the acquired driver's intention.

15. A vehicle control apparatus adapted to be mounted on a vehicle, comprising:
a vehicle control section operable to control the vehicle based on information on a degree of risk in a risky point through which the vehicle is predicted to drive; and
a risky point determination section operable to determine whether a position through which the vehicle is predicted to drive is the risky point,
wherein the vehicle control section is an idling stop permission/prohibition determination section operable to determine whether an idling stop of the vehicle is permitted or prohibited by determining whether there is a possibility to occur a disablement of feeding to a safety equipment mounted on the vehicle based on the degree of risk at the determined risky point.

16. The vehicle control apparatus as set forth in claim 15, wherein the idling stop permission/prohibition determination section determines whether the disablement of the feeding to the safety equipment is occurred by predicting a quantity of residual electrical energy of a battery from a quantity of current predicted to be used and a quantity of current predicted to be generated until the vehicle reaches the risky point and a quantity of current predicted to be discharged by the safety equipment at the risky point.

17. The vehicle control apparatus as set forth in claim 15, wherein the risky point determination section calculates a degree of risk at the risky point by weighting a score of a risk element.

18. The vehicle control apparatus as set forth in claim 15, wherein the idling stop permission/prohibition determination section determines whether the idling stop of the vehicle is permitted or prohibited only in a case where the vehicle is within a predetermined distance from the determined risky point.

19. The vehicle control apparatus as set forth in claim 18, wherein the idling stop determination section changes the predetermined distance according to the degree of risk at the risky point.

20. A vehicle slip suppressing apparatus adapted to be mounted on a vehicle, comprising:
a permissible G calculating section operable to calculate an ideal vehicle G;
a vehicle G detecting section operable to detect a vehicle G; and a vehicle slip judging section operable to judge whether a vehicle slip is occurring, wherein the vehicle slip suppressing apparatus executes a vehicle slip avoidance control according to the result of the slip judgment.

21. The vehicle slip suppressing apparatus as set forth in claim 20, further comprising:

a road condition detecting section operable to detect road information;

an external environment detecting section operable to detect an external environment;

a vehicle condition detecting section operable to detect a vehicle condition; and a degree-of-risk predicting section operable to predict a degree of risk according to the results of detections, wherein the permissible G is corrected according to the predicted degree of risk.

22. The vehicle slip suppressing apparatus as set forth in claim 20, wherein the vehicle slip suppressing apparatus notify a user that the slip of the vehicle is likely to occur when a deviation between the permissible G and the vehicle G becomes less than the primary threshold value.

23. The vehicle slip suppressing apparatus as set forth in claim 22, wherein the vehicle slip suppressing apparatus executes a vehicle slip avoidance control when the deviation between the permissible G and the vehicle G becomes less than a secondary threshold value which is smaller than the primary threshold value.

24. The vehicle slip suppressing apparatus as set forth in claim 20, wherein the slip avoidance control is executed when a user does not perform an intervention prohibiting operation.

25. The vehicle slip suppressing apparatus as set forth in claim 24, wherein the vehicle slip suppressing apparatus advise the user to reduce a vehicle speed according to the result of the slip judgment when the user performs the intervention prohibiting operation.

26. The vehicle slip suppressing apparatus as set forth in claim 20, further comprising:

a permissible speed calculating section operable to calculate a curve entering permissible speed, wherein the vehicle slip suppressing apparatus advise a user to reduce a vehicle speed to the curve entering permissible speed in a case where the vehicle speed is detected to be higher than a primary threshold value based on the curve entering permissible speed when the vehicle is within a predetermined distance from a curve entering point.

27. The vehicle slip suppressing apparatus as set forth in claim 26, wherein the vehicle slip suppressing apparatus reduces the vehicle speed in a case where the vehicle speed is detected to be higher than a secondary threshold value which is higher than the primary threshold value.

28. The vehicle slip suppressing apparatus as set forth in claim 27, wherein the vehicle slip suppressing apparatus notify the user that the vehicle speed is reduced or a slip avoidance control is executed when the vehicle slip suppressing apparatus reduces the vehicle speed or executes the slip avoidance control.

* * * * *